US012272364B2

(12) United States Patent
Zhang

(10) Patent No.: US 12,272,364 B2
(45) Date of Patent: Apr. 8, 2025

(54) AUDIO SIGNAL ENCODING METHOD AND APPARATUS, AND AUDIO SIGNAL DECODING METHOD AND APPARATUS

(71) Applicant: HUAWEI TECHNOLOGIES CO., LTD., Guangdong (CN)

(72) Inventor: Dejun Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 426 days.

(21) Appl. No.: 17/853,173

(22) Filed: Jun. 29, 2022

(65) Prior Publication Data

US 2022/0335961 A1 Oct. 20, 2022

Related U.S. Application Data

(63) Continuation of application No. PCT/CN2020/141249, filed on Dec. 30, 2020.

(30) Foreign Application Priority Data

Dec. 31, 2019 (CN) ......................... 201911418539.8

(51) Int. Cl.
*G10L 19/02* (2013.01)
*G10L 19/06* (2013.01)
*G10L 19/09* (2013.01)

(52) U.S. Cl.
CPC .............. *G10L 19/02* (2013.01); *G10L 19/06* (2013.01); *G10L 19/09* (2013.01)

(58) Field of Classification Search
CPC .......... G10L 19/02; G10L 19/06; G10L 19/09
See application file for complete search history.

(56) References Cited

FOREIGN PATENT DOCUMENTS

| | | | | | |
|---|---|---|---|---|---|
| CN | 1677490 | A | | 10/2005 | |
| CN | 101393743 | A | * | 3/2009 | |
| CN | 101599272 | A | | 12/2009 | |
| CN | 101615395 | A | * | 12/2009 | ............. G10L 19/09 |
| JP | H10124093 | A | | 5/1998 | |
| JP | 2003271199 | A | | 9/2003 | |
| WO | 2008007873 | A1 | | 1/2008 | |
| WO | 2009086919 | A1 | | 7/2009 | |

* cited by examiner

*Primary Examiner* — Anne L Thomas-Homescu
(74) *Attorney, Agent, or Firm* — WOMBLE BOND DICKINSON (US) LLP

(57) ABSTRACT

An audio signal encoding method and apparatus, and an audio signal decoding method and apparatus, are described. The encoding method includes obtaining a target frequency-domain coefficient of a current frame and a reference target frequency-domain coefficient of the current frame. The encoding method further includes calculating a cost function based on the target frequency-domain coefficient and the reference target frequency-domain coefficient of the current frame, where the cost function is for determining whether to perform long-term prediction (LTP) processing on the current frame during encoding of the target frequency-domain coefficient of the current frame. Additionally, the method includes encoding the target frequency-domain coefficient of the current frame based on the cost function.

21 Claims, 12 Drawing Sheets

AUDIO SIGNAL ENCODING METHOD AND APPARATUS, AND AUDIO SIGNAL DECODING METHOD AND APPARATUS

CROSS-REFERENCE TO RELATED APPLICATIONS

This application is a continuation of International Application No. PCT/CN2020/141249, filed on Dec. 30, 2020, which claims priority to Chinese Patent Application No. 201911418539.8, filed on Dec. 31, 2019. The disclosures of the aforementioned applications are hereby incorporated by reference in their entireties.

TECHNICAL FIELD

This application relates to the field of audio signal encoding/decoding technologies, and more specifically, to an audio signal encoding method and apparatus, and an audio signal decoding method and apparatus.

BACKGROUND

As quality of life improves, people have an increasing demand on high-quality audio. To better transmit an audio signal by using limited bandwidth, the audio signal is usually encoded first, and then a bitstream obtained through encoding processing is transmitted to a decoder side. The decoder side performs decoding processing on the received bitstream to obtain a decoded audio signal, where the decoded audio signal is used for playback.

There are many audio signal coding technologies. A frequency-domain encoding/decoding technology is a common audio encoding/decoding technology. In the frequency-domain encoding/decoding technology, compression encoding/decoding is performed by using short-term correlation and long-term correlation of an audio signal.

Therefore, how to improve encoding/decoding efficiency of performing frequency-domain encoding/decoding on an audio signal becomes an urgent technical problem to be resolved.

SUMMARY

This application provides an audio signal encoding method and apparatus, and an audio signal decoding method and apparatus, to improve audio signal encoding/decoding efficiency.

According to a first aspect, an audio signal encoding method is provided. The method includes: obtaining a target frequency-domain coefficient of a current frame and a reference target frequency-domain coefficient of the current frame; calculating a cost function based on the target frequency-domain coefficient and the reference target frequency-domain coefficient of the current frame, where the cost function is for determining whether to perform long-term prediction (LTP) processing on the current frame during encoding of the target frequency-domain coefficient of the current frame; and encoding the target frequency-domain coefficient of the current frame based on the cost function.

In this embodiment of this application, the cost function is calculated based on the target frequency-domain coefficient and the reference target frequency-domain coefficient of the current frame, and LTP processing may be performed, based on the cost function, on a signal suitable for LTP processing (no LTP processing is performed on a signal unsuitable for LTP processing). In this way, redundant information in a signal can be reduced by effectively using a long-term correlation of the signal, so that compression performance in audio signal encoding/decoding can be improved. Therefore, audio signal encoding/decoding efficiency can be improved.

In some embodiments, the target frequency-domain coefficient and the reference target frequency-domain coefficient of the current frame may be obtained through processing based on a filtering parameter. The filtering parameter may be obtained by performing filtering processing on a frequency-domain coefficient of the current frame. The frequency-domain coefficient of the current frame may be obtained by performing time to frequency domain transform on a time-domain signal of the current frame. The time to frequency domain transform may be modified discrete cosine transform (MDCT), discrete cosine transform (DCT), fast Fourier transform (FFT), or the like.

The reference target frequency-domain coefficient may be a target frequency-domain coefficient of a reference signal of the current frame.

In some embodiments, the filtering processing may include temporary noise shaping (TNS) processing and/or frequency-domain noise shaping (FDNS) processing, or the filtering processing may include other processing. This is not limited in this embodiment of this application.

With reference to the first aspect, in some embodiments of the first aspect, the cost function includes at least one of a cost function of a high frequency band of the current frame, a cost function of a low frequency band of the current frame, or a cost function of a full frequency band of the current frame. The high frequency band is a frequency band whose frequency is greater than that of a cutoff frequency bin and that is of the full frequency band of the current frame, the low frequency band is a frequency band whose frequency is less than or equal to that of the cutoff frequency bin and that is of the full frequency band of the current frame, and the cutoff frequency bin is used for division into the low frequency band and the high frequency band.

In this embodiment of this application, based on the cost function, LTP processing may be performed on a frequency band (that is, one of the low frequency band, the high frequency band, or the full frequency band) that is suitable for LTP processing and that is of the current frame (no LTP processing is performed on a frequency band unsuitable for LTP processing). In this way, redundant information in a signal can be reduced by more effectively using a long-term correlation of the signal, so that compression performance in audio signal encoding/decoding can be further improved. Therefore, audio signal encoding/decoding efficiency can be improved.

With reference to the first aspect, in some embodiments of the first aspect, the cost function is a predicted gain of a current frequency band of the current frame, or the cost function is a ratio of energy of an estimated residual frequency-domain coefficient of a current frequency band of the current frame to energy of a target frequency-domain coefficient of the current frequency band. The estimated residual frequency-domain coefficient is a difference between the target frequency-domain coefficient of the current frequency band and a predicted frequency-domain coefficient of the current frequency band, the predicted frequency-domain coefficient is obtained based on a reference frequency-domain coefficient and the predicted gain of the current frequency band of the current frame, and the current frequency band is the low frequency band, the high frequency band, or the full frequency band.

With reference to the first aspect, in some embodiments of the first aspect, the encoding the target frequency-domain coefficient of the current frame based on the cost function includes: determining a first identifier and/or a second identifier based on the cost function, where the first identifier is used to indicate whether to perform LTP processing on the current frame, and the second identifier is used to indicate a frequency band on which LTP processing is to be performed and that is of the current frame; and encoding the target frequency-domain coefficient of the current frame based on the first identifier and/or the second identifier.

With reference to the first aspect, in some embodiments of the first aspect, the determining a first identifier and/or a second identifier based on the cost function includes: when the cost function of the low frequency band satisfies a first condition and the cost function of the high frequency band does not satisfy a second condition, determining that the first identifier is a first value and the second identifier is a fourth value, where the first value is used to indicate to perform LTP processing on the current frame, and the fourth value is used to indicate to perform LTP processing on the low frequency band; when the cost function of the low frequency band satisfies the first condition and the cost function of the high frequency band satisfies the second condition, determining that the first identifier is a first value and the second identifier is a third value, where the third value is used to indicate to perform LTP processing on the full frequency band, and the first value is used to indicate to perform LTP processing on the current frame; when the cost function of the low frequency band does not satisfy the first condition, determining that the first identifier is a second value, where the second value is used to indicate not to perform LTP processing on the current frame; when the cost function of the low frequency band satisfies the first condition and the cost function of the full frequency band does not satisfy a third condition, determining that the first identifier is a second value, where the second value is used to indicate not to perform LTP processing on the current frame; or when the cost function of the full frequency band satisfies the third condition, determining that the first identifier is a first value and the second identifier is a third value, where the third value is used to indicate to perform LTP processing on the full frequency band.

With reference to the first aspect, in some embodiments of the first aspect, the encoding the target frequency-domain coefficient of the current frame based on the first identifier and/or the second identifier includes: when the first identifier is the first value, performing LTP processing on at least one of the high frequency band, the low frequency band, or the full frequency band of the current frame based on the second identifier to obtain a residual frequency-domain coefficient of the current frame; encoding the residual frequency-domain coefficient of the current frame; and writing a value of the first identifier and a value of the second identifier into a bitstream; or when the first identifier is the second value, encoding the target frequency-domain coefficient of the current frame; and writing a value of the first identifier into a bitstream.

With reference to the first aspect, in some embodiments of the first aspect, the encoding the target frequency-domain coefficient of the current frame based on the cost function includes: determining a first identifier based on the cost function, where the first identifier is used to indicate whether to perform LTP processing on the current frame and/or indicate a frequency band on which LTP processing is to be performed and that is of the current frame; and encoding the target frequency-domain coefficient of the current frame based on the first identifier.

With reference to the first aspect, in some embodiments of the first aspect, the determining a first identifier based on the cost function includes: when the cost function of the low frequency band satisfies a first condition and the cost function of the high frequency band does not satisfy a second condition, determining that the first identifier is a first value, where the first value is used to indicate to perform LTP processing on the low frequency band; when the cost function of the low frequency band satisfies the first condition and the cost function of the high frequency band satisfies the second condition, determining that the first identifier is a third value, where the third value is used to indicate to perform LTP processing on the full frequency band; when the cost function of the low frequency band does not satisfy the first condition, determining that the first identifier is a second value, where the second value is used to indicate not to perform LTP processing on the current frame; when the cost function of the low frequency band satisfies the first condition and the cost function of the full frequency band does not satisfy a third condition, determining that the first identifier is a second value, where the second value is used to indicate not to perform LTP processing on the current frame; or when the cost function of the full frequency band satisfies the third condition, determining that the first identifier is a third value, where the third value is used to indicate to perform LTP processing on the full frequency band.

With reference to the first aspect, in some embodiments of the first aspect, the encoding the target frequency-domain coefficient of the current frame based on the first identifier includes: performing LTP processing on at least one of the high frequency band, the low frequency band, or the full frequency band of the current frame based on the first identifier to obtain a residual frequency-domain coefficient of the current frame; encoding the residual frequency-domain coefficient of the current frame; and writing a value of the first identifier into a bitstream; or when the first identifier is the second value, encoding the target frequency-domain coefficient of the current frame; and writing a value of the first identifier into a bitstream.

With reference to the first aspect, in some embodiments of the first aspect, the first condition is that the cost function of the low frequency band is greater than or equal to a first threshold, the second condition is that the cost function of the high frequency band is greater than or equal to a second threshold, and the third condition is that the cost function of the full frequency band is greater than or equal to the third threshold; or the first condition is that the cost function of the low frequency band is less than a fourth threshold, the second condition is that the cost function of the high frequency band is less than the fourth threshold, and the third condition is that the cost function of the full frequency band is greater than or equal to a fifth threshold.

With reference to the first aspect, in some embodiments of the first aspect, the method further includes: determining the cutoff frequency bin based on a spectral coefficient of the reference signal.

In this embodiment of this application, the cutoff frequency bin is determined based on the spectral coefficient of the reference signal, so that a frequency band suitable for LTP processing can be determined more accurately, LTP processing efficiency can be improved, and compression performance in audio signal encoding/decoding can be further improved. Therefore, audio signal encoding/decoding efficiency can be improved.

With reference to the first aspect, in some embodiments of the first aspect, the determining the cutoff frequency bin based on a spectral coefficient of the reference signal includes: determining, based on the spectral coefficient of the reference signal, a peak factor set corresponding to the reference signal; and determining the cutoff frequency bin based on a peak factor in the peak factor set, where the peak factor satisfies a preset condition.

With reference to the first aspect, in some embodiments of the first aspect, the cutoff frequency bin is a preset value.

In this embodiment of this application, the cutoff frequency bin is preset based on experience or with reference to an actual situation, so that a frequency band suitable for LTP processing can be determined more accurately, LTP processing efficiency can be improved, and compression performance in audio signal encoding/decoding can be further improved. Therefore, audio signal encoding/decoding efficiency can be improved.

According to a second aspect, an audio signal decoding method is provided. The method includes: parsing a bitstream to obtain a decoded frequency-domain coefficient of a current frame; parsing the bitstream to obtain a first identifier, where the first identifier is used to indicate whether to perform LTP processing on the current frame, or the first identifier is used to indicate whether to perform LTP processing on the current frame and/or indicate a frequency band on which LTP processing is to be performed and that is of the current frame; and processing the decoded frequency-domain coefficient of the current frame based on the first identifier to obtain a frequency-domain coefficient of the current frame.

In this embodiment of this application, LTP processing is performed on a signal suitable for LTP processing (no LTP processing is performed on a signal unsuitable for LTP processing). In this way, redundant information in the signal can be effectively reduced, so that compression efficiency in encoding/decoding can be improved. Therefore, audio signal encoding/decoding efficiency can be improved.

In some embodiments, the decoded frequency-domain coefficient of the current frame may be a residual frequency-domain coefficient of the current frame, or the decoded frequency-domain coefficient of the current frame is a target frequency-domain coefficient of the current frame.

In some embodiments, the bitstream may be further parsed to obtain a filtering parameter.

The filtering parameter may be used to perform filtering processing on the frequency-domain coefficient of the current frame. The filtering processing may include temporary noise shaping (TNS) processing and/or frequency-domain noise shaping (FDNS) processing, or the filtering processing may include other processing. This is not limited in this embodiment of this application.

With reference to the second aspect, in some embodiments of the second aspect, the frequency band on which LTP processing is performed and that is of the current frame includes a high frequency band, a low frequency band, or a full frequency band, where the high frequency band is a frequency band whose frequency is greater than that of a cutoff frequency bin and that is of the full frequency band of the current frame, the low frequency band is a frequency band whose frequency is less than or equal to that of the cutoff frequency bin and that is of the full frequency band of the current frame, and the cutoff frequency bin is used for division into the low frequency band and the high frequency band.

In this embodiment of this application, based on the cost function, LTP processing may be performed on a frequency band (that is, one of the low frequency band, the high frequency band, or the full frequency band) that is suitable for LTP processing and that is of the current frame (no LTP processing is performed on a frequency band unsuitable for LTP processing). In this way, redundant information in a signal can be reduced by more effectively using a long-term correlation of the signal, so that compression performance in audio signal encoding/decoding can be further improved. Therefore, audio signal encoding/decoding efficiency can be improved.

With reference to the second aspect, in some embodiments of the second aspect, when the first identifier is a first value, the decoded frequency-domain coefficient of the current frame is a residual frequency-domain coefficient of the current frame; or when the first identifier is a second value, the decoded frequency-domain coefficient of the current frame is a target frequency-domain coefficient of the current frame.

With reference to the second aspect, in some embodiments of the second aspect, the parsing a bitstream to obtain a first identifier includes: parsing the bitstream to obtain the first identifier; and when the first identifier is the first value, parsing the bitstream to obtain a second identifier, where the second identifier is used to indicate a frequency band on which LTP processing is to be performed and that is of the current frame.

With reference to the second aspect, in some embodiments of the second aspect, the processing the decoded frequency-domain coefficient of the current frame based on the first identifier to obtain a frequency-domain coefficient of the current frame includes: when the first identifier is the first value and the second identifier is a fourth value, obtaining a reference target frequency-domain coefficient of the current frame, where the first value is used to indicate to perform LTP processing on the current frame, and the fourth value is used to indicate to perform LTP processing on the low frequency band; performing LTP synthesis based on a predicted gain of the low frequency band, the reference target frequency-domain coefficient, and the residual frequency-domain coefficient of the current frame to obtain the target frequency-domain coefficient of the current frame; and processing the target frequency-domain coefficient of the current frame to obtain the frequency-domain coefficient of the current frame; or when the first identifier is the first value and the second identifier is a third value, obtaining a reference target frequency-domain coefficient of the current frame, where the first value is used to indicate to perform LTP processing on the current frame, and the third value is used to indicate to perform LTP processing on the full frequency band; performing LTP synthesis based on a predicted gain of the full frequency band, the reference target frequency-domain coefficient, and the residual frequency-domain coefficient of the current frame to obtain the target frequency-domain coefficient of the current frame; and processing the target frequency-domain coefficient of the current frame to obtain the frequency-domain coefficient of the current frame; or when the first identifier is the second value, processing the target frequency-domain coefficient of the current frame to obtain the frequency-domain coefficient of the current frame, where the second value is used to indicate not to perform LTP processing on the current frame.

With reference to the second aspect, in some embodiments of the second aspect, the processing the target frequency-domain coefficient of the current frame based on the first identifier to obtain a frequency-domain coefficient of the current frame includes: when the first identifier is the first value, obtaining a reference target frequency-domain coefficient of the current frame, where the first value is used to indicate to perform LTP processing on the low frequency band; performing LTP synthesis based on a predicted gain of the low frequency band, the reference target frequency-domain coefficient, and the residual frequency-domain coefficient of the current frame to obtain the target frequency-domain coefficient of the current frame; and processing the target frequency-domain coefficient of the current frame to obtain the frequency-domain coefficient of the current frame; or when the first identifier is a third value, obtaining a reference target frequency-domain coefficient of the current frame, where the third value is used to indicate to perform LTP processing on the full frequency band; performing LTP synthesis based on a predicted gain of the full frequency band, the reference target frequency-domain coefficient, and the residual frequency-domain coefficient of the current frame to obtain the target frequency-domain coefficient of the current frame; and processing the target frequency-domain coefficient of the current frame to obtain the frequency-domain coefficient of the current frame; or when the first identifier is the second value, processing the target frequency-domain coefficient of the current frame to obtain the frequency-domain coefficient of the current frame, where the second value is used to indicate not to perform LTP processing on the current frame.

With reference to the second aspect, in some embodiments of the second aspect, the obtaining a reference target frequency-domain coefficient of the current frame includes: parsing the bitstream to obtain a pitch period of the current frame; determining a reference frequency-domain coefficient of the current frame based on the pitch period of the current frame; and processing the reference frequency-domain coefficient to obtain the reference target frequency-domain coefficient.

With reference to the second aspect, in some embodiments of the second aspect, the method further includes: determining the cutoff frequency bin based on a spectral coefficient of the reference signal.

In this embodiment of this application, the cutoff frequency bin is determined based on the spectral coefficient of the reference signal, so that a frequency band suitable for LTP processing can be determined more accurately, LTP processing efficiency can be improved, and compression performance in audio signal encoding/decoding can be further improved. Therefore, audio signal encoding/decoding efficiency can be improved.

With reference to the second aspect, in some embodiments of the second aspect, the determining the cutoff frequency bin based on a spectral coefficient of the reference signal includes: determining, based on the spectral coefficient of the reference signal, a peak factor set corresponding to the reference signal; and determining the cutoff frequency bin based on a peak factor in the peak factor set, where the peak factor satisfies a preset condition.

With reference to the second aspect, in some embodiments of the second aspect, the cutoff frequency bin is a preset value.

In this embodiment of this application, the cutoff frequency bin is preset based on experience or with reference to an actual situation, so that a frequency band suitable for LTP processing can be determined more accurately, LTP processing efficiency can be improved, and compression performance in audio signal encoding/decoding can be further improved. Therefore, audio signal encoding/decoding efficiency can be improved.

According to a third aspect, an audio signal encoding apparatus is provided, including: an obtaining module, configured to obtain a target frequency-domain coefficient of a current frame and a reference target frequency-domain coefficient of the current frame; a processing module, configured to calculate a cost function based on the target frequency-domain coefficient and the reference target frequency-domain coefficient of the current frame, where the cost function is for determining whether to perform long-term prediction LTP processing on the current frame during encoding of the target frequency-domain coefficient of the current frame; and an encoding module, configured to encode the target frequency-domain coefficient of the current frame based on the cost function.

In this embodiment of this application, the cost function is calculated based on the target frequency-domain coefficient and the reference target frequency-domain coefficient of the current frame, and LTP processing may be performed, based on the cost function, on a signal suitable for LTP processing (no LTP processing is performed on a signal unsuitable for LTP processing), so that compression performance in audio signal encoding/decoding can be improved. Therefore, audio signal encoding/decoding efficiency can be improved.

In some embodiments, the target frequency-domain coefficient and the reference target frequency-domain coefficient of the current frame may be obtained through processing based on a filtering parameter. The filtering parameter may be obtained by performing filtering processing on a frequency-domain coefficient of the current frame. The frequency-domain coefficient of the current frame may be obtained by performing time to frequency domain transform on a time-domain signal of the current frame. The time to frequency domain transform may be MDCT, DCT, FFT, or the like.

The reference target frequency-domain coefficient may be a target frequency-domain coefficient of a reference signal of the current frame.

In some embodiments, the filtering processing may include temporary noise shaping (TNS) processing and/or frequency-domain noise shaping (FDNS) processing, or the filtering processing may include other processing. This is not limited in this embodiment of this application.

With reference to the third aspect, in some embodiments of the third aspect, the cost function includes at least one of a cost function of a high frequency band of the current frame, a cost function of a low frequency band of the current frame, or a cost function of a full frequency band of the current frame. The high frequency band is a frequency band whose frequency is greater than that of a cutoff frequency bin and that is of the full frequency band of the current frame, the low frequency band is a frequency band whose frequency is less than or equal to that of the cutoff frequency bin and that is of the full frequency band of the current frame, and the cutoff frequency bin is used for division into the low frequency band and the high frequency band.

In this embodiment of this application, based on the cost function, LTP processing may be performed on a frequency band (that is, one of the low frequency band, the high frequency band, or the full frequency band) that is suitable for LTP processing and that is of the current frame (no LTP processing is performed on a frequency band unsuitable for LTP processing), so that compression performance in audio signal encoding/decoding can be further improved. Therefore, audio signal encoding/decoding efficiency can be improved.

With reference to the third aspect, in some embodiments of the third aspect, the cost function is a predicted gain of a current frequency band of the current frame, or the cost function is a ratio of energy of an estimated residual frequency-domain coefficient of a current frequency band of the current frame to energy of a target frequency-domain coefficient of the current frequency band. The estimated residual frequency-domain coefficient is a difference between the target frequency-domain coefficient of the current frequency band and a predicted frequency-domain coefficient of the current frequency band, the predicted frequency-domain coefficient is obtained based on a reference frequency-domain coefficient and the predicted gain of the current frequency band of the current frame, and the current frequency band is the low frequency band, the high frequency band, or the full frequency band.

With reference to the third aspect, in some embodiments of the third aspect, the encoding module is in some embodiments configured to: determine a first identifier and/or a second identifier based on the cost function, where the first identifier is used to indicate whether to perform LTP processing on the current frame, and the second identifier is used to indicate a frequency band on which LTP processing is to be performed and that is of the current frame; and encode the target frequency-domain coefficient of the current frame based on the first identifier and/or the second identifier.

With reference to the third aspect, in some embodiments of the third aspect, the encoding module is in some embodiments configured to: when the cost function of the low frequency band satisfies a first condition and the cost function of the high frequency band does not satisfy a second condition, determine that the first identifier is a first value and the second identifier is a fourth value, where the first value is used to indicate to perform LTP processing on the current frame, and the fourth value is used to indicate to perform LTP processing on the low frequency band; when the cost function of the low frequency band satisfies the first condition and the cost function of the high frequency band satisfies the second condition, determine that the first identifier is a first value and the second identifier is a third value, where the third value is used to indicate to perform LTP processing on the full frequency band, and the first value is used to indicate to perform LTP processing on the current frame; when the cost function of the low frequency band does not satisfy the first condition, determine that the first identifier is a second value, where the second value is used to indicate not to perform LTP processing on the current frame; when the cost function of the low frequency band satisfies the first condition and the cost function of the full frequency band does not satisfy a third condition, determine that the first identifier is a second value, where the second value is used to indicate not to perform LTP processing on the current frame; or when the cost function of the full frequency band satisfies the third condition, determine that the first identifier is a first value and the second identifier is a third value, where the third value is used to indicate to perform LTP processing on the full frequency band.

With reference to the third aspect, in some embodiments of the third aspect, the encoding module is in some embodiments configured to: when the first identifier is the first value, perform LTP processing on at least one of the high frequency band, the low frequency band, or the full frequency band of the current frame based on the second identifier to obtain a residual frequency-domain coefficient of the current frame; encode the residual frequency-domain coefficient of the current frame; and write a value of the first identifier and a value of the second identifier into a bitstream; or when the first identifier is the second value, encode the target frequency-domain coefficient of the current frame; and write a value of the first identifier into a bitstream.

With reference to the third aspect, in some embodiments of the third aspect, the encoding module is in some embodiments configured to: determine a first identifier based on the cost function, where the first identifier is used to indicate whether to perform LTP processing on the current frame and/or indicate a frequency band on which LTP processing is to be performed and that is of the current frame; and encode the target frequency-domain coefficient of the current frame based on the first identifier.

With reference to the third aspect, in some embodiments of the third aspect, the encoding module is in some embodiments configured to: when the cost function of the low frequency band satisfies a first condition and the cost function of the high frequency band does not satisfy a second condition, determine that the first identifier is a first value, where the first value is used to indicate to perform LTP processing on the low frequency band; when the cost function of the low frequency band satisfies the first condition and the cost function of the high frequency band satisfies the second condition, determine that the first identifier is a third value, where the third value is used to indicate to perform LTP processing on the full frequency band; when the cost function of the low frequency band does not satisfy the first condition, determine that the first identifier is a second value, where the second value is used to indicate not to perform LTP processing on the current frame; when the cost function of the low frequency band satisfies the first condition and the cost function of the full frequency band does not satisfy a third condition, determine that the first identifier is a second value, where the second value is used to indicate not to perform LTP processing on the current frame; or when the cost function of the full frequency band satisfies the third condition, determine that the first identifier is a third value, where the third value is used to indicate to perform LTP processing on the full frequency band.

With reference to the third aspect, in some embodiments of the third aspect, the encoding module is in some embodiments configured to: perform LTP processing on at least one of the high frequency band, the low frequency band, or the full frequency band of the current frame based on the first identifier to obtain a residual frequency-domain coefficient of the current frame; encode the residual frequency-domain coefficient of the current frame; and write a value of the first identifier into a bitstream; or when the first identifier is the second value, encode the target frequency-domain coefficient of the current frame; and write a value of the first identifier into a bitstream.

With reference to the third aspect, in some embodiments of the third aspect, the first condition is that the cost function of the low frequency band is greater than or equal to a first threshold, the second condition is that the cost function of the high frequency band is greater than or equal to a second threshold, and the third condition is that the cost function of the full frequency band is greater than or equal to the third threshold; or the first condition is that the cost function of the low frequency band is less than a fourth threshold, the second condition is that the cost function of the high frequency band is less than the fourth threshold, and the third condition is that the cost function of the full frequency band is greater than or equal to a fifth threshold.

With reference to the third aspect, in some embodiments of the third aspect, the processing module is further configured to determine the cutoff frequency bin based on a spectral coefficient of the reference signal.

In this embodiment of this application, the cutoff frequency bin is determined based on the spectral coefficient of the reference signal, so that a frequency band suitable for LTP processing can be determined more accurately, LTP processing efficiency can be improved, and compression performance in audio signal encoding/decoding can be further improved. Therefore, audio signal encoding/decoding efficiency can be improved.

With reference to the third aspect, in some embodiments of the third aspect, the processing module is in some embodiments configured to: determine, based on the spectral coefficient of the reference signal, a peak factor set corresponding to the reference signal; and determine the cutoff frequency bin based on a peak factor in the peak factor set, where the peak factor satisfies a preset condition.

With reference to the third aspect, in some embodiments of the third aspect, the cutoff frequency bin is a preset value.

In this embodiment of this application, the cutoff frequency bin is preset based on experience or with reference to an actual situation, so that a frequency band suitable for LTP processing can be determined more accurately, LTP processing efficiency can be improved, and compression performance in audio signal encoding/decoding can be further improved. Therefore, audio signal encoding/decoding efficiency can be improved.

According to a fourth aspect, an audio signal decoding apparatus is provided, including: a decoding module, configured to parse a bitstream to obtain a decoded frequency-domain coefficient of a current frame, where the decoding module is further configured to parse the bitstream to obtain a first identifier, where the first identifier is used to indicate whether to perform LTP processing on the current frame, or the first identifier is used to indicate whether to perform LTP processing on the current frame and/or indicate a frequency band on which LTP processing is to be performed and that is of the current frame; and a processing module, configured to process the decoded frequency-domain coefficient of the current frame based on the first identifier to obtain a frequency-domain coefficient of the current frame.

In this embodiment of this application, LTP processing is performed on a signal suitable for LTP processing (no LTP processing is performed on a signal unsuitable for LTP processing). In this way, redundant information in the signal can be effectively reduced, so that compression efficiency in encoding/decoding can be improved. Therefore, audio signal encoding/decoding efficiency can be improved.

In some embodiments, the decoded frequency-domain coefficient of the current frame may be a residual frequency-domain coefficient of the current frame, or the decoded frequency-domain coefficient of the current frame is a target frequency-domain coefficient of the current frame.

In some embodiments, the bitstream may be further parsed to obtain a filtering parameter.

The filtering parameter may be used to perform filtering processing on the frequency-domain coefficient of the current frame. The filtering processing may include temporary noise shaping (TNS) processing and/or frequency-domain noise shaping (FDNS) processing, or the filtering processing may include other processing. This is not limited in this embodiment of this application.

With reference to the fourth aspect, in some embodiments of the fourth aspect, the frequency band on which LTP processing is performed and that is of the current frame includes a high frequency band, a low frequency band, or a full frequency band, where the high frequency band is a frequency band whose frequency is greater than that of a cutoff frequency bin and that is of the full frequency band of the current frame, the low frequency band is a frequency band whose frequency is less than or equal to that of the cutoff frequency bin and that is of the full frequency band of the current frame, and the cutoff frequency bin is used for division into the low frequency band and the high frequency band.

In this embodiment of this application, based on the cost function, LTP processing may be performed on a frequency band (that is, one of the low frequency band, the high frequency band, or the full frequency band) that is suitable for LTP processing and that is of the current frame (no LTP processing is performed on a frequency band unsuitable for LTP processing). In this way, redundant information in a signal can be reduced by more effectively using a long-term correlation of the signal, so that compression performance in audio signal encoding/decoding can be further improved. Therefore, audio signal encoding/decoding efficiency can be improved.

With reference to the fourth aspect, in some embodiments of the fourth aspect, when the first identifier is a first value, the decoded frequency-domain coefficient of the current frame is a residual frequency-domain coefficient of the current frame; or when the first identifier is a second value, the decoded frequency-domain coefficient of the current frame is a target frequency-domain coefficient of the current frame.

With reference to the fourth aspect, in some embodiments of the fourth aspect, the decoding module is in some embodiments configured to: parse the bitstream to obtain the first identifier; and when the first identifier is the first value, parse the bitstream to obtain a second identifier, where the second identifier is used to indicate a frequency band on which LTP processing is to be performed and that is of the current frame.

With reference to the fourth aspect, in some embodiments of the fourth aspect, the processing module is in some embodiments configured to: when the first identifier is the first value and the second identifier is a fourth value, obtain a reference target frequency-domain coefficient of the current frame, where the first value is used to indicate to perform LTP processing on the current frame, and the fourth value is used to indicate to perform LTP processing on the low frequency band; perform LTP synthesis based on a predicted gain of the low frequency band, the reference target frequency-domain coefficient, and the residual frequency-domain coefficient of the current frame to obtain the target frequency-domain coefficient of the current frame; and process the target frequency-domain coefficient of the current frame to obtain the frequency-domain coefficient of the current frame; or when the first identifier is the first value and the second identifier is a third value, obtain a reference target frequency-domain coefficient of the current frame, where the first value is used to indicate to perform LTP processing on the current frame, and the third value is used to indicate to perform LTP processing on the full frequency band; perform LTP synthesis based on a predicted gain of the full frequency band, the reference target frequency-domain coefficient, and the residual frequency-domain coefficient of the current frame to obtain the target frequency-domain coefficient of the current frame; and process the target frequency-domain coefficient of the current frame to obtain the frequency-domain coefficient of the current frame; or when the first identifier is the second value, process the target frequency-domain coefficient of the current frame to obtain the frequency-domain coefficient of the current frame, where the second value is used to indicate not to perform LTP processing on the current frame.

With reference to the fourth aspect, in some embodiments of the fourth aspect, the processing module is in some embodiments configured to: when the first identifier is the first value, obtain a reference target frequency-domain coefficient of the current frame, where the first value is used to indicate to perform LTP processing on the low frequency band; perform LTP synthesis based on a predicted gain of the low frequency band, the reference target frequency-domain coefficient, and the residual frequency-domain coefficient of the current frame to obtain the target frequency-domain coefficient of the current frame; and process the target frequency-domain coefficient of the current frame to obtain the frequency-domain coefficient of the current frame; or when the first identifier is a third value, obtain a reference target frequency-domain coefficient of the current frame, where the third value is used to indicate to perform LTP processing on the full frequency band; perform LTP synthesis based on a predicted gain of the full frequency band, the reference target frequency-domain coefficient, and the residual frequency-domain coefficient of the current frame to obtain the target frequency-domain coefficient of the current frame; and process the target frequency-domain coefficient of the current frame to obtain the frequency-domain coefficient of the current frame; or when the first identifier is the second value, process the target frequency-domain coefficient of the current frame to obtain the frequency-domain coefficient of the current frame, where the second value is used to indicate not to perform LTP processing on the current frame.

With reference to the fourth aspect, in some embodiments of the fourth aspect, the processing module is in some embodiments configured to: parse the bitstream to obtain a pitch period of the current frame; determine a reference frequency-domain coefficient of the current frame based on the pitch period of the current frame; and process the reference frequency-domain coefficient to obtain the reference target frequency-domain coefficient.

With reference to the fourth aspect, in some embodiments of the fourth aspect, the processing module is further configured to determine the cutoff frequency bin based on a spectral coefficient of the reference signal.

In this embodiment of this application, the cutoff frequency bin is determined based on the spectral coefficient of the reference signal, so that a frequency band suitable for LTP processing can be determined more accurately, LTP processing efficiency can be improved, and compression performance in audio signal encoding/decoding can be further improved. Therefore, audio signal encoding/decoding efficiency can be improved.

With reference to the fourth aspect, in some embodiments of the fourth aspect, the processing module is in some embodiments configured to: determine, based on the spectral coefficient of the reference signal, a peak factor set corresponding to the reference signal; and determine the cutoff frequency bin based on a peak factor in the peak factor set, where the peak factor satisfies a preset condition.

With reference to the fourth aspect, in some embodiments of the fourth aspect, the cutoff frequency bin is a preset value.

In this embodiment of this application, the cutoff frequency bin is preset based on experience or with reference to an actual situation, so that a frequency band suitable for LTP processing can be determined more accurately, LTP processing efficiency can be improved, and compression performance in audio signal encoding/decoding can be further improved. Therefore, audio signal encoding/decoding efficiency can be improved.

According to a fifth aspect, an encoding apparatus is provided. The encoding apparatus includes a storage medium and a central processing unit. The storage medium may be a nonvolatile storage medium and stores a computer executable program, and the central processing unit is connected to the nonvolatile storage medium and executes the computer executable program to implement the method in the first aspect or the embodiments of the first aspect.

According to a sixth aspect, an encoding apparatus is provided. The encoding apparatus includes a storage medium and a central processing unit. The storage medium may be a nonvolatile storage medium and stores a computer executable program, and the central processing unit is connected to the nonvolatile storage medium and executes the computer executable program to implement the method in the second aspect or the embodiments of the second aspect.

According to a seventh aspect, a computer-readable storage medium is provided. The computer-readable medium stores program code to be executed by a device, where the program code includes instructions for performing the method in the first aspect or the embodiments of the first aspect.

According to an eighth aspect, a computer-readable storage medium is provided. The computer-readable medium stores program code to be executed by a device, where the program code includes instructions for performing the method in the second aspect or the embodiments of the second aspect.

According to a ninth aspect, an embodiment of this application provides a computer-readable storage medium. The computer-readable storage medium stores program code, where the program code includes instructions for performing a part or all of operations in either of the methods in the first aspect or the second aspect.

According to a tenth aspect, an embodiment of this application provides a computer program product. When the computer program product is run on a computer, the computer is enabled to perform a part or all of the operations in either of the methods in the first aspect or the second aspect.

In embodiments of this application, the cost function is calculated based on the target frequency-domain coefficient and the reference target frequency-domain coefficient of the current frame, and LTP processing may be performed, based on the cost function, on a signal suitable for LTP processing (no LTP processing is performed on a signal unsuitable for LTP processing). In this way, redundant information in a signal can be reduced by effectively using a long-term correlation of the signal, so that compression performance in audio signal encoding/decoding can be improved. Therefore, audio signal encoding/decoding efficiency can be improved.

DESCRIPTION OF EMBODIMENTS

The following describes technical solutions of this application with reference to the accompanying drawings.

An audio signal in embodiments of this application may be a mono audio signal, or may be a stereo signal. The stereo signal may be an original stereo signal, may be a stereo signal including two channels of signals (a left channel signal and a right channel signal) included in a multi-channel signal, or may be a stereo signal including two channels of signals generated by at least three channels of signals included in a multi-channel signal. This is not limited in embodiments of this application.

For ease of description, only a stereo signal (including a left channel signal and a right channel signal) is used as an example for description in embodiments of this application. A person skilled in the art may understand that the following embodiments are merely examples rather than limitations. The solutions in embodiments of this application are also applicable to a mono audio signal and another stereo signal. This is not limited in embodiments of this application.

Figure 1:
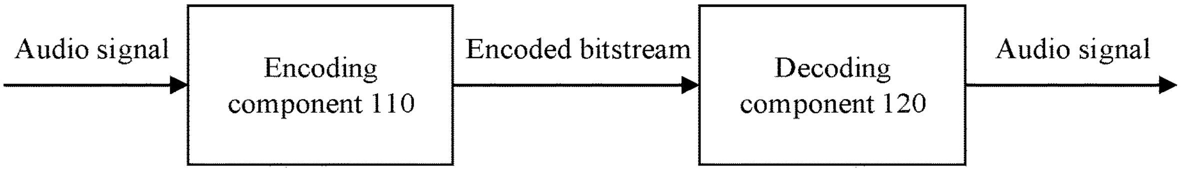
FIG. 1 is a schematic diagram of a structure of an audio signal encoding/decoding system.

FIG. 1 is a schematic diagram of a structure of an audio encoding/decoding system according to an example embodiment of this application. The audio encoding/decoding system includes an encoding component 110 and a decoding component 120.

The encoding component 110 is configured to encode a current frame (an audio signal) in frequency domain. In some embodiments, the encoding component 110 may be implemented by software, may be implemented by hardware, or may be implemented in a form of a combination of software and hardware. This is not limited in this embodiment of this application.

Figure 2:
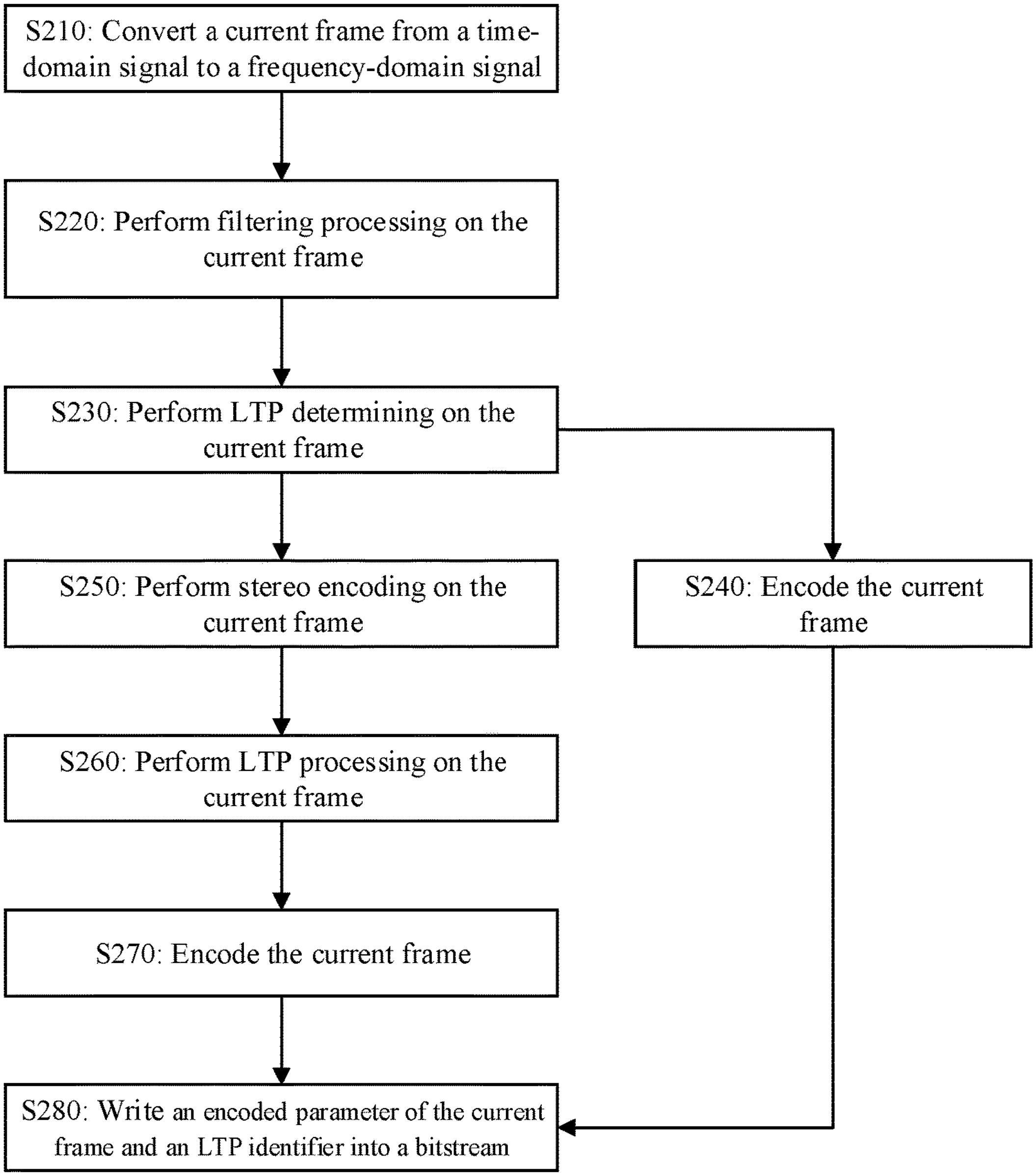
FIG. 2 is a schematic flowchart of an audio signal encoding method.

When the encoding component 110 encodes the current frame in frequency domain, in a possible embodiment, operations shown in FIG. 2 may be included.

S210: Convert the current frame from a time-domain signal to a frequency-domain signal.

S220: Perform filtering processing on the current frame to obtain a frequency-domain coefficient of the current frame.

S230: Perform long-term prediction (LTP) determining on the current frame to obtain an LTP identifier.

When the LTP identifier is a first value (for example, the LTP identifier is 1), S250 may be performed; or when the LTP identifier is a second value (for example, the LTP identifier is 0), S240 may be performed.

S240: Encode the frequency-domain coefficient of the current frame to obtain an encoded parameter of the current frame. Then, S280 may be performed.

S250: Perform stereo encoding on the current frame to obtain a frequency-domain coefficient of the current frame.

S260: Perform LTP processing on the frequency-domain coefficient of the current frame to obtain a residual frequency-domain coefficient of the current frame.

S270: Encode the residual frequency-domain coefficient of the current frame to obtain an encoded parameter of the current frame.

S280: Write the encoded parameter of the current frame and the LTP identifier into a bitstream.

It should be noted that the encoding method shown in FIG. 2 is merely an example rather than a limitation. An order of performing the operations in FIG. 2 is not limited in this embodiment of this application. The encoding method shown in FIG. 2 may alternatively include more or fewer operations. This is not limited in this embodiment of this application.

For example, in the encoding method shown in FIG. 2, alternatively, S250 may be performed first to perform LTP processing on the current frame, and then S260 is performed to perform stereo encoding on the current frame.

For another example, the encoding method shown in FIG. 2 may alternatively be used to encode a mono signal. In this case, S250 may not be performed in the encoding method shown in FIG. 2, that is, no stereo encoding is performed on the mono signal.

The decoding component 120 is configured to decode an encoded bitstream generated by the encoding component 110, to obtain an audio signal of the current frame.

In some embodiments, the encoding component 110 may be connected to the decoding component 120 in a wired or wireless manner, and the decoding component 120 may obtain, through a connection between the decoding component 120 and the encoding component 110, the encoded bitstream generated by the encoding component 110. Alternatively, the encoding component 110 may store the generated encoded bitstream into a memory, and the decoding component 120 reads the encoded bitstream in the memory.

In some embodiments, the decoding component 120 may be implemented by software, may be implemented by hardware, or may be implemented in a form of a combination of software and hardware. This is not limited in this embodiment of this application.

Figure 3:
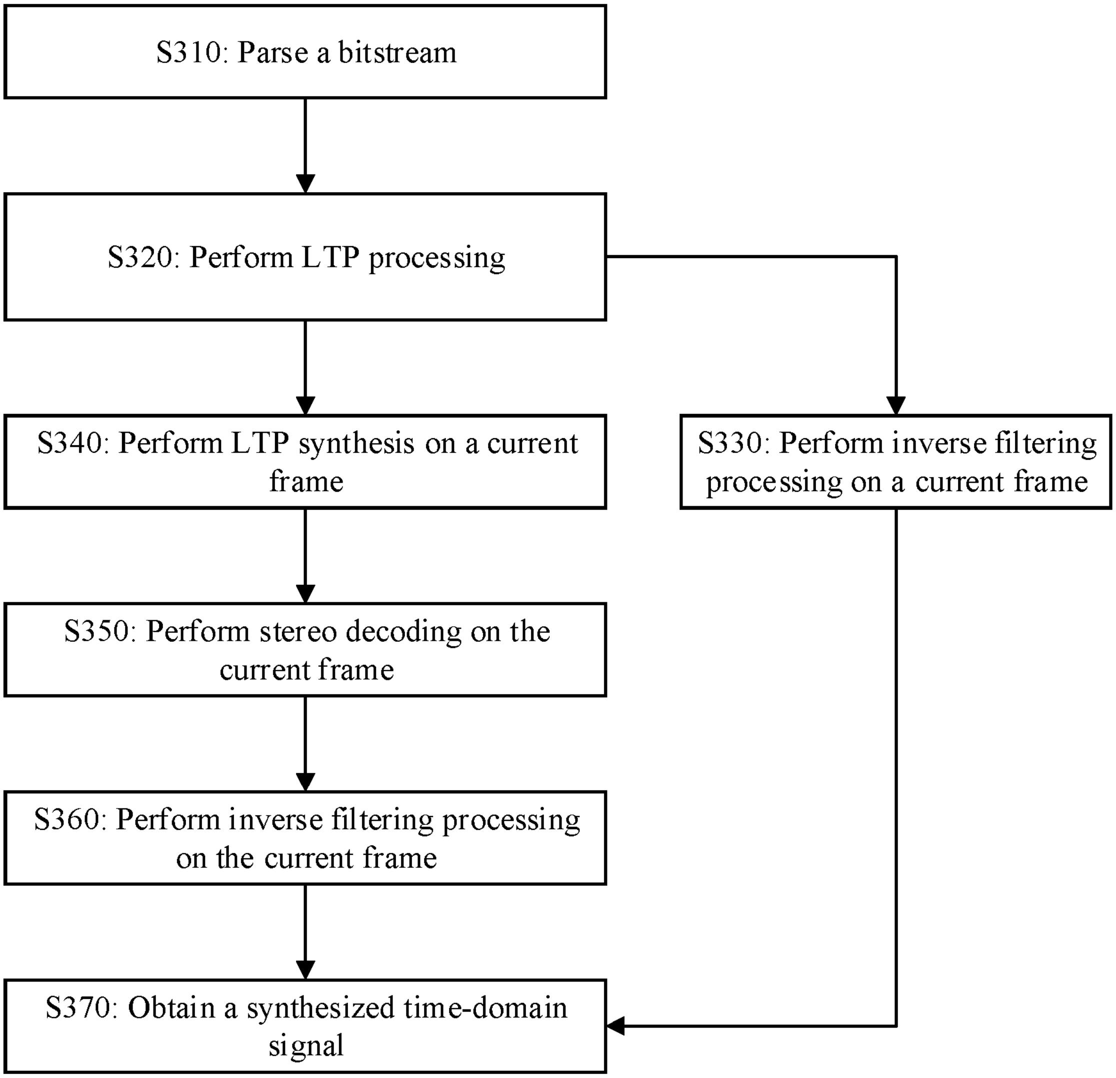
FIG. 3 is a schematic flowchart of an audio signal decoding method.

When the decoding component 120 decodes a current frame (an audio signal) in frequency domain, in a possible embodiment, operations shown in FIG. 3 may be included.

S310: Parse a bitstream to obtain an encoded parameter of the current frame and an LTP identifier.

S320: Perform LTP processing based on the LTP identifier to determine whether to perform LTP synthesis on the encoded parameter of the current frame.

When the LTP identifier is a first value (for example, the LTP identifier is 1), a residual frequency-domain coefficient of the current frame is obtained by parsing the bitstream in S310. In this case, S340 may be performed. When the LTP identifier is a second value (for example, the LTP identifier is 0), a target frequency-domain coefficient of the current frame is obtained by parsing the bitstream in S310. In this case, S330 may be performed.

S330: Perform inverse filtering processing on the target frequency-domain coefficient of the current frame to obtain a frequency-domain coefficient of the current frame. Then, S370 may be performed.

S340: Perform LTP synthesis on the residual frequency-domain coefficient of the current frame to obtain an updated residual frequency-domain coefficient.

S350: Perform stereo decoding on the updated residual frequency-domain coefficient to obtain a target frequency-domain coefficient of the current frame.

S360: Perform inverse filtering processing on the target frequency-domain coefficient of the current frame to obtain a frequency-domain coefficient of the current frame.

S370: Convert the frequency-domain coefficient of the current frame to obtain a synthesized time-domain signal.

It should be noted that the decoding method shown in FIG. 3 is merely an example rather than a limitation. An order of performing the operations in FIG. 3 is not limited in this embodiment of this application. The decoding method shown in FIG. 3 may alternatively include more or fewer operations. This is not limited in this embodiment of this application.

For example, in the decoding method shown in FIG. 3, alternatively, S350 may be performed first to perform stereo decoding on the residual frequency-domain coefficient, and then S340 is performed to perform LTP synthesis on the residual frequency-domain coefficient.

For another example, the decoding method shown in FIG. 3 may alternatively be used to decode a mono signal. In this case, S350 may not be performed in the decoding method shown in FIG. 3, that is, no stereo decoding is performed on the mono signal.

In some embodiments, the encoding component 110 and the decoding component 120 may be disposed in a same device, or may be disposed in different devices. The device may be a terminal having an audio signal processing function, for example, a mobile phone, a tablet computer, a laptop portable computer, a desktop computer, a Bluetooth speaker, a recording pen, or a wearable device. Alternatively, the device may be a network element having an audio signal processing capability in a core network or a wireless network. This is not limited in this embodiment.

Figure 4:
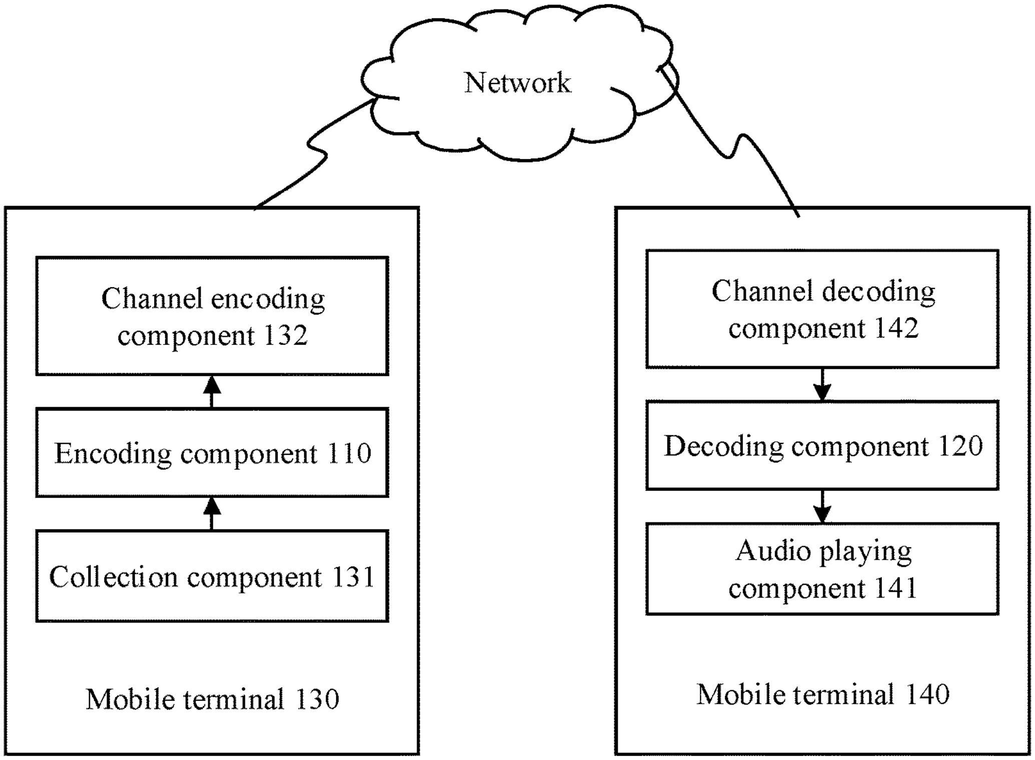
FIG. 4 is a schematic diagram of a mobile terminal according to an embodiment of this application.

For example, as shown in FIG. 4, the following example is used for description in this embodiment. The encoding component 110 is disposed in a mobile terminal 130, and the decoding component 120 is disposed in a mobile terminal 140. The mobile terminal 130 and the mobile terminal 140 are mutually independent electronic devices having an audio signal processing capability, for example, may be mobile phones, wearable devices, virtual reality (virtual reality, VR) devices, or augmented reality (augmented reality, AR) devices. In addition, the mobile terminal 130 and the mobile terminal 140 are connected by using a wireless or wired network.

In some embodiments, the mobile terminal 130 may include a collection component 131, an encoding component 110, and a channel encoding component 132. The collection component 131 is connected to the encoding component 110, and the encoding component 110 is connected to the encoding component 132.

In some embodiments, the mobile terminal 140 may include an audio playing component 141, the decoding component 120, and a channel decoding component 142. The audio playing component 141 is connected to the decoding component 120, and the decoding component 120 is connected to the channel decoding component 142.

After collecting an audio signal by using the collection component 131, the mobile terminal 130 encodes the audio signal by using the encoding component 110, to obtain an encoded bitstream; and then encodes the encoded bitstream by using the channel encoding component 132, to obtain a to-be-transmitted signal.

The mobile terminal 130 sends the to-be-transmitted signal to the mobile terminal 140 by using the wireless or wired network.

After receiving the to-be-transmitted signal, the mobile terminal 140 decodes the to-be-transmitted signal by using the channel decoding component 142, to obtain the encoded bitstream; decodes the encoded bitstream by using the decoding component 120, to obtain the audio signal; and plays the audio signal by using the audio playing component. It may be understood that the mobile terminal 130 may alternatively include the components included in the mobile terminal 140, and the mobile terminal 140 may alternatively include the components included in the mobile terminal 130.

Figure 5:
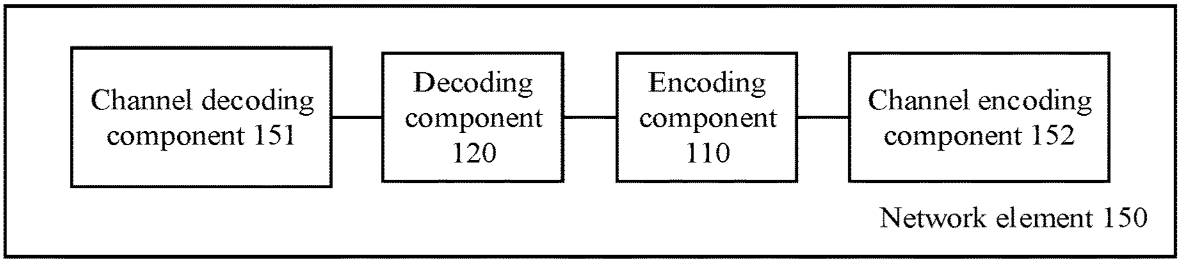
FIG. 5 is a schematic diagram of a network element according to an embodiment of this application.

For example, as shown in FIG. 5, the following example is used for description: The encoding component 110 and the decoding component 120 are disposed in one network element 150 having an audio signal processing capability in a core network or wireless network.

In some embodiments, the network element 150 includes a channel decoding component 151, the decoding component 120, the encoding component 110, and a channel encoding component 152. The channel decoding component 151 is connected to the decoding component 120, the decoding component 120 is connected to the encoding component 110, and the encoding component 110 is connected to the channel encoding component 152.

After receiving a to-be-transmitted signal sent by another device, the channel decoding component 151 decodes the to-be-transmitted signal to obtain a first encoded bitstream; the decoding component 120 decodes the encoded bitstream to obtain an audio signal; the encoding component 110 encodes the audio signal to obtain a second encoded bitstream; and the channel encoding component 152 encodes the second encoded bitstream to obtain the to-be-transmitted signal.

The another device may be a mobile terminal having an audio signal processing capability, or may be another network element having an audio signal processing capability. This is not limited in this embodiment.

In some embodiments, the encoding component 110 and the decoding component 120 in the network element may transcode an encoded bitstream sent by the mobile terminal.

In some embodiments, in this embodiment of this application, a device on which the encoding component 110 is installed may be referred to as an audio encoding device. In actual embodiment, the audio encoding device may also have an audio decoding function. This is not limited in this embodiment of this application.

In some embodiments, this embodiment of this application is described by using only a stereo signal as an example. In this application, the audio encoding device may further process a mono signal or a multi-channel signal, and the multi-channel signal includes at least two channels of signals.

This application provides an audio signal encoding method and apparatus, and an audio signal decoding method and apparatus. Filtering processing is performed on a frequency-domain coefficient of a current frame to obtain a filtering parameter, and filtering processing is performed on the frequency-domain coefficient of the current frame and the reference frequency-domain coefficient based on the filtering parameter, so that bits written into a bitstream can be reduced, and compression efficiency in encoding/decoding can be improved. Therefore, audio signal encoding/decoding efficiency can be improved.

Figure 6:
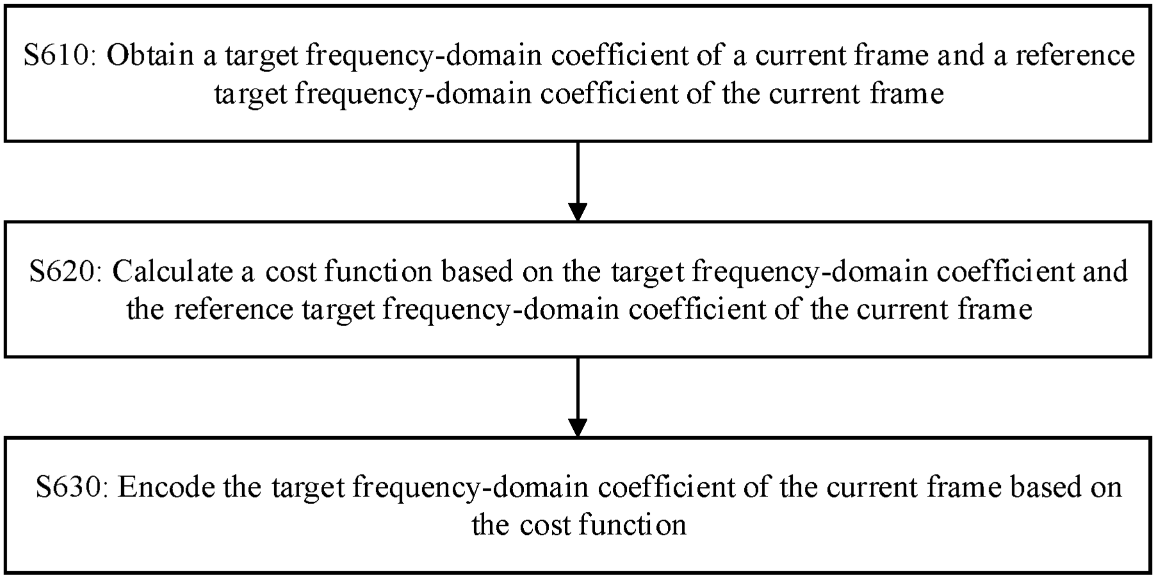
FIG. 6 is a schematic flowchart of an audio signal encoding method according to an embodiment of this application.

FIG. 6 is a schematic flowchart of an audio signal encoding method 600 according to an embodiment of this application. The method 600 may be performed by an encoder side. The encoder side may be an encoder or a device having an audio signal encoding function. The method 600 in some embodiments includes the following operations.

S610: Obtain a target frequency-domain coefficient of a current frame and a reference target frequency-domain coefficient of the current frame.

In some embodiments, the target frequency-domain coefficient and the reference target frequency-domain coefficient of the current frame may be obtained through processing based on a filtering parameter. The filtering parameter may be obtained by performing filtering processing on a frequency-domain coefficient of the current frame. The frequency-domain coefficient of the current frame may be obtained by performing time to frequency domain transform on a time-domain signal of the current frame. The time to frequency domain transform may be MDCT, DCT, FFT, or the like.

The reference target frequency-domain coefficient may be a target frequency-domain coefficient of a reference signal of the current frame.

In some embodiments, the filtering processing may include temporary noise shaping (TNS) processing and/or frequency-domain noise shaping (FDNS) processing, or the filtering processing may include other processing. This is not limited in this embodiment of this application.

S620: Calculate a cost function based on the target frequency-domain coefficient and the reference target frequency-domain coefficient of the current frame.

The cost function may be used to determine whether to perform long-term prediction (LTP) processing on the current frame during encoding of the target frequency-domain coefficient of the current frame.

In some embodiments, the cost function may include at least one of a cost function of a high frequency band, a cost function of a low frequency band, or a cost function of a full frequency band of the current frame.

The high frequency band may be a frequency band whose frequency is greater than that of a cutoff frequency bin and that is of the full frequency band of the current frame, the low frequency band may be a frequency band whose frequency is less than or equal to that of the cutoff frequency bin and that is of the full frequency band of the current frame, and the cutoff frequency bin may be for division into the low frequency band and the high frequency band.

In some embodiments, the cost function may be a predicted gain of a current frequency band of the current frame.

For example, the cost function of the high frequency band may be a predicted gain of the high frequency band, the cost function of the low frequency band may be a predicted gain of the low frequency band, and the cost function of the full frequency band may be a predicted gain of the full frequency band.

Alternatively, the cost function is a ratio of energy of an estimated residual frequency-domain coefficient of a current frequency band of the current frame to energy of a target frequency-domain coefficient of the current frequency band.

The estimated residual frequency-domain coefficient may be a difference between the target frequency-domain coefficient of the current frequency band and a predicted frequency-domain coefficient of the current frequency band, the predicted frequency-domain coefficient may be obtained based on a reference frequency-domain coefficient and the predicted gain of the current frequency band of the current frame, and the current frequency band is the low frequency band, the high frequency band, or the full frequency band.

For example, the predicted frequency-domain coefficient may be a product of the reference frequency-domain coefficient and the predicted gain of the current frequency band of the current frame.

For example, the cost function of the high frequency band may be a ratio of energy of a residual frequency-domain coefficient of the high frequency band to energy of the high frequency band signal, the cost function of the low frequency band may be a ratio of energy of a residual frequency-domain coefficient of the low frequency band to energy of the low frequency band signal, and the cost function of the full frequency band may be a ratio of energy of a residual frequency-domain coefficient of the full frequency band to energy of the full frequency band signal.

In this embodiment of this application, the cutoff frequency bin may be determined in the following two manners:

Manner 1:

The cutoff frequency bin may be determined based on a spectral coefficient of the reference signal.

Further, a peak factor set corresponding to the reference signal may be determined based on the spectral coefficient of the reference signal; and the cutoff frequency bin may be determined based on a peak factor in the peak factor set, where the peak factor satisfies a preset condition.

The preset condition may be a greatest value of (one or more) peak factors in the peak factor set that are greater than a sixth threshold.

For example, the peak factor set corresponding to the reference signal may be determined based on the spectral coefficient of the reference signal; and the greatest value of the (one or more) peak factors in the peak factor set that are greater than the sixth threshold may be used as the cutoff frequency bin.

Manner 2:

The cutoff frequency bin may be a preset value. In some embodiments, the cutoff frequency bin may be preset to the preset value based on experience.

For example, it is assumed that a to-be-processed signal of the current frame is a 48 kHz (Hz) sampling signal, and undergoes 480-point MDCT transform to obtain 480-point MDCT coefficients. In this case, an index of the cutoff frequency bin may be preset to 200, and a cutoff frequency corresponding to the cutoff frequency bin is 10 kHz.

S630: Encode the target frequency-domain coefficient of the current frame based on the cost function.

In some embodiments, an identifier may be determined based on the cost function. Then, the target frequency-domain coefficient of the current frame may be encoded based on the determined identifier.

In some embodiments, based on different values of the determined identifier, the target frequency-domain coefficient of the current frame may be encoded in the following two manners:

Manner 1:

In some embodiments, a first identifier and/or a second identifier may be determined based on the cost function, and the target frequency-domain coefficient of the current frame may be encoded based on the first identifier and/or the second identifier.

The first identifier may be used to indicate whether to perform LTP processing on the current frame, and the second identifier may be used to indicate a frequency band on which LTP processing is to be performed and that is of the current frame.

In some embodiments, in Manner 1, the first identifier and the second identifier may have different values, and these different values may represent different meanings.

For example, the first identifier may be a first value or a second value, and the second identifier may be a third value or a fourth value.

The first value may be 1, which indicates to perform LTP processing on the current frame. The second value may be 0, which indicates not to perform LTP processing on the current frame. The third value may be 2, which indicates to perform LTP processing on the full frequency band. The fourth value may be 3, which indicates to perform LTP processing on the low frequency band.

It should be noted that the foregoing values of the first identifier and the second identifier in the foregoing embodiment are merely examples rather than limitations.

Further, based on different determined first identifiers and/or second identifiers, there may be the following several cases:

Case 1:

When the cost function of the low frequency band satisfies a first condition and the cost function of the high frequency band does not satisfy a second condition, it may be determined that the first identifier is the first value and the second identifier is the fourth value.

In this case, LTP processing may be performed on the low frequency band of the current frame based on the second identifier to obtain the residual frequency-domain coefficient of the low frequency band. Then, the residual frequency-domain coefficient of the low frequency band and a target frequency-domain coefficient of the high frequency band may be encoded, and a value of the first identifier and a value of the second identifier are written into a bitstream.

Case 2:

When the cost function of the low frequency band satisfies the first condition and the cost function of the high frequency band satisfies the second condition, it may be determined that the first identifier is the first value and the second identifier is the third value.

In this case, LTP processing may be performed on the full frequency band of the current frame based on the second identifier to obtain the residual frequency-domain coefficient of the full frequency band. Then, the residual frequency-domain coefficient of the full frequency band may be encoded, and a value of the first identifier and a value of the second identifier are written into a bitstream.

Case 3:

When the cost function of the low frequency band does not satisfy the first condition, it may be determined that the first identifier is the second value.

In this case, the target frequency-domain coefficient of the current frame may be encoded (instead of encoding the residual frequency-domain coefficient of the current frame after the residual frequency-domain coefficient of the current frame is obtained by performing LTP processing on the current frame), and a value of the first identifier is written into a bitstream.

Case 4:

When the cost function of the low frequency band satisfies the first condition and the cost function of the full frequency band does not satisfy a third condition, it may be determined that the first identifier is the second value.

In this case, the target frequency-domain coefficient of the current frame may be encoded, and a value of the first identifier is written into a bitstream.

Case 5:

When the cost function of the full frequency band satisfies the third condition, it may be determined that the first identifier is the first value and the second identifier is the third value.

In this case, LTP processing may be performed on the full frequency band of the current frame based on the second identifier to obtain the residual frequency-domain coefficient of the full frequency band. Then, the residual frequency-domain coefficient of the full frequency band may be encoded, and a value of the first identifier and a value of the second identifier are written into a bitstream.

In Manner 1, when the cost function is defined differently, the first condition, the second condition, or the third condition may also be different.

For example, when the cost function is the predicted gain of the current frequency band of the current frame, the first condition may be that the cost function of the low frequency band is greater than or equal to a first threshold, the second condition may be that the cost function of the high frequency band is greater than or equal to a second threshold, and the third condition may be that the cost function of the full frequency band is greater than or equal to the third threshold.

For another example, when the cost function is the difference between the target frequency-domain coefficient of the current frequency band and the predicted frequency-domain coefficient of the current frequency band, the first condition may be that the cost function of the low frequency band is less than a fourth threshold, the second condition may be that the cost function of the high frequency band is less than the fourth threshold, and the third condition may be that the cost function of the full frequency band is greater than or equal to a fifth threshold.

The first threshold, the second threshold, the third threshold, the fourth threshold, and the fifth threshold may be all preset to 0.5.

Alternatively, the first threshold may be preset to 0.45, the second threshold may be preset to 0.5, the third threshold may be preset to 0.55, the fourth threshold may be preset to 0.6, and the fifth threshold may be preset to 0.65.

Alternatively, the first threshold may be preset to 0.4, the second threshold may be preset to 0.4, the third threshold may be preset to 0.5, the fourth threshold may be preset to 0.6, and the fifth threshold may be preset to 0.7.

It should be understood that the values in the foregoing embodiment are merely examples rather than limitations. The first threshold, the second threshold, the third threshold, the fourth threshold, and the fifth threshold may be all preset based on experience (or with reference to actual situations). This is not limited in this embodiment of this application.

Manner 2:

In some embodiments, a first identifier may be determined based on the cost function; and the target frequency-domain coefficient of the current frame may be encoded based on the first identifier.

The first identifier may be used to indicate whether to perform LTP processing on the current frame, or the first identifier may be used to indicate whether to perform LTP processing on the current frame and indicate a frequency band on which LTP processing is to be performed and that is of the current frame.

In some embodiments, in Manner 2, the first identifier may alternatively have different values, and these different values may also represent different meanings.

For example, the first identifier may be a first value or a second value, and the second identifier may be a third value or a fourth value.

The first value may be 1, which indicates (to perform LTP processing on the current frame and) to perform LTP processing on the low frequency band. The second value may be 0, which indicates not to perform LTP processing on the current frame. The third value may be 2, which indicates (to perform LTP processing on the current frame and) to perform LTP processing on the full frequency band.

It should be noted that the foregoing values of the first identifier in the foregoing embodiment are merely examples rather than limitations.

Further, based on different determined first identifiers, there may be the following several cases:

Case 1:

When the cost function of the low frequency band satisfies a first condition and the cost function of the high frequency band does not satisfy a second condition, it may be determined that the first identifier is the first value.

In this case, LTP processing may be performed on the low frequency band of the current frame based on the first identifier to obtain the residual frequency-domain coefficient of the low frequency band. Then, the residual frequency-domain coefficient of the low frequency band and a target frequency-domain coefficient of the high frequency band may be encoded, and a value of the first identifier is written into a bitstream.

Case 2:

When the cost function of the low frequency band satisfies the first condition and the cost function of the high frequency band satisfies the second condition, it may be determined that the first identifier is the third value.

In this case, LTP processing may be performed on the full frequency band of the current frame based on the first identifier to obtain the residual frequency-domain coefficient of the full frequency band. Then, the residual frequency-domain coefficient of the full frequency band may be encoded, and a value of the first identifier is written into a bitstream.

Case 3:

When the cost function of the low frequency band does not satisfy the first condition, it may be determined that the first identifier is the second value.

In this case, the target frequency-domain coefficient of the current frame may be encoded, and a value of the first identifier is written into a bitstream.

Case 4:

When the cost function of the low frequency band satisfies the first condition and the cost function of the full frequency band does not satisfy a third condition, it may be determined that the first identifier is the second value.

In this case, the target frequency-domain coefficient of the current frame may be encoded (instead of encoding the residual frequency-domain coefficient of the current frame after the residual frequency-domain coefficient of the current frame is obtained by performing LTP processing on the current frame), and a value of the first identifier is written into a bitstream.

Case 5:

When the cost function of the full frequency band satisfies the third condition, it may be determined that the first identifier is the third value.

In this case, LTP processing may be performed on the full frequency band of the current frame based on the first identifier to obtain the residual frequency-domain coefficient of the full frequency band. Then, the residual frequency-domain coefficient of the full frequency band may be encoded, and a value of the first identifier is written into a bitstream.

In Manner 2, when the cost function is defined differently, the first condition, the second condition, or the third condition may also be different.

For example, when the cost function is the predicted gain of the current frequency band of the current frame, the first condition may be that the cost function of the low frequency band is greater than or equal to a first threshold, the second condition may be that the cost function of the high frequency band is greater than or equal to a second threshold, and the third condition may be that the cost function of the full frequency band is greater than or equal to the third threshold.

For another example, when the cost function is the difference between the target frequency-domain coefficient of the current frequency band and the predicted frequency-domain coefficient of the current frequency band, the first condition may be that the cost function of the low frequency band is less than a fourth threshold, the second condition may be that the cost function of the high frequency band is less than the fourth threshold, and the third condition may be that the cost function of the full frequency band is greater than or equal to a fifth threshold.

The first threshold, the second threshold, the third threshold, the fourth threshold, and the fifth threshold are all preset to 0.5.

Alternatively, the first threshold may be preset to 0.45, the second threshold may be preset to 0.5, the third threshold may be preset to 0.55, the fourth threshold may be preset to 0.6, and the fifth threshold may be preset to 0.65.

Alternatively, the first threshold may be preset to 0.4, the second threshold may be preset to 0.4, the third threshold may be preset to 0.5, the fourth threshold may be preset to 0.6, and the fifth threshold may be preset to 0.7.

It should be understood that the values in the foregoing embodiment are merely examples rather than limitations. The first threshold, the second threshold, the third threshold, the fourth threshold, and the fifth threshold may be all preset based on experience (or with reference to actual situations). This is not limited in this embodiment of this application.

Figure 7:
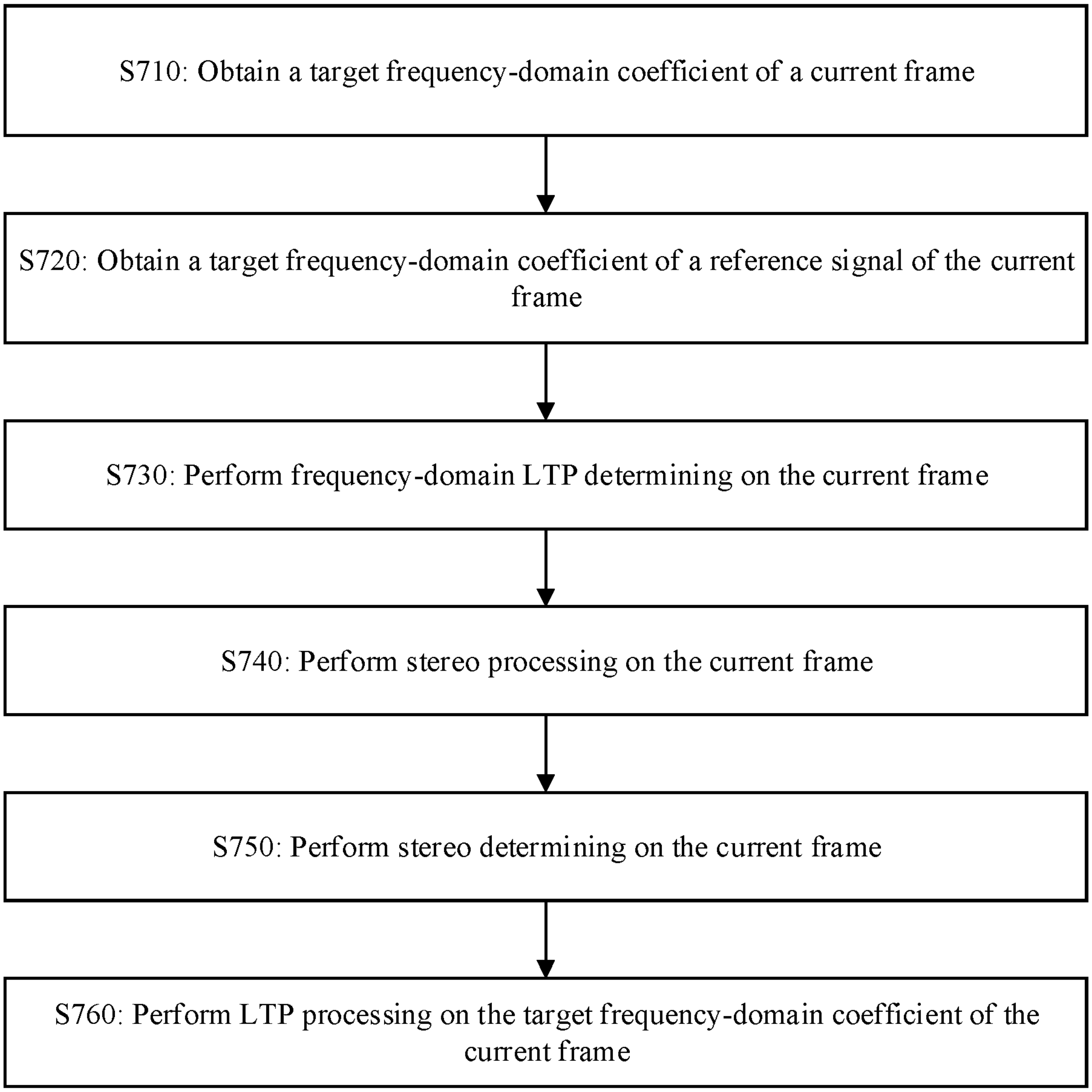
FIG. 7 is a schematic flowchart of an audio signal encoding method according to another embodiment of this application.

With reference to FIG. 7, the following describes a detailed process of an audio signal encoding method in an embodiment of this application by using a stereo signal (that is, a current frame includes a left channel signal and a right channel signal) as an example.

It should be understood that the embodiment shown in FIG. 7 is merely an example rather than a limitation. An audio signal in this embodiment of this application may alternatively be a mono signal or a multi-channel signal. This is not limited in this embodiment of this application.

FIG. 7 is a schematic flowchart of the audio signal encoding method 700 according to this embodiment of this application. The method 700 may be performed by an encoder side. The encoder side may be an encoder or a device having an audio signal encoding function. The method 700 in some embodiments includes the following operations.

S710: Obtain a target frequency-domain coefficient of a current frame.

In some embodiments, a left channel signal and a right channel signal of the current frame may be converted from a time domain to a frequency domain through MDCT transform to obtain an MDCT coefficient of the left channel signal and an MDCT coefficient of the right channel signal, that is, a frequency-domain coefficient of the left channel signal and a frequency-domain coefficient of the right channel signal.

Then, TNS processing may be performed on a frequency-domain coefficient of the current frame to obtain a linear prediction coding (linear prediction coding, LPC) coefficient (that is, a TNS parameter), so as to achieve an objective of performing noise shaping on the current frame. The TNS processing is to perform LPC analysis on the frequency-domain coefficient of the current frame. For a specific LPC analysis method, refer to a conventional technology. Details are not described herein.

In addition, because TNS processing is not suitable for all frames of signals, a TNS identifier may be further used to indicate whether to perform TNS processing on the current frame. For example, when the TNS identifier is 0, no TNS processing is performed on the current frame. When the TNS identifier is 1, TNS processing is performed on the frequency-domain coefficient of the current frame by using the obtained LPC coefficient, to obtain a processed frequency-domain coefficient of the current frame. The TNS identifier is obtained through calculation based on input signals (that is, the left channel signal and the right channel signal of the current frame) of the current frame. For a specific method, refer to the conventional technology. Details are not described herein.

Then, FDNS processing may be further performed on the processed frequency-domain coefficient of the current frame to obtain a time-domain LPC coefficient. Then, the time-domain LPC coefficient is converted to a frequency domain to obtain a frequency-domain FDNS parameter. The FDNS processing belongs to a frequency-domain noise shaping technology. In an embodiment, an energy spectrum of the processed frequency-domain coefficient of the current frame is calculated, an autocorrelation coefficient is obtained based on the energy spectrum, the time-domain LPC coefficient is obtained based on the autocorrelation coefficient, and the time-domain LPC coefficient is then converted to the frequency domain to obtain the frequency-domain FDNS parameter. For a specific FDNS processing method, refer to the conventional technology. Details are not described herein.

It should be noted that an order of performing TNS processing and FDNS processing is not limited in this embodiment of this application. For example, alternatively, FDNS processing may be performed on the frequency-domain coefficient of the current frame before TNS processing. This is not limited in this embodiment of this application.

In this embodiment of this application, for ease of understanding, the TNS parameter and the FDNS parameter may also be referred to as filtering parameters, and the TNS processing and the FDNS processing may also be referred to as filtering processing.

In this case, the frequency-domain coefficient of the current frame may be processed based on the TNS parameter and the FDNS parameter, to obtain the target frequency-domain coefficient of the current frame.

For ease of description, in this embodiment of this application, the target frequency-domain coefficient of the current frame may be expressed as X[k]. The target frequency-domain coefficient of the current frame may include a target frequency-domain coefficient of the left channel signal and a target frequency-domain coefficient of the right channel signal. The target frequency-domain coefficient of the left channel signal may be expressed as $X_L[k]$, and the target frequency-domain coefficient of the right channel signal may be expressed as $X_R[k]$, where k=0, 1, . . . , W, both k and W are positive integers, 0≤k≤W, and W may represent a quantity of points on which MDCT transform needs to be performed (or W may represent a quantity of MDCT coefficients that need to be encoded).

S720: Obtain a reference target frequency-domain coefficient of the current frame.

In some embodiments, an optimal pitch period may be obtained by searching pitch periods, and a reference signal ref[j] of the current frame is obtained from a history buffer based on the optimal pitch period. Any pitch period searching method may be used to search the pitch periods. This is not limited in this embodiment of this application.

$$\mathrm{ref}[j]=syn[L-N-K+j],\ j=0,1,\ldots,N-1$$

A history buffer signal syn stores a synthesized time-domain signal obtained through inverse MDCT transform, a length satisfies L=2N, N represents a frame length, and K represents a pitch period.

For the history buffer signal syn, an arithmetic-coded residual signal is decoded, LTP synthesis is performed, inverse TNS processing and inverse FDNS processing are performed based on the TNS parameter and the FDNS parameter that are obtained in S710, inverse MDCT transform is then performed to obtain a synthesized time-domain signal. The synthesized time-domain signal is stored in the history buffer SYn. Inverse TNS processing is an inverse operation of TNS processing (filtering), to obtain a signal that has not undergone TNS processing. Inverse FDNS processing is an inverse operation of FDNS processing (filtering), to obtain a signal that has not undergone FDNS processing. For specific methods for performing inverse TNS processing and inverse FDNS processing, refer to the conventional technology. Details are not described herein.

In some embodiments, MDCT transform is performed on the reference signal ref[j], and filtering processing is performed on a frequency-domain coefficient of the reference signal ref[j] based on the filtering parameter (obtained after the frequency-domain coefficient X[k] of the current frame is analyzed) obtained in S710.

First, TNS processing may be performed on an MDCT coefficient of the reference signal ref[j] based on the TNS identifier and the TNS parameter (obtained after the frequency-domain coefficient X[k] of the current frame is analyzed) obtained in S710, to obtain a TNS-processed reference frequency-domain coefficient.

For example, when the TNS identifier is 1, TNS processing is performed on the MDCT coefficient of the reference signal based on the TNS parameter.

Then, FDNS processing may be performed on the TNS-processed reference frequency-domain coefficient based on the FDNS parameter (obtained after the frequency-domain coefficient X[k] of the current frame is analyzed) obtained in S710, to obtain an FDNS-processed reference frequency-domain coefficient, that is, the reference target frequency-domain coefficient $X_{ref}[k]$.

It should be noted that an order of performing TNS processing and FDNS processing is not limited in this embodiment of this application. For example, alternatively, FDNS processing may be performed on the reference frequency-domain coefficient (that is, the MDCT coefficient of the reference signal) before TNS processing. This is not limited in this embodiment of this application.

S730: Perform frequency-domain LTP determining on the current frame.

In some embodiments, an LTP-predicted gain of the current frame may be calculated based on the target frequency-domain coefficient X[k] and the reference target frequency-domain coefficient $X_{ref}[k]$ of the current frame.

For example, the following formula may be used to calculate an LTP-predicted gain of the left channel signal (or the right channel signal) of the current frame:

$$g_i = \frac{\sum_{k=0}^{M-1} X_{ref}[k] * X[k]}{\sum_{k=0}^{M-1} X_{ref}[k] * X_{ref}[k]}$$

$g_i$ may represent an LTP-predicted gain of an $i^{th}$ subframe of the left channel signal (or the right channel signal), M represents a quantity of MDCT coefficients participating in LTP processing, k is a positive integer, and 0≤k≤M. It should be noted that, in this embodiment of this application, a part of frames may be divided into several subframes, and a part of frames have only one subframe. For ease of description, the $i^{th}$ subframe is used for description herein. When there is only one subframe, i is equal to 0.

In some embodiments, the LTP identifier of the current frame may be determined based on the LTP-predicted gain of the current frame. The LTP identifier may be used to indicate whether to perform LTP processing on the current frame.

It should be noted that when the current frame includes the left channel signal and the right channel signal, the LTP identifier of the current frame may be used for indication in the following two manners.

Manner 1:

The LTP identifier of the current frame may be used to indicate whether to perform LTP processing on the current frame.

The LTP identifier may further include the first identifier and/or the second identifier described in the embodiment of the method 600 in FIG. 6.

For example, the LTP identifier may include the first identifier and the second identifier. The first identifier may be used to indicate whether to perform LTP processing on the current frame, and the second identifier may be used to indicate a frequency band on which LTP processing is to be performed and that is of the current frame.

For another example, the LTP identifier may be the first identifier. The first identifier may be used to indicate whether to perform LTP processing on the current frame. In addition, when LTP processing is performed on the current frame, the first identifier may further indicate a frequency band (for example, a high frequency band, a low frequency band, or a full frequency band of the current frame) on which LTP processing is performed and that is of the current frame.

Manner 2:

The LTP identifier of the current frame may include an LTP identifier of a left channel and an LTP identifier of a right channel. The LTP identifier of the left channel may be used to indicate whether to perform LTP processing on the left channel signal, and the LTP identifier of the right channel may be used to indicate whether to perform LTP processing on the right channel signal.

Further, as described in the embodiment of the method 600 in FIG. 6, the LTP identifier of the left channel may include a first identifier of the left channel and/or a second identifier of the left channel, and the LTP identifier of the right channel may include a first identifier of the right channel and/or a second identifier of the right channel.

The following provides description by using the LTP identifier of the left channel as an example. The LTP identifier of the right channel is similar to the LTP identifier of the left channel. Details are not described herein.

For example, the LTP identifier of the left channel may include the first identifier of the left channel and the second identifier of the left channel. The first identifier of the left channel may be used to indicate whether to perform LTP processing on the left channel, and the second identifier may be used to indicate a frequency band on which LTP processing is performed and that is of the left channel.

For another example, the LTP identifier of the left channel may be the first identifier of the left channel. The first identifier of the left channel may be used to indicate whether to perform LTP processing on the left channel. In addition, when LTP processing is performed on the left channel, the first identifier of the left channel may further indicate a frequency band (for example, a high frequency band, a low frequency band, or a full frequency band of the left channel) on which LTP processing is performed and that is of the left channel.

For specific description of the first identifier and the second identifier in the foregoing two manners, refer to the embodiment in FIG. 6. Details are not described herein again.

In the embodiment of the method 700, the LTP identifier of the current frame may be used for indication in Manner 1. It should be understood that the embodiment of the method 700 is merely an example rather than a limitation. The LTP identifier of the current frame in the method 700 may alternatively be used for indication in Manner 2. This is not limited in this embodiment of this application.

For example, in the method 700, an LTP-predicted gain may be calculated for each of subframes of the left channel and the right channel of the current frame. If a frequency-domain predicted gain $g_i$ of any subframe is less than a preset threshold, the LTP identifier of the current frame may be set to 0, that is, an LTP module is disabled for the current frame. In this case, the target frequency-domain coefficient of the current frame may be encoded. Otherwise, if a frequency-domain predicted gain of each subframe of the current frame is greater than the preset threshold, the LTP identifier of the current frame may be set to 1, that is, an LTP module is enabled for the current frame. In this case, the following S740 continues to be performed.

The preset threshold may be set with reference to an actual situation. For example, the preset threshold may be set to 0.5, 0.4, or 0.6.

In this embodiment of this application, bandwidth of the current frame may be categorized into a high frequency band, a low frequency band, and a full frequency band.

In some embodiments, a cost function of the left channel signal (and/or the right channel signal) may be calculated; whether to perform LTP processing on the current frame is determined based on the cost function; and when LTP processing is performed on the current frame, LTP processing is performed on at least one of the high frequency band, the low frequency band, or the full frequency band of the current frame based on the cost function to obtain a residual frequency-domain coefficient of the current frame.

For example, when LTP processing is performed on the high frequency band, a residual frequency-domain coefficient of the high frequency band may be obtained. When LTP processing is performed on the low frequency band, a residual frequency-domain coefficient of the low frequency band may be obtained. When LTP processing is performed on the full frequency band, a residual frequency-domain coefficient of the full frequency band may be obtained.

The cost function may include a cost function of the high frequency band, a cost function of the low frequency band, and/or a cost function of the full frequency band of the current frame. The high frequency band may be a frequency band whose frequency is greater than that of a cutoff frequency bin and that is of the full frequency band of the current frame, the low frequency band may be a frequency band whose frequency is less than or equal to the cutoff frequency bin and that is of the full frequency band of the current frame, and the cutoff frequency bin may be used for division into the low frequency band and the high frequency band.

In this embodiment of this application, the cutoff frequency bin may be determined in the following two manners:

Manner 1:

The cutoff frequency bin may be determined based on a spectral coefficient of the reference signal.

In some embodiments, a peak factor set corresponding to the reference signal may be determined based on the spectral coefficient of the reference signal; and the cutoff frequency bin may be determined based on a peak factor in the peak factor set, where the peak factor satisfies a preset condition.

Further, the peak factor set corresponding to the reference signal may be determined based on the spectral coefficient of the reference signal; and a greatest value of peak factors in the peak factor set that satisfy a preset condition may be used as the cutoff frequency bin.

The preset condition may be a greatest value of (one or more) peak factors in the peak factor set that are greater than a sixth threshold.

For example, the peak factor set may be calculated based on the following formula:

$$CF_p = \frac{X_{ref}[p]}{\sum_{k=p-w}^{k=p+w} X_{ref}[k]},\ p \in P$$

$$P = \arg_k\{((X_{ref}[k] > X_{ref}[k-1]) \text{ and } (X_{ref}[k] > X_{ref}[k=1])) > 0,\ k = 0, 1, M-1\}$$

$CF_p$ represents the peak factor set, P represents a set of values k that satisfy a condition, w represents a size of a sliding window, and p represents an element in the set P.

In this case, an index value stopLine of a cutoff frequency bin coefficient of a low-frequency MDCT coefficient may be determined based on the following formula:

$$\text{stopLine} = \max\{p \mid CF_p > thr6, p \in P\}$$

thr6 represents the sixth threshold.

Manner 2:

The cutoff frequency bin may be a preset value. In some embodiments, the cutoff frequency bin may be preset to the preset value based on experience.

For example, it is assumed that a to-be-processed signal of the current frame is a 48 kHz (Hz) sampling signal, and undergoes 480-point MDCT transform to obtain 480-point MDCT coefficients. In this case, an index of the cutoff frequency bin may be preset to 200, and a cutoff frequency corresponding to the cutoff frequency bin is 10 kHz.

The following provides description by using the left channel signal as an example. In other words, the following description is not limited to the left channel signal or the right channel signal. In this embodiment of this application, a method for processing the left channel signal is the same as a method for processing the right channel signal.

At least one of the cost function of the high frequency band, the cost function of the low frequency band, and the cost function of the full frequency band of the current frame may be calculated.

In some embodiments, the cost function may be calculated by using the following two methods:

Method 1:

In some embodiments, the cost function may be a predicted gain of a current frequency band of the current frame.

For example, the cost function of the high frequency band may be a predicted gain of the high frequency band, the cost function of the low frequency band may be a predicted gain of the low frequency band, and the cost function of the full frequency band may be a predicted gain of the full frequency band.

For example, the cost function may be calculated based on the following formula:

$$g_{LFi} = \frac{\sum_{k=0}^{k=stopLine-1} X_{ref}[k] * X[k]}{\sum_{k=0}^{k=stopLine-1} X_{ref}[k] * X_{ref}[k]}$$

$$g_{HFi} = \frac{\sum_{k=stopLine}^{k=M-1} X_{ref}[k] * X[k]}{\sum_{k=stopLine}^{k=M-1} X_{ref}[k] * X_{ref}[k]}$$

$$g_{FBi} = \frac{\sum_{k=0}^{k=M-1} X_{ref}[k] * X[k]}{\sum_{k=0}^{k=M-1} X_{ref}[k] * X_{ref}[k]}$$

X[k] represents a target frequency-domain coefficient of the current frame, $X_{ref}[k]$ represents the reference target frequency-domain coefficient, stopLine represents the index value of the cutoff frequency bin coefficient of the low-frequency MDCT coefficient, stopLine=M/2, $g_{LFi}$ represents a predicted gain of a low frequency band of an $i^{th}$ subframe, $g_{HFi}$ represents a predicted gain of a high frequency band of the $i^{th}$ subframe, $g_{FBi}$ represents a predicted gain of a full frequency band of the $i^{th}$ subframe, M represents a quantity of MDCT coefficients participating in LTP processing, k is a positive integer, and 0≤k≤M.

Method 2:

In some embodiments, the cost function is a ratio of energy of an estimated residual frequency-domain coefficient of a current frequency band of the current frame to energy of a target frequency-domain coefficient of the current frequency band.

The estimated residual frequency-domain coefficient may be a difference between the target frequency-domain coefficient of the current frequency band and a predicted frequency-domain coefficient of the current frequency band, the predicted frequency-domain coefficient may be obtained based on a reference frequency-domain coefficient and the predicted gain of the current frequency band of the current frame, and the current frequency band is the low frequency band, the high frequency band, or the full frequency band.

For example, the predicted frequency-domain coefficient may be a product of the reference frequency-domain coefficient and the predicted gain of the current frequency band of the current frame.

For example, the cost function of the high frequency band may be a ratio of energy of a residual frequency-domain coefficient of the high frequency band to energy of the high frequency band signal, the cost function of the low frequency band may be a ratio of energy of a residual frequency-domain coefficient of the low frequency band to energy of the low frequency band signal, and the cost function of the full frequency band may be a ratio of energy of a residual frequency-domain coefficient of the full frequency band to energy of the full frequency band signal.

For example, the cost function may be calculated based on the following formula:

$$r_{LFi} = \frac{\sum_{k=0}^{k=stopLine-1} (X[k] - g_{LFi} * X_{ref}[k])^2}{\sum_{k=0}^{k=stopLine-1} X[k] * X[k]}$$

$$r_{HFi} = \frac{\sum_{k=stopLine}^{k=M-1} (X[k] - g_{LFi} * X_{ref}[k])^2}{\sum_{k=stopLine}^{k=M-1} X[k] * X[k]}$$

$$r_{FBi} = \frac{\sum_{k=0}^{k=M-1} (X[k] - g_{FBi} * X_{ref}[k])^2}{\sum_{k=0}^{k=M-1} X[k] * X[k]}$$

$r_{HFi}$ represents the ratio of the energy of the residual frequency-domain coefficient of the high frequency band to the energy of the high frequency band signal, $r_{LFi}$ represents the ratio of the energy of the residual frequency-domain coefficient of the low frequency band to the energy of the low frequency band signal, $r_{FBi}$ represents the ratio of the energy of the residual frequency-domain coefficient of the full frequency band to the energy of the full frequency band signal, stopLine represents an index value of a cutoff frequency bin coefficient of the low-frequency MDCT coefficient, stopLine=M/2, $g_{LFi}$ represents a predicted gain of a low frequency band of an it subframe, $g_{HFi}$ represents a predicted gain of a high frequency band of the $i^{th}$ subframe, $g_{FBi}$ represents a predicted gain of a full frequency band of the $i^{th}$ subframe, M represents a quantity of MDCT coefficients participating in LTP processing, k is a positive integer, and 0≤k≤M.

Further, the first identifier and/or the second identifier may be determined based on the cost function.

In some embodiments, based on different determined identifiers, the target frequency-domain coefficient of the current frame may be encoded in the following two manners:

Manner 1:

In some embodiments, the first identifier and/or the second identifier may be determined based on the cost function, and the target frequency-domain coefficient of the current frame may be encoded based on the first identifier and/or the second identifier.

The first identifier may be used to indicate whether to perform LTP processing on the current frame, and the second identifier may be used to indicate a frequency band on which LTP processing is to be performed and that is of the current frame.

In some embodiments, in Manner 1, the first identifier and the second identifier may have different values, and these different values may represent different meanings.

For example, the first identifier may be a first value or a second value, and the second identifier may be a third value or a fourth value.

The first value may be used to indicate to perform LTP processing on the current frame, the second value may be used to indicate not to perform LTP processing on the current frame, the third value may be used to indicate to perform LTP processing on the full frequency band, and the fourth value may be used to indicate to perform LTP processing on the low frequency band.

For example, the first value may be 1, the second value may be 0, the third value may be 2, and the fourth value may be 3.

It should be noted that the foregoing values of the first identifier and the second identifier in the foregoing embodiment are merely examples rather than limitations.

Further, based on different determined first identifiers and/or second identifiers, there may be the following several cases:

Case 1:

When the cost function of the low frequency band satisfies a first condition and the cost function of the high frequency band does not satisfy a second condition, the first identifier may be the first value, and the second identifier may be the fourth value.

Case 2:

When the cost function of the low frequency band satisfies the first condition and the cost function of the high frequency band satisfies the second condition, the first identifier may be the first value, and the second identifier may be the third value.

Case 3:

When the cost function of the low frequency band does not satisfy the first condition, the first identifier may be the second value.

Case 4:

When the cost function of the low frequency band satisfies the first condition and the cost function of the full frequency band does not satisfy a third condition, the first identifier may be the second value.

Case 5:

When the cost function of the full frequency band satisfies the third condition, the first identifier may be the first value, and the second identifier may be the third value.

In Manner 1, when the cost function is defined differently, the first condition, the second condition, or the third condition may also be different.

For example, when the cost function is the predicted gain of the current frequency band of the current frame, the first condition may be that the cost function of the low frequency band is greater than or equal to a first threshold, the second condition may be that the cost function of the high frequency band is greater than or equal to a second threshold, and the third condition may be that the cost function of the full frequency band is greater than or equal to the third threshold.

For another example, when the cost function is the ratio of the energy of the estimated residual frequency-domain coefficient of the current frequency band of the current frame to the energy of the target frequency-domain coefficient of the current frequency band, the first condition may be that the cost function of the low frequency band is less than a fourth threshold, the second condition may be that the cost function of the high frequency band is less than the fourth threshold, and the third condition may be that the cost function of the full frequency band is greater than or equal to a fifth threshold.

The first threshold, the second threshold, the third threshold, the fourth threshold, and the fifth threshold are all preset to 0.5.

Alternatively, the first threshold may be preset to 0.45, the second threshold may be preset to 0.5, the third threshold may be preset to 0.55, the fourth threshold may be preset to 0.6, and the fifth threshold may be preset to 0.65.

Alternatively, the first threshold may be preset to 0.4, the second threshold may be preset to 0.4, the third threshold may be preset to 0.5, the fourth threshold may be preset to 0.6, and the fifth threshold may be preset to 0.7.

It should be understood that the values in the foregoing embodiment are merely examples rather than limitations. The first threshold, the second threshold, the third threshold, the fourth threshold, and the fifth threshold may be all preset based on experience (or with reference to actual situations). This is not limited in this embodiment of this application.

Manner 2:

In some embodiments, the first identifier may be determined based on the cost function; and the target frequency-domain coefficient of the current frame may be encoded based on the first identifier.

The first identifier may be used to indicate whether to perform LTP processing on the current frame, or the first identifier may be used to indicate whether to perform LTP processing on the current frame and indicate a frequency band on which LTP processing is to be performed and that is of the current frame.

In some embodiments, in Manner 2, the first identifier may alternatively have different values, and these different values may also represent different meanings.

For example, the first identifier may be a first value or a second value, and the second identifier may be a third value or a fourth value.

The first value may be used to indicate (to perform LTP processing on the current frame and) to perform LTP processing on the low frequency band, the second value may be used to indicate not to perform LTP processing on the current frame, and the third value may be used to indicate (to perform LTP processing on the current frame and) to perform LTP processing on the full frequency band.

For example, the first value may be 1, the second value may be 0, and the third value may be 2.

It should be noted that the foregoing values of the first identifier in the foregoing embodiment are merely examples rather than limitations.

Further, based on different determined first identifiers, there may be the following several cases:

Case 1:

When the cost function of the low frequency band satisfies a first condition and the cost function of the high frequency band does not satisfy a second condition, the first identifier may be the first value.

Case 2:

When the cost function of the low frequency band satisfies the first condition and the cost function of the high frequency band satisfies the second condition, the first identifier may be the third value.

Case 3:

When the cost function of the low frequency band does not satisfy the first condition, the first identifier may be the second value.

Case 4:

When the cost function of the low frequency band satisfies the first condition and the cost function of the full frequency band does not satisfy a third condition, the first identifier may be the second value.

Case 5:

When the cost function of the full frequency band satisfies the third condition, the first identifier may be the third value.

In Manner 2, when the cost function is defined differently, the first condition, the second condition, or the third condition may also be different.

For example, when the cost function is the predicted gain of the current frequency band of the current frame, the first condition may be that the cost function of the low frequency band is greater than or equal to a first threshold, the second condition may be that the cost function of the high frequency band is greater than or equal to a second threshold, and the third condition may be that the cost function of the full frequency band is greater than or equal to the third threshold.

For another example, when the cost function is the ratio of the energy of the estimated residual frequency-domain coefficient of the current frequency band of the current frame to the energy of the target frequency-domain coefficient of the current frequency band, the first condition may be that the cost function of the low frequency band is less than a fourth threshold, the second condition may be that the cost function of the high frequency band is less than the fourth threshold, and the third condition may be that the cost function of the full frequency band is greater than or equal to a fifth threshold.

The first threshold, the second threshold, the third threshold, the fourth threshold, and the fifth threshold are all preset to 0.5.

Alternatively, the first threshold may be preset to 0.45, the second threshold may be preset to 0.5, the third threshold may be preset to 0.55, the fourth threshold may be preset to 0.6, and the fifth threshold may be preset to 0.65.

Alternatively, the first threshold may be preset to 0.4, the second threshold may be preset to 0.4, the third threshold may be preset to 0.5, the fourth threshold may be preset to 0.6, and the fifth threshold may be preset to 0.7.

It should be understood that the values in the foregoing embodiment are merely examples rather than limitations. The first threshold, the second threshold, the third threshold, the fourth threshold, and the fifth threshold may be all preset based on experience (or with reference to actual situations). This is not limited in this embodiment of this application.

It should be noted that when the first identifier indicates not to perform LTP processing on the current frame, S740 may continue to be performed, and the target frequency-domain coefficient of the current frame is directly encoded after S740 is performed. Otherwise, S750 may be directly performed (that is, S740 is not performed).

S740: Perform stereo processing on the current frame.

In some embodiments, an intensity level difference (ILD) between the left channel of the current frame and the right channel of the current frame may be calculated.

For example, the ILD between the left channel of the current frame and the right channel of the current frame may be calculated based on the following formula:

$$ILD = \frac{\sqrt{\sum_{k=0}^{M-1} X_L[k]*X_L[k]}}{\sqrt{\sum_{k=0}^{M-1} X_L[k]*X_L[k]} + \sqrt{\sum_{k=0}^{M-1} X_R[k]*X_R[k]}}$$

$X_L[k]$ represents the target frequency-domain coefficient of the left channel signal, $X_R[k]$ represents the target frequency-domain coefficient of the right channel signal, M represents a quantity of MDCT coefficients participating in LTP processing, k is a positive integer, and $0 \le k \le M$.

In some embodiments, energy of the left channel signal and energy of the right channel signal may be adjusted by using the ILD obtained through calculation based on the foregoing formula. A specific adjustment method is as follows:

A ratio of the energy of the left channel signal to the energy of the right channel signal is calculated based on the ILD.

For example, the ratio of the energy of the left channel signal to the energy of the right channel signal may be calculated based on the following formula, and the ratio may be denoted as nrgRatio:

$$nrgRatio = \frac{1}{ILD} - 1$$

If the ratio nrgRatio is greater than 1.0, an MDCT coefficient of the right channel is adjusted based on the following formula:

$$X_{refR}[k] = \frac{X_R[k]}{nrgRatio}$$

$X_{refR}[k]$ on the left of the formula represents an adjusted MDCT coefficient of the right channel, and $X_R[k]$ on the right of the formula represents the unadjusted MDCT coefficient of the right channel.

If nrgRatio is less than 1.0, an MDCT coefficient of the left channel is adjusted based on the following formula:

$$X_{refL}[k] = \frac{X_L[k]}{nrgRatio}$$

X[refL] on the left of the formula represents an adjusted MDCT coefficient of the left channel, and $X_L[k]$ on the right of the formula represents the unadjusted MDCT coefficient of the left channel.

Mid/side stereo (mid/side stereo, MS) signals of the current frame are adjusted based on the adjusted target frequency-domain coefficient $X_{refR}[k]$ of the right channel signal and the adjusted target frequency-domain coefficient $X_{refL}[k]$ of the left channel signal:

$$X_M[k]=(X_{refL}[k]+X_{refR}[k])*2/2$$

$$X_S[k]=(X_{refL}[k]-X_{refR}[k])*2/2$$

$X_M[k]$ represents an M channel of a mid/side stereo signal, $X_S[k]$ represents an S channel of a mid/side stereo signal, $X_{refL}[k]$ represents the adjusted target frequency-domain coefficient of the left channel signal, $X_{refR}[k]$ represents the adjusted target frequency-domain coefficient of the right channel signal, M represents the quantity of MDCT coefficients participating in LTP processing, k is a positive integer, and $0 \le k \le M$.

S750: Perform stereo determining on the current frame.

In some embodiments, scalar quantization and arithmetic coding may be performed on the target frequency-domain coefficient $X_L[k]$ of the left channel signal to obtain a quantity of bits required for quantizing the left channel signal. The quantity of bits required for quantizing the left channel signal may be denoted as bitL.

In some embodiments, scalar quantization and arithmetic coding may also be performed on the target frequency-domain coefficient $X_R[k]$ of the right channel signal to obtain a quantity of bits required for quantizing the right channel signal. The quantity of bits required for quantizing the right channel signal may be denoted as bitR.

In some embodiments, scalar quantization and arithmetic coding may also be performed on the mid/side stereo signal $X_M[k]$ to obtain a quantity of bits required for quantizing $X_M[k]$. The quantity of bits required for quantizing $X_M[k]$ may be denoted as bitM.

In some embodiments, scalar quantization and arithmetic coding may also be performed on the mid/side stereo signal $X_S[k]$ to obtain a quantity of bits required for quantizing $X_S[k]$. The quantity of bits required for quantizing $X_S[k]$ may be denoted as bitS.

For details about the foregoing quantization process and bit estimation process, refer to the conventional technology. Details are not described herein.

In this case, if bitL+bitR is greater than bitM+bitS, a stereo coding identifier stereoMode may be set to 1, to indicate that the stereo signals $X_M[k]$ and $X_S[k]$ need to be encoded during subsequent encoding.

Otherwise, the stereo coding identifier stereoMode may be set to 0, to indicate that $X_L[k]$ and $X_R[k]$ need to be encoded during subsequent encoding.

It should be noted that, in this embodiment of this application, LTP processing may alternatively be performed on the target frequency domain coefficient of the current frame before stereo determining is performed on an LTP-processed left channel signal and an LTP-processed right channel signal of the current frame, that is, S760 is performed before S750.

S760: Perform LTP processing on the target frequency-domain coefficient of the current frame.

In some embodiments, LTP processing may be performed on the target frequency-domain coefficient of the current frame in the following two cases:

Case 1:

If the LTP identifier enableRALTP of the current frame is 1 and the stereo coding identifier stereoMode is 0, LTP processing is separately performed on $X_L[k]$ and $X_R[k]$:

$$X_L[k]=X_L[k]-g_{Li}*X_{refL}[k]$$

$$X_R[k]=X_R[k]-g_{Ri}*X_{refR}[k]$$

$X_L[k]$ on the left of the formula represents an LTP-synthesized residual frequency-domain coefficient of the left channel, $X_L[k]$ on the right of the formula represents the target frequency-domain coefficient of the left channel signal, $X_R[k]$ on the left of the formula represents an LTP-synthesized residual frequency-domain coefficient of the right channel, $X_R[k]$ on the right of the formula represents the target frequency-domain coefficient of the right channel signal, $X_{refL}$ represents a TNS- and FDNS-processed reference signal of the left channel, $X_{refR}$ represents a TNS- and FDNS-processed reference signal of the right channel, $g_{Li}$ may represent an LTP-predicted gain of an $i^{th}$ subframe of the left channel, $g_{Ri}$ may represent an LTP-predicted gain of an $i^{th}$ subframe of the right channel signal, M represents the quantity of MDCT coefficients participating in LTP processing, k is a positive integer, and 0≤k≤M.

Further, in this embodiment of this application, LTP processing may alternatively be performed on at least one of the high frequency band, the low frequency band, or the full frequency band of the current frame based on the first identifier and/or the second identifier determined in the foregoing S730, to obtain the residual frequency-domain coefficient of the current frame.

For example, when LTP processing is performed on the high frequency band, a residual frequency-domain coefficient of the high frequency band may be obtained. When LTP processing is performed on the low frequency band, a residual frequency-domain coefficient of the low frequency band may be obtained. When LTP processing is performed on the full frequency band, a residual frequency-domain coefficient of the full frequency band may be obtained.

The following provides description by using the left channel signal as an example. In other words, the following description is not limited to the left channel signal or the right channel signal. In this embodiment of this application, a method for processing the left channel signal is the same as a method for processing the right channel signal.

For example, when the first identifier and/or the second identifier satisfy or satisfies Case 1 in Manner 1 of encoding the target frequency-domain coefficient of the current frame based on the determined identifier in S730, LTP processing may be performed on a low frequency band based on the following formula:

$$X[k] = \begin{cases} X[k] - g_{LFi} * X_{ref}[k] \\ X[k] \end{cases}$$

$X_{refL}$ represents a reference target frequency-domain coefficient of the left channel, $g_{LFi}$ represents a predicted gain of a low frequency band of the $i^{th}$ subframe of the left channel, stopLine represents the index value of the cutoff frequency bin coefficient of the low-frequency MDCT coefficient, stopLine=M/2, M represents the quantity of MDCT coefficients participating in LTP processing, k is a positive integer, and 0≤k≤M.

When the first identifier and/or the second identifier satisfy or satisfies Case 2 or Case 5 in Manner 1 of encoding the target frequency-domain coefficient of the current frame based on the determined identifier in S730, LTP processing may be performed on a full frequency band based on the following formula:

$$X_L[k]=X_L[k]-g_{FBi}*X_{refL}[k]$$

$X_{refL}$ represents a reference target frequency-domain coefficient of the left channel, $g_{FBi}$ represents a predicted gain of a full frequency band of the $i^{th}$ subframe of the left channel, stopLine represents the index value of the cutoff frequency bin coefficient of the low-frequency MDCT coefficient, stopLine=M/2, M represents the quantity of MDCT coefficients participating in LTP processing, k is a positive integer, and 0≤k≤M.

For another example, when the first identifier satisfies Case 1 in Manner 2 of encoding the target frequency-domain coefficient of the current frame based on the determined identifier in S730, LTP processing may be performed on a low frequency band based on the following formula:

$$X[k] = \begin{cases} X[k] - g_{LFi} * X_{ref}[k] \\ X[k] \end{cases}$$

$X_{refL}$ represents a reference target frequency-domain coefficient of the left channel, $g_{LFi}$ represents a predicted gain of a low frequency band of the $i^{th}$ subframe of the left channel, stopLine represents the index value of the cutoff frequency bin coefficient of the low-frequency MDCT coefficient, stopLine=M/2, M represents the quantity of MDCT coefficients participating in LTP processing, k is a positive integer, and 0≤k≤M.

When the first identifier satisfies Case 2 or Case 5 in Manner 2 of encoding the target frequency-domain coefficient of the current frame based on the determined identifier in S730, LTP processing may be performed on a full frequency band based on the following formula:

$$X_L[k]=X_L[k]-g_{FBi}*X_{refL}[k]$$

$X_{refL}$ represents a reference target frequency-domain coefficient of the left channel, $g_{FBi}$ represents a predicted gain of a full frequency band of the $i^{th}$ subframe of the left channel, stopLine represents the index value of the cutoff frequency bin coefficient of the low-frequency MDCT coefficient, stopLine=M/2, M represents the quantity of MDCT coefficients participating in LTP processing, k is a positive integer, and 0≤k≤M.

Then, arithmetic coding may be performed on LTP-processed $X_L[k]$ and $X_R[k]$ (that is, the residual frequency-domain coefficient $X_L[k]$ of the left channel signal and the residual frequency-domain coefficient $X_R[k]$ of the right channel signal).

Case 2:

If the LTP identifier enableRALTP of the current frame is 1 and the stereo coding identifier stereoMode is 1, LTP processing is separately performed on $X_M[ki]$ and $X_S[k]$:

$$X_M[k]=X_M[k]-g_{Mi}*X_{refM}[k]$$

$$X_S[k]=X_S[k]-g_{Si}*X_{refS}[k]$$

$X_M[k]$ on the left of the formula represents an LTP-synthesized residual frequency-domain coefficient of the M channel, $X_M[k]$ on the right of the formula represents a residual frequency-domain coefficient of the M channel, $X_S[k]$ on the left of the formula represents an LTP-synthesized residual frequency-domain coefficient of the S channel, $X_S[k]$ on the right of the formula represents a residual frequency-domain coefficient of the S channel, $g_{Mi}$ represents an LTP-predicted gain of an $i^{th}$ subframe of the M channel, $g_{Si}$ represents an LTP-predicted gain of an $i^{th}$ subframe of the S channel, M represents the quantity of MDCT coefficients participating in LTP processing, i and k are positive integers, 0≤k≤M, $X_{refM}$ and $X_{refS}$ represent reference signals obtained through mid/side stereo processing. Details are as follows:

$$X_{refM}[k]=(X_{refL}[k]+X_{refR}[k])*\sqrt{2}/2$$

$$X_{refS}[k]=(X_{refL}[k]-X_{refR}[k])*\sqrt{2}/2$$

Further, in this embodiment of this application, LTP processing may alternatively be performed on at least one of the high frequency band, the low frequency band, or the full frequency band of the current frame based on the first identifier and/or the second identifier determined in the foregoing S730, to obtain the residual frequency-domain coefficient of the current frame.

For example, when LTP processing is performed on the high frequency band, a residual frequency-domain coefficient of the high frequency band may be obtained. When LTP processing is performed on the low frequency band, a residual frequency-domain coefficient of the low frequency band may be obtained. When LTP processing is performed on the full frequency band, a residual frequency-domain coefficient of the full frequency band may be obtained.

The following provides description by using an M-channel signal as an example. In other words, the following description is not limited to the M-channel signal or the S-channel signal. In this embodiment of this application, a method for processing the M-channel signal is the same as a method for processing the S-channel signal.

For example, when the first identifier and/or the second identifier satisfy or satisfies Case 1 in Manner 1 of encoding the target frequency-domain coefficient of the current frame based on the determined identifier in S730, LTP processing may be performed on a low frequency band based on the following formula:

$$X[k] = \begin{cases} X[k] - g_{LFi} * X_{refM}[k] \\ X[k] \end{cases}$$

$X_{refM}$ represents a reference target frequency-domain coefficient of the M channel, $g_{LFi}$ represents a predicted gain of a low frequency band of the $i^{th}$ subframe of the M channel, stopLine represents the index value of the cutoff frequency bin coefficient of the low-frequency MDCT coefficient, stopLine=M/2, M represents the quantity of MDCT coefficients participating in LTP processing, k is a positive integer, and 0≤k≤M.

When the first identifier and/or the second identifier satisfy or satisfies Case 2 or Case 5 in Manner 1 of encoding the target frequency-domain coefficient of the current frame based on the determined identifier in S730, LTP processing may be performed on a full frequency band based on the following formula:

$$X_M[k]=X_M[k]-g_{FBi}*X_{refM}[k]$$

$X_{refM}$ represents a reference target frequency-domain coefficient of the M channel, $g_{FBi}$ represents a predicted gain of a full frequency band of the $i^{th}$ subframe of the M channel, stopLine represents the index value of the cutoff frequency bin coefficient of the low-frequency MDCT coefficient, stopLine=M/2, M represents the quantity of MDCT coefficients participating in LTP processing, k is a positive integer, and 0≤k≤M.

For another example, when the first identifier satisfies Case 1 in Manner 2 of encoding the target frequency-domain coefficient of the current frame based on the determined identifier in S730, LTP processing may be performed on a low frequency band based on the following formula:

$$X[k] = \begin{cases} X[k] - g_{LFi} * X_{refM}[k] \\ X[k] \end{cases}$$

$X_{refM}$ represents a reference target frequency-domain coefficient of the M channel, $g_{LFi}$ represents a predicted gain of a low frequency band of the $i^{th}$ subframe of the M channel, stopLine represents the index value of the cutoff frequency bin coefficient of the low-frequency MDCT coefficient, stopLine=M/2, M represents the quantity of MDCT coefficients participating in LTP processing, k is a positive integer, and 0≤k≤M.

When the first identifier satisfies Case 2 or Case 5 in Manner 2 of encoding the target frequency-domain coefficient of the current frame based on the determined identifier in S730, LTP processing may be performed on a full frequency band based on the following formula:

$$X_M[k]=X_M[k]-g_{FBi}*X_{refM}[k]$$

$X_{refM}$ represents a reference target frequency-domain coefficient of the M channel, $g_{FBi}$ represents a predicted gain of a full frequency band of the $i^{th}$ subframe of the M channel, stopLine represents the index value of the cutoff frequency bin coefficient of the low-frequency MDCT coefficient, stopLine=M/2, M represents the quantity of MDCT coefficients participating in LTP processing, k is a positive integer, and 0≤k≤M.

Then, arithmetic coding may be performed on LTP-processed $X_M[k]$ and $X_S[k]$ (that is, the residual frequency-domain coefficient of the current frame).

Figure 8:
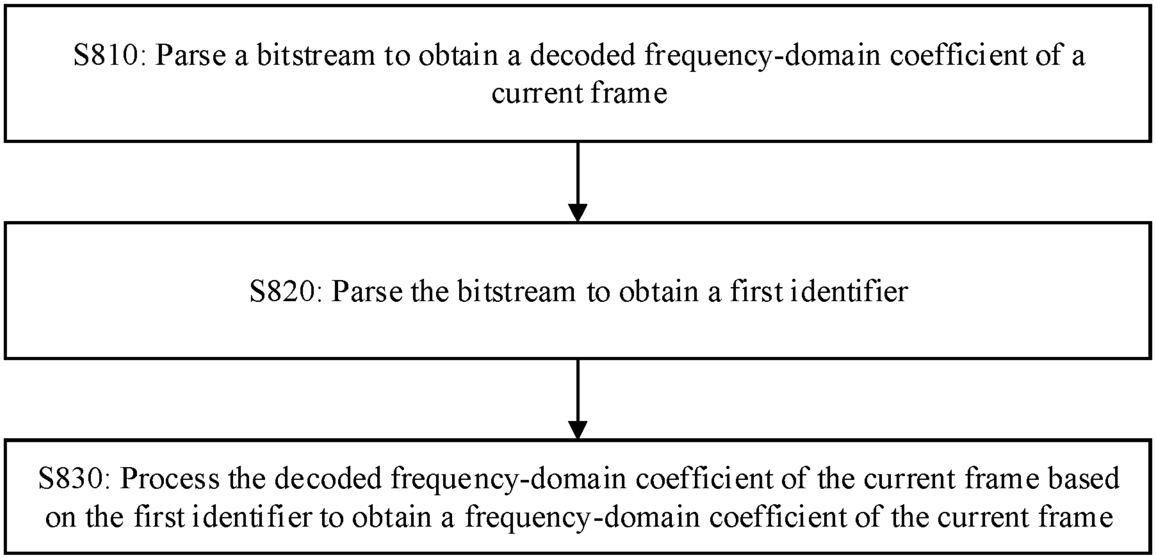
FIG. 8 is a schematic flowchart of an audio signal decoding method according to an embodiment of this application.

FIG. 8 is a schematic flowchart of an audio signal decoding method 800 according to an embodiment of this application. The method 800 may be performed by a decoder side. The decoder side may be a decoder or a device having an audio signal decoding function. The method 800 in some embodiments includes the following operations.

S810: Parse a bitstream to obtain a decoded frequency-domain coefficient of a current frame.

In some embodiments, the bitstream may be further parsed to obtain a filtering parameter.

The filtering parameter may be used to perform filtering processing on a frequency-domain coefficient of the current frame. The filtering processing may include temporary noise shaping (TNS) processing and/or frequency-domain noise shaping (FDNS) processing, or the filtering processing may include other processing. This is not limited in this embodiment of this application.

In some embodiments, in S810, the bitstream may be parsed to obtain a residual frequency-domain coefficient of the current frame.

S820: Parse the bitstream to obtain a first identifier.

The first identifier may be used to indicate whether to perform LTP processing on the current frame, or the first identifier may be used to indicate whether to perform LTP processing on the current frame and/or indicate a frequency band on which LTP processing is to be performed and that is of the current frame.

For example, when the first identifier is a first value, the decoded frequency-domain coefficient of the current frame is the residual frequency-domain coefficient of the current frame. The first value may be used to indicate to perform long-term prediction LTP processing on the current frame.

When the first identifier is a second value, the decoded frequency-domain coefficient of the current frame is a target frequency-domain coefficient of the current frame. The second value may be used to indicate not to perform long-term prediction LTP processing on the current frame.

In some embodiments, the frequency band on which LTP processing is performed and that is of the current frame may include a high frequency band, a low frequency band, or a full frequency band. The high frequency band may be a frequency band whose frequency is greater than that of a cutoff frequency bin and that is of the full frequency band of the current frame, the low frequency band may be a frequency band whose frequency is less than or equal to that of the cutoff frequency bin and that is of the full frequency band of the current frame, and the cutoff frequency bin may be for division into the low frequency band and the high frequency band.

In this embodiment of this application, the cutoff frequency bin may be determined in the following two manners:

Manner 1:

The cutoff frequency bin may be determined based on a spectral coefficient of the reference signal.

Further, a peak factor set corresponding to the reference signal may be determined based on the spectral coefficient of the reference signal; and the cutoff frequency bin may be determined based on a peak factor in the peak factor set, where the peak factor satisfies a preset condition.

The preset condition may be a greatest value of (one or more) peak factors in the peak factor set that are greater than a sixth threshold.

For example, the peak factor set corresponding to the reference signal may be determined based on the spectral coefficient of the reference signal; and the greatest value of the (one or more) peak factors in the peak factor set that are greater than the sixth threshold may be used as the cutoff frequency bin.

Manner 2:

The cutoff frequency bin may be a preset value. In some embodiments, the cutoff frequency bin may be preset to the preset value based on experience.

For example, it is assumed that a to-be-processed signal of the current frame is a 48 kHz (Hz) sampling signal, and undergoes 480-point MDCT transform to obtain 480-point MDCT coefficients. In this case, an index of the cutoff frequency bin may be preset to 200, and a cutoff frequency corresponding to the cutoff frequency bin is 10 kHz.

S830: Process the decoded frequency-domain coefficient of the current frame based on the first identifier to obtain a frequency-domain coefficient of the current frame.

In some embodiments, based on different first identifiers determined in S820, there may be the following two manners:

Manner 1:

In some embodiments, the bitstream may be parsed to obtain the first identifier. When the first identifier is the first value, the bitstream may be parsed to obtain a second identifier.

The second identifier may be used to indicate a frequency band on which LTP processing is to be performed and that is of the current frame.

In some embodiments, in Manner 1, the first identifier and the second identifier may have different values, and these different values may represent different meanings.

For example, the first identifier may be the first value or the second value, and the second identifier may be a third value or a fourth value.

The first value may be 1, which indicates to perform LTP processing on the current frame. The second value may be 0, which indicates not to perform LTP processing on the current frame. The third value may be 2, which indicates to perform LTP processing on the full frequency band. The fourth value may be 3, which indicates to perform LTP processing on the low frequency band.

It should be noted that the foregoing values of the first identifier and the second identifier in the foregoing embodiment are merely examples rather than limitations.

Further, based on different determined first identifiers and/or second identifiers, there may be the following several cases:

Case 1:

When the first identifier is the first value and the second identifier is the fourth value, a reference target frequency-domain coefficient of the current frame is obtained.

Then, LTP synthesis may be performed based on a predicted gain of the low frequency band, the reference target frequency-domain coefficient of the current frame, and the residual frequency-domain coefficient of the current frame to obtain the target frequency-domain coefficient of the current frame; and the target frequency-domain coefficient of the current frame is processed to obtain the frequency-domain coefficient of the current frame.

Case 2:

When the first identifier is the first value and the second identifier is the third value, the reference target frequency-domain coefficient of the current frame is obtained.

Then, LTP synthesis may be performed on a predicted gain of the full frequency band, the reference target frequency-domain coefficient of the current frame, and the residual frequency-domain coefficient of the current frame to obtain the target frequency-domain coefficient of the current frame; and the target frequency-domain coefficient of the current frame is processed to obtain the frequency-domain coefficient of the current frame.

Case 3:

When the first identifier is the second value, the target frequency-domain coefficient of the current frame is processed to obtain the frequency-domain coefficient of the current frame.

The processing (performed on the target frequency-domain coefficient of the current frame) may be inverse filtering processing. The inverse filtering processing may include inverse temporary noise shaping (TNS) processing and/or inverse frequency-domain noise shaping (FDNS) processing, or the inverse filtering processing may include other processing. This is not limited in this embodiment of this application.

Manner 2:

In some embodiments, the bitstream may be parsed to obtain the first identifier.

The first identifier may be used to indicate whether to perform LTP processing on the current frame, or the first identifier may be used to indicate whether to perform LTP processing on the current frame and indicate a frequency band on which LTP processing is to be performed and that is of the current frame.

In some embodiments, in Manner 2, the first identifier may alternatively have different values, and these different values may also represent different meanings.

For example, the first identifier may be the first value or the second value, and the second identifier may be a third value or a fourth value.

The first value may be 1, which indicates (to perform LTP processing on the current frame and) to perform LTP processing on the low frequency band. The second value may be 0, which indicates not to perform LTP processing on the current frame. The third value may be 2, which indicates (to perform LTP processing on the current frame and) to perform LTP processing on the full frequency band.

It should be noted that the foregoing values of the first identifier in the foregoing embodiment are merely examples rather than limitations.

Further, based on different determined first identifiers, there may be the following several cases:

Case 1:

When the first identifier is the first value, a reference target frequency-domain coefficient of the current frame is obtained.

Then, LTP synthesis may be performed on a predicted gain of the low frequency band, the reference target frequency-domain coefficient of the current frame, and the residual frequency-domain coefficient of the current frame to obtain the target frequency-domain coefficient of the current frame; and the target frequency-domain coefficient of the current frame is processed to obtain the frequency-domain coefficient of the current frame.

Case 2:

When the first identifier is the third value, the reference target frequency-domain coefficient of the current frame is obtained.

Then, LTP synthesis may be performed on a predicted gain of the full frequency band, the reference target frequency-domain coefficient of the current frame, and the residual frequency-domain coefficient of the current frame to obtain the target frequency-domain coefficient of the current frame; and the target frequency-domain coefficient of the current frame is processed to obtain the frequency-domain coefficient of the current frame.

Case 3:

When the first identifier is the second value, the target frequency-domain coefficient of the current frame is processed to obtain the frequency-domain coefficient of the current frame.

The processing (performed on the target frequency-domain coefficient of the current frame) may be inverse filtering processing. The inverse filtering processing may include inverse temporary noise shaping (TNS) processing and/or inverse frequency-domain noise shaping (FDNS) processing, or the inverse filtering processing may include other processing. This is not limited in this embodiment of this application.

In some embodiments, in the foregoing Manner 1 or Manner 2, the reference target frequency-domain coefficient of the current frame may be obtained by using the following method:

parsing the bitstream to obtain a pitch period of the current frame; determining a reference signal of the current frame based on the pitch period of the current frame; converting the reference signal of the current frame to obtain a reference frequency-domain coefficient of the current frame; and performing filtering processing on the reference frequency-domain coefficient based on the filtering parameter to obtain the reference target frequency-domain coefficient. The conversion performed on the reference signal of the current frame may be time to frequency domain transform. The time to frequency domain transform may be MDCT, DCT, FFT, or the like.

Figure 9:
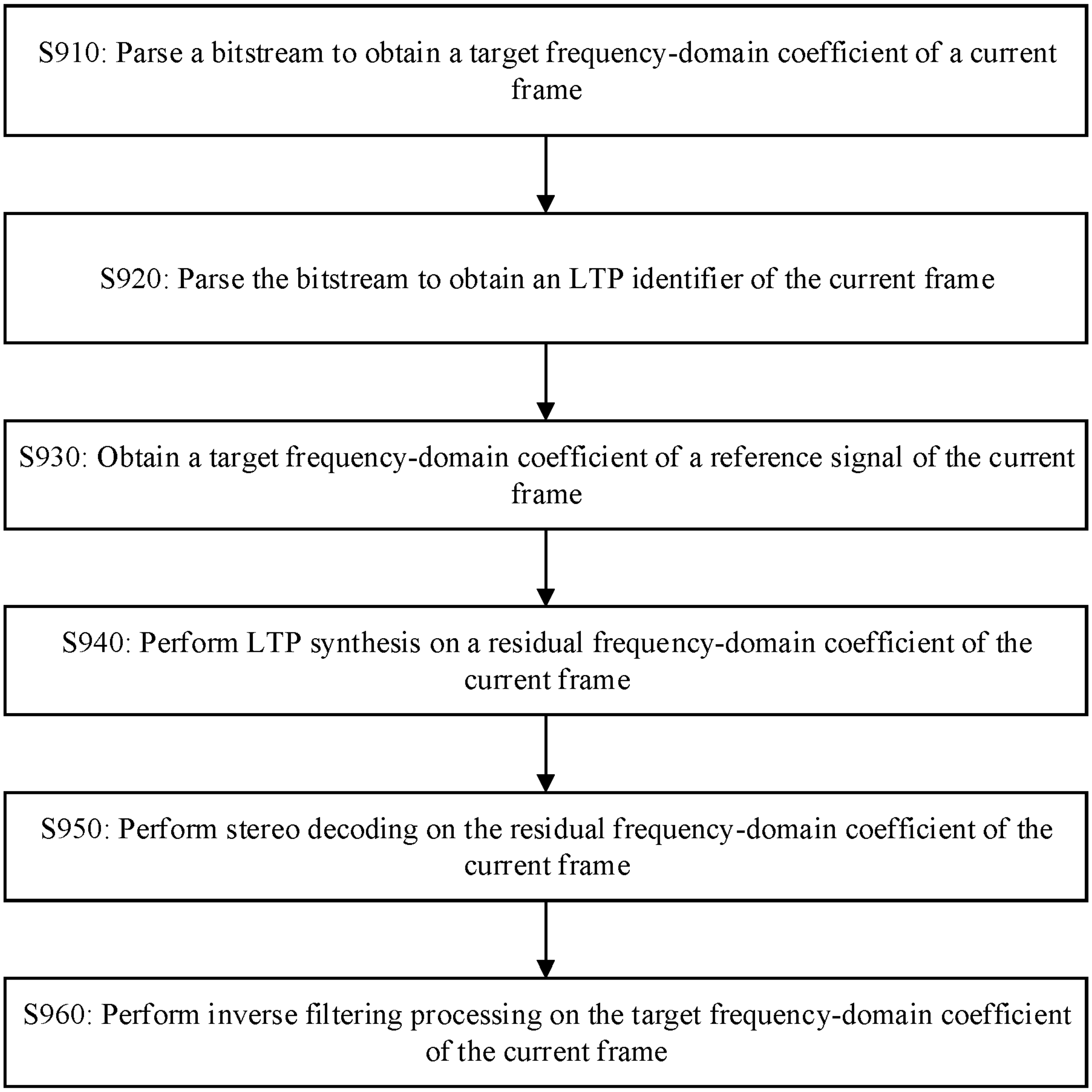
FIG. 9 is a schematic flowchart of an audio signal decoding method according to another embodiment of this application.

With reference to FIG. 9, the following describes a detailed process of an audio signal decoding method in an embodiment of this application by using a stereo signal (that is, a current frame includes a left channel signal and a right channel signal) as an example.

It should be understood that the embodiment shown in FIG. 9 is merely an example rather than a limitation. An audio signal in this embodiment of this application may alternatively be a mono signal or a multi-channel signal. This is not limited in this embodiment of this application.

FIG. 9 is a schematic flowchart of the audio signal decoding method according to this embodiment of this application. The method 900 may be performed by a decoder side. The decoder side may be a decoder or a device having an audio signal decoding function. The method 900 in some embodiments includes the following operations.

S910: Parse a bitstream to obtain a target frequency-domain coefficient of a current frame.

In some embodiments, a transform coefficient may be further obtained by parsing the bitstream.

The filtering parameter may be used to perform filtering processing on a frequency-domain coefficient of the current frame. The filtering processing may include temporary noise shaping (TNS) processing and/or frequency-domain noise shaping (FDNS) processing, or the filtering processing may include other processing. This is not limited in this embodiment of this application.

In some embodiments, in S910, the bitstream may be parsed to obtain a residual frequency-domain coefficient of the current frame.

For a specific bitstream parsing method, refer to a conventional technology. Details are not described herein.

S920: Parse the bitstream to obtain an LTP identifier of the current frame.

The LTP identifier may be used to indicate whether to perform long-term prediction LTP processing on the current frame.

For example, when the LTP identifier is a first value, the bitstream is parsed to obtain the residual frequency-domain coefficient of the current frame. The first value may be used to indicate to perform long-term prediction LTP processing on the current frame.

When the LTP identifier is a second value, the bitstream is parsed to obtain the target frequency-domain coefficient of the current frame. The second value may be used to indicate not to perform long-term prediction LTP processing on the current frame.

It should be noted that when the current frame includes a left channel signal and a right channel signal, the LTP identifier of the current frame may be used for indication in the following two manners.

Manner 1:

The LTP identifier of the current frame may be used to indicate whether to perform LTP processing on the current frame.

The LTP identifier may further include the first identifier and/or the second identifier described in the embodiment of the method 600 in FIG. 6.

For example, the LTP identifier may include the first identifier and the second identifier. The first identifier may be used to indicate whether to perform LTP processing on the current frame, and the second identifier may be used to indicate a frequency band on which LTP processing is to be performed and that is of the current frame.

For another example, the LTP identifier may be the first identifier. The first identifier may be used to indicate whether to perform LTP processing on the current frame. In addition, when LTP processing is performed on the current frame, the first identifier may further indicate a frequency band (for example, a high frequency band, a low frequency band, or a full frequency band of the current frame) on which LTP processing is performed and that is of the current frame.

Manner 2:

The LTP identifier of the current frame may include an LTP identifier of a left channel and an LTP identifier of a right channel. The LTP identifier of the left channel may be used to indicate whether to perform LTP processing on the left channel signal, and the LTP identifier of the right channel may be used to indicate whether to perform LTP processing on the right channel signal.

Further, as described in the embodiment of the method 600 in FIG. 6, the LTP identifier of the left channel may include a first identifier of the left channel and/or a second identifier of the left channel, and the LTP identifier of the right channel may include a first identifier of the right channel and/or a second identifier of the right channel.

The following provides description by using the LTP identifier of the left channel as an example. The LTP identifier of the right channel is similar to the LTP identifier of the left channel. Details are not described herein.

For example, the LTP identifier of the left channel may include the first identifier of the left channel and the second identifier of the left channel. The first identifier of the left channel may be used to indicate whether to perform LTP processing on the left channel, and the second identifier may be used to indicate a frequency band on which LTP processing is performed and that is of the left channel.

For another example, the LTP identifier of the left channel may be the first identifier of the left channel. The first identifier of the left channel may be used to indicate whether to perform LTP processing on the left channel. In addition, when LTP processing is performed on the left channel, the first identifier of the left channel may further indicate a frequency band (for example, a high frequency band, a low frequency band, or a full frequency band of the left channel) on which LTP processing is performed and that is of the left channel.

For specific description of the first identifier and the second identifier in the foregoing two manners, refer to the embodiment in FIG. 6. Details are not described herein again.

In the embodiment of the method 900, the LTP identifier of the current frame may be used for indication in Manner 1. It should be understood that the embodiment of the method 900 is merely an example rather than a limitation. The LTP identifier of the current frame in the method 900 may alternatively be used for indication in Manner 2. This is not limited in this embodiment of this application.

In this embodiment of this application, bandwidth of the current frame may be categorized into a high frequency band, a low frequency band, and a full frequency band.

In this case, the bitstream may be parsed to obtain the first identifier.

The first identifier may be used to indicate whether to perform LTP processing on the current frame, or the first identifier may be used to indicate whether to perform LTP processing on the current frame and/or indicate a frequency band on which LTP processing is to be performed and that is of the current frame.

In some embodiments, the frequency band on which LTP processing is performed and that is of the current frame may include a high frequency band, a low frequency band, or a full frequency band. The high frequency band may be a frequency band whose frequency is greater than that of a cutoff frequency bin and that is of the full frequency band of the current frame, the low frequency band may be a frequency band whose frequency is less than or equal to that of the cutoff frequency bin and that is of the full frequency band of the current frame, and the cutoff frequency bin may be for division into the low frequency band and the high frequency band.

In this embodiment of this application, the cutoff frequency bin may be determined in the following two manners:

Manner 1:

The cutoff frequency bin may be determined based on a spectral coefficient of the reference signal.

In some embodiments, a peak factor set corresponding to the reference signal may be determined based on the spectral coefficient of the reference signal; and the cutoff frequency bin may be determined based on a peak factor in the peak factor set, where the peak factor satisfies a preset condition.

Further, the peak factor set corresponding to the reference signal may be determined based on the spectral coefficient of the reference signal; and a greatest value of peak factors in the peak factor set that satisfy a preset condition may be used as the cutoff frequency bin.

The preset condition may be a greatest value of (one or more) peak factors in the peak factor set that are greater than a sixth threshold.

For example, the peak factor set may be calculated based on the following formula:

$$CF_p = \frac{X_{ref}[p]}{\sum_{k=p-w}^{k=p+w} X_{ref}[k]},\ p \in P$$

$$P = \arg_k\{((X_{ref}[k] > X_{ref}[k-1]) \text{ and } (X_{ref}[k] > X_{ref}[k=1])) > 0,\ k = 0, 1, \ldots M-1\}$$

$CF_p$ represents the peak factor set, P represents a set of values k that satisfy a condition, w represents a size of a sliding window, and p represents an element in the set P.

In this case, an index value stopLine of a cutoff frequency bin coefficient of a low-frequency MDCT coefficient may be determined based on the following formula:

$$\text{stopLine}=\max\{p|CF_p>thr6, p\in P\}$$

thr6 represents the sixth threshold.

Manner 2:

The cutoff frequency bin may be a preset value. In some embodiments, the cutoff frequency bin may be preset to the preset value based on experience.

For example, it is assumed that a to-be-processed signal of the current frame is a 48 kHz (Hz) sampling signal, and undergoes 480-point MDCT transform to obtain 480-point MDCT coefficients. In this case, an index of the cutoff frequency bin may be preset to 200, and a cutoff frequency corresponding to the cutoff frequency bin is 10 kHz.

Further, whether to perform LTP processing on the current frame and/or the frequency band on which LTP processing is performed and that is of the current frame may be determined based on the first identifier.

In some embodiments, based on different first identifiers obtained through decoding, there may be the following two manners:

Manner 1:

In some embodiments, the bitstream may be parsed to obtain the first identifier. When the first identifier is the first value, the bitstream may be parsed to obtain a second identifier.

The second identifier may be used to indicate a frequency band on which LTP processing is to be performed and that is of the current frame.

In some embodiments, in Manner 1, the first identifier and the second identifier may have different values, and these different values may represent different meanings.

For example, the first identifier may be the first value or the second value, and the second identifier may be a third value or a fourth value.

The first value may be used to indicate to perform LTP processing on the current frame, the second value may be used to indicate not to perform LTP processing on the current frame, the third value may be used to indicate to perform LTP processing on the full frequency band, and the fourth value may be used to indicate to perform LTP processing on the low frequency band.

For example, the first value may be 1, the second value may be 0, the third value may be 2, and the fourth value may be 3.

It should be noted that the foregoing values of the first identifier and the second identifier in the foregoing embodiment are merely examples rather than limitations.

Further, based on different first identifiers and/or second identifiers obtained by parsing the bitstream, there may be the following several cases:

Case 1:

When the first identifier is the first value and the second identifier is the fourth value, a reference target frequency-domain coefficient of the current frame is obtained.

Case 2:

When the first identifier is the first value and the second identifier is the third value, the reference target frequency-domain coefficient of the current frame is obtained.

Case 3:

When the first identifier is the second value, the target frequency-domain coefficient of the current frame is processed to obtain the frequency-domain coefficient of the current frame.

Manner 2:

In some embodiments, the bitstream may be parsed to obtain the first identifier.

The first identifier may be used to indicate whether to perform LTP processing on the current frame, or the first identifier may be used to indicate whether to perform LTP processing on the current frame and indicate a frequency band on which LTP processing is to be performed and that is of the current frame.

In some embodiments, in Manner 2, the first identifier may alternatively have different values, and these different values may also represent different meanings.

For example, the first identifier may be the first value or the second value, and the second identifier may be a third value or a fourth value.

The first value may be used to indicate (to perform LTP processing on the current frame and) to perform LTP processing on the low frequency band, the second value may be used to indicate not to perform LTP processing on the current frame, and the third value may be used to indicate (to perform LTP processing on the current frame and) to perform LTP processing on the full frequency band.

For example, the first value may be 1, the second value may be 0, and the third value may be 2.

It should be noted that the foregoing values of the first identifier in the foregoing embodiment are merely examples rather than limitations.

Further, based on different determined first identifiers, there may be the following several cases:

Case 1:

When the first identifier is the first value, a reference target frequency-domain coefficient of the current frame is obtained.

Case 2:

When the first identifier is the third value, the reference target frequency-domain coefficient of the current frame is obtained.

Case 3:

When the first identifier is the second value, the target frequency-domain coefficient of the current frame is processed to obtain the frequency-domain coefficient of the current frame.

S930: Obtain the reference target frequency-domain coefficient of the current frame.

In some embodiments, the reference target frequency-domain coefficient of the current frame may be obtained by using the following method:

parsing the bitstream to obtain a pitch period of the current frame; determining a reference signal of the current frame based on the pitch period of the current frame; converting the reference signal of the current frame to obtain a reference frequency-domain coefficient of the current frame; and performing filtering processing on the reference frequency-domain coefficient based on the filtering parameter to obtain the reference target frequency-domain coefficient. The conversion performed on the reference signal of the current frame may be time to frequency domain transform. The time to frequency domain transform may be MDCT, DCT, FFT, or the like.

For example, the bitstream may be parsed to obtain the pitch period of the current frame, and a reference signal ref[j] of the current frame may be obtained from a history buffer based on the pitch period. Any pitch period searching method may be used to search the pitch periods. This is not limited in this embodiment of this application.

$$ref[j]=syn[L-N-K+j],\ j=0,1,\ldots,N-1$$

A history buffer signal syn stores a decoded time-domain signal obtained through inverse MDCT transform, a length satisfies L=2N, N represents a frame length, and K represents a pitch period.

For the history buffer signal syn, an arithmetic-coded residual signal is decoded, LTP synthesis is performed, inverse TNS processing and inverse FDNS processing are performed based on the TNS parameter and the FDNS parameter that are obtained in S710, inverse MDCT transform is then performed to obtain a synthesized time-domain signal. The synthesized time-domain signal is stored in the history buffer syn. Inverse TNS processing is an inverse operation of TNS processing (e.g., filtering), to obtain a signal that has not undergone TNS processing. Inverse FDNS processing is an inverse operation of FDNS processing (e.g., filtering), to obtain a signal that has not undergone FDNS processing. For specific methods for performing inverse TNS processing and inverse FDNS processing, refer to the conventional technology. Details are not described herein.

In some embodiments, MDCT transform is performed on the reference signal ref[j], and filtering processing is performed on a frequency-domain coefficient of the reference signal ref[j] based on the filtering parameter obtained in S910, to obtain a target frequency-domain coefficient of the reference signal ref[j].

First, TNS processing may be performed on an MDCT coefficient (that is, the reference frequency-domain coefficient) of a reference signal ref[j] by using a TNS identifier and the TNS parameter, to obtain a TNS-processed reference frequency-domain coefficient.

For example, when the TNS identifier is 1, TNS processing is performed on the MDCT coefficient of the reference signal based on the TNS parameter.

Then, FDNS processing may be performed on the TNS-processed reference frequency-domain coefficient by using the FDNS parameter, to obtain an FDNS-processed reference frequency-domain coefficient, that is, the reference target frequency-domain coefficient $X_{ref}[k]$.

It should be noted that an order of performing TNS processing and FDNS processing is not limited in this embodiment of this application. For example, alternatively, FDNS processing may be performed on the reference frequency-domain coefficient (that is, the MDCT coefficient of the reference signal) before TNS processing. This is not limited in this embodiment of this application.

Particularly, when the current frame includes the left channel signal and the right channel signal, the reference target frequency-domain coefficient $X_{ref}[k]$ includes a reference target frequency-domain coefficient $X_{refL}[k]$ of the left channel and a reference target frequency-domain coefficient $X_{refR}[k]$ of the right channel.

In FIG. 9, the following describes a detailed process of the audio signal decoding method in this embodiment of this application by using an example in which the current frame includes the left channel signal and the right channel signal. It should be understood that the embodiment shown in FIG. 9 is merely an example rather than a limitation.

S940: Perform LTP synthesis on the residual frequency-domain coefficient of the current frame.

In some embodiments, the bitstream may be parsed to obtain a stereo coding identifier stereoMode.

Based on different stereo coding identifiers stereoMode, there may be the following two cases:

Case 1:

If the stereo coding identifier stereoMode is 0, the target frequency-domain coefficient of the current frame obtained by parsing the bitstream in S910 is the residual frequency-domain coefficient of the current frame. For example, a residual frequency-domain coefficient of the left channel signal may be expressed as $X_L[k]$, and a residual frequency-domain coefficient of the right channel signal may be expressed as $X_R[k]$.

In this case, LTP synthesis may be performed on the residual frequency-domain coefficient $X_L[k]$ of the left channel signal and the residual frequency-domain coefficient $X_R[k]$ of the right channel signal.

For example, LTP synthesis may be performed based on the following formula:

$$X_L[k]=X_L[k]+g_{Li}*X_{refL}[k]$$

$$X_R[k]=X_R[k]+g_{Ri}*X_{refR}[k]$$

$X_L[k]$ on the left of the formula represents an LTP-synthesized target frequency-domain coefficient of the left channel, $X_L[k]$ on the right of the formula represents a target frequency-domain coefficient of the left channel signal, $X_R[k]$ on the left of the formula represents an LTP-synthesized target frequency-domain coefficient of the right channel, $X_R[k]$ on the right of the formula represents a target frequency-domain coefficient of the right channel signal, $X_{refL}$ represents the reference target frequency-domain coefficient of the left channel, $X_{refR}$ represents the reference target frequency-domain coefficient of the right channel, $g_{Li}$ represents an LTP-predicted gain of an $i^{th}$ subframe of the left channel, $g_{Ri}$ represents an LTP-predicted gain of an $i^{th}$ subframe of the right channel, M represents a quantity of MDCT coefficients participating in LTP processing, i and k are positive integers, and $0 \le k \le M$.

Further, in this embodiment of this application, LTP synthesis may be further performed on at least one of the high frequency band, the low frequency band, or the full frequency band of the current frame based on the first identifier and/or the second identifier obtained by parsing the bitstream in the foregoing S920, to obtain the residual frequency-domain coefficient of the current frame.

The following provides description by using the left channel signal as an example. In other words, the following description is not limited to the left channel signal or the right channel signal. In this embodiment of this application, a method for processing the left channel signal is the same as a method for processing the right channel signal.

For example, when the first identifier and/or the second identifier obtained by parsing the bitstream satisfy or satisfies Case 1 in Manner 1 in S920, LTP synthesis may be performed on a low frequency band based on the following formula:

$$X_L[k] = \begin{cases} X_L[k] + g_{LFi} * X_{ref}[k] \\ X_L[k] \end{cases}$$

$X_L[k]$ on the left of the formula represents an LTP-synthesized residual frequency-domain coefficient of the left channel, $X_L[k]$ on the right of the formula represents the target frequency-domain coefficient of the left channel signal, $X_{refL}$ represents a reference target frequency-domain coefficient of the left channel, $g_{LFi}$ represents a predicted gain of a low frequency band of the $i^{th}$ subframe of the left channel, stopLine represents the index value of the cutoff frequency bin coefficient of the low-frequency MDCT coefficient, stopLine=M/2, M represents a quantity of MDCT coefficients participating in LTP processing, k is a positive integer, and $0 \le k \le M$.

When the first identifier and/or the second identifier obtained by parsing the bitstream satisfy or satisfies Case 2 or Case 5 in Manner 1 in S920, LTP synthesis may be performed on a full frequency band based on the following formula:

$$X_L[k]=X_L[k]+g_{FBi}*X_{refLk}[k]$$

$X_L[k]$ on the left of the formula represents an LTP-synthesized residual frequency-domain coefficient of the left channel, $X_L[k]$ on the right of the formula represents the target frequency-domain coefficient of the left channel signal, $X_{refL}$ represents a reference target frequency-domain coefficient of the left channel, $g_{FBi}$ represents a predicted gain of a full frequency band of the $i^{th}$ subframe of the left channel, stopLine represents the index value of the cutoff frequency bin coefficient of the low-frequency MDCT coefficient, stopLine=M/2, M represents a quantity of MDCT coefficients participating in LTP processing, k is a positive integer, and 0≤k≤M.

For another example, when the first identifier and/or the second identifier obtained by parsing the bitstream satisfy or satisfies Case 1 in Manner 2 in S920, LTP processing may be performed on a low frequency band based on the following formula:

$$X_L[k]=\begin{cases} X_L[k]+g_{LFi}*X_{ref}[k] \\ X_L[k] \end{cases}$$

$X_{refL}$ represents a reference target frequency-domain coefficient of the left channel, $g_{LFi}$ represents a predicted gain of a low frequency band of the $i^{th}$ subframe of the left channel, stopLine represents the index value of the cutoff frequency bin coefficient of the low-frequency MDCT coefficient, stopLine=M/2, M represents a quantity of MDCT coefficients participating in LTP processing, k is a positive integer, and 0≤k≤M.

When the first identifier and/or the second identifier obtained by parsing the bitstream satisfy or satisfies Case 2 or Case 5 in Manner 2 in S920, LTP processing may be performed on a full frequency band based on the following formula:

$$X_L[k]=X_L[k]+g_{FBi}*X_{refL}[k]$$

$X_{refL}$ represents a reference target frequency-domain coefficient of the left channel, $g_{FBi}$ represents a predicted gain of a full frequency band of the $i^{th}$ subframe of the left channel, stopLine represents the index value of the cutoff frequency bin coefficient of the low-frequency MDCT coefficient, stopLine=M/2, M represents a quantity of MDCT coefficients participating in LTP processing, k is a positive integer, and 0≤k≤M.

Case 2:

If the stereo coding identifier stereoMode is 1, the target frequency-domain coefficient of the current frame obtained by parsing the bitstream in S910 is residual frequency-domain coefficients of mid/side stereo signals of the current frame. For example, the residual frequency-domain coefficients of the mid/side stereo signals of the current frame may be expressed as $X_M[k]$ and $X_S[k]$.

In this case, LTP synthesis may be performed on the residual frequency-domain coefficients $X_M[k]$ and $X_S[k]$ of the mid/side stereo signals of the current frame.

For example, LTP synthesis may be performed based on the following formula:

$$X_M[k]=X_M[k]+g_{Mi}*X_{refM}[k]$$

$$X_S[k]=X_S[k]+g_{Si}*X_{refS}[k]$$

$X_M[k]$ on the left of the formula represents an M channel of an LTP-synthesized mid/side stereo signal of the current frame, $X_M[k]$ on the right of the formula represents a residual frequency-domain coefficient of the M channel of the current frame, $X_S[k]$ on the left of the formula represents an S channel of an LTP-synthesized mid/side stereo signal of the current frame, $X_S[k]$ on the right of the formula represents a residual frequency-domain coefficient of the S channel of the current frame, $g_{Mi}$ represents an LTP-predicted gain of an $i^{th}$ subframe of the M channel, $g_{Si}$ represents an LTP-predicted gain of an $i^{th}$ subframe of the S channel, M represents a quantity of MDCT coefficients participating in LTP processing, i and k are positive integers, 0≤k≤M, and $X_{refM}$ and $X_{refS}$ represent reference signals obtained through mid/side stereo processing. Details are as follows:

$$X_{refM}[k]=(X_{refL}[k]+X_{refR}[k])*\sqrt{2}/2$$

$$X_{refS}[k]=(X_{refL}[k]-X_{refR}[k])*\sqrt{2}/2$$

Further, in this embodiment of this application, LTP synthesis may be further performed on at least one of the high frequency band, the low frequency band, or the full frequency band of the current frame based on the first identifier and/or the second identifier obtained by parsing the bitstream in the foregoing S920, to obtain the residual frequency-domain coefficient of the current frame.

The following provides description by using an M-channel signal as an example. In other words, the following description is not limited to the M-channel signal or the S-channel signal. In this embodiment of this application, a method for processing the M-channel signal is the same as a method for processing the S-channel signal.

For example, when the first identifier and/or the second identifier obtained by parsing the bitstream satisfy or satisfies Case 1 in Manner 1 in S920, LTP processing may be performed on a low frequency band based on the following formula:

$$X_M[k]=\begin{cases} X_M[k]+g_{LFi}*X_{refM}[k] \\ X_M[k] \end{cases}$$

$X_{refM}$ represents a reference target frequency-domain coefficient of the M channel, $g_{LFi}$ represents a predicted gain of a low frequency band of the $i^{th}$ subframe of the M channel, stopLine represents the index value of the cutoff frequency bin coefficient of the low-frequency MDCT coefficient, stopLine=M/2, M represents a quantity of MDCT coefficients participating in LTP processing, k is a positive integer, and 0≤k≤M.

When the first identifier and/or the second identifier obtained by parsing the bitstream satisfy or satisfies Case 2 or Case 5 in Manner 1 in S920, LTP processing may be performed on a full frequency band based on the following formula:

$$X_M[k]=X_M[k]+g_{FBi}*X_{refM}[k]$$

$X_{refM}$ represents a reference target frequency-domain coefficient of the M channel, $g_{FBi}$ represents a predicted gain of a full frequency band of the $i^{th}$ subframe of the M channel, stopLine represents the index value of the cutoff frequency bin coefficient of the low-frequency MDCT coefficient, stopLine=M/2, M represents a quantity of MDCT coefficients participating in LTP processing, k is a positive integer, and 0≤k≤M.

For another example, when the first identifier and/or the second identifier obtained by parsing the bitstream satisfy or satisfies Case 1 in Manner 2 in S920, LTP processing may be performed on a low frequency band based on the following formula:

$$X_M[k]=\begin{cases} X_M[k]+g_{LFi}*X_{refM}[k] \\ X_M[k] \end{cases}$$

$X_{refL}$ represents a reference target frequency-domain coefficient of the M channel, $g_{LFi}$ represents a predicted gain of a low frequency band of the $i^{th}$ subframe of the M channel, stopLine represents the index value of the cutoff frequency bin coefficient of the low-frequency MDCT coefficient, stopLine=M/2, M represents a quantity of MDCT coefficients participating in LTP processing, k is a positive integer, and 0≤k≤M.

When the first identifier and/or the second identifier obtained by parsing the bitstream satisfy or satisfies Case 2 or Case 5 in Manner 2 in S920, LTP processing may be performed on a full frequency band based on the following formula:

$$X_M[k]=X_M[k]+g_{FBi}*X_{refM}[k]$$

$X_{refM}$ represents a reference target frequency-domain coefficient of the M channel, $g_{FBi}$ represents a predicted gain of a full frequency band of the $i^{th}$ subframe of the M channel, stopLine represents the index value of the cutoff frequency bin coefficient of the low-frequency MDCT coefficient, stopLine=M/2, M represents a quantity of MDCT coefficients participating in LTP processing, k is a positive integer, and 0≤k≤M.

It should be noted that, in this embodiment of this application, stereo decoding may be further performed on the residual frequency-domain coefficient of the current frame, and then LTP synthesis may be performed on the residual frequency-domain coefficient of the current frame. That is, S950 is performed before S940.

S950: Perform stereo decoding on the residual frequency-domain coefficient of the current frame.

In some embodiments, if the stereo coding identifier stereoMode is 1, stereo-encoded target frequency-domain coefficients $X_L[k]$ and $X_R[k]$ of the current frame may be determined based on the following formulas:

$$X_L[k]=(X_M[k]+X_S[k])*2/2$$

$$X_R[k]=(X_M[k]-X_S[k])*2/2$$

$X_M[k]$ represents the M channel of the LTP-synthesized mid/side stereo signal of the current frame, $X_S[k]$ represents the S channel of the LTP-synthesized mid/side stereo signal of the current frame, M represents the quantity of MDCT coefficients participating in LTP processing, k is a positive integer, and 0≤k≤M.

Further, if an LTP identifier enableRALTP of the current frame is 0, the bitstream may be parsed to obtain an intensity level difference ILD between the left channel of the current frame and the right channel of the current frame, a ratio nrgRatio of energy of the left channel signal to energy of the right channel signal may be obtained, and an MDCT parameter of the left channel and an MDCT parameter of the right channel (that is, a target frequency-domain coefficient of the left channel and a target frequency-domain coefficient of the right channel) may be updated.

For example, if nrgRatio is less than 1.0, the MDCT coefficient of the left channel is adjusted based on the following formula:

$$X_{refL}[k]=\frac{X_L[k]}{nrgRatio}$$

$X_{refL}[k]$ on the left of the formula represents an adjusted MDCT coefficient of the left channel, and $X_L[k]$ on the right of the formula represents the unadjusted MDCT coefficient of the left channel.

If the ratio nrgRatio is greater than 1.0, the MDCT coefficient of the right channel is adjusted based on the following formula:

$$X_{refR}[k]=\frac{X_R[k]}{nrgRatio}$$

$X_{refR}[k]$ on the left of the formula represents an adjusted MDCT coefficient of the right channel, and $X_R[k]$ on the right of the formula represents the unadjusted MDCT coefficient of the right channel.

If the LTP identifier enableRALTP of the current frame is 1, the MDCT parameter $X_L[k]$ of the left channel and the MDCT parameter $X_R[k]$ of the right channel are not adjusted.

S960: Perform inverse filtering processing on the target frequency-domain coefficient of the current frame.

Inverse filtering processing is performed on the foregoing stereo-encoded target frequency-domain coefficient of the current frame to obtain the frequency-domain coefficient of the current frame.

For example, inverse FDNS processing and inverse TNS processing may be performed on the MDCT parameter $X_L[k]$ of the left channel and the MDCT parameter $X_R[k]$ of the right channel to obtain the frequency-domain coefficient of the current frame.

Then, an inverse MDCT operation is performed on the frequency-domain coefficient of the current frame to obtain a synthesized time-domain signal of the current frame.

The foregoing describes in detail the audio signal encoding method and the audio signal decoding method in embodiments of this application with reference to FIG. 1 to FIG. 9. The following describes an audio signal encoding apparatus and an audio signal decoding apparatus in embodiments of this application with reference to FIG. 10 to FIG. 13. It should be understood that the encoding apparatus in FIG. 10 to FIG. 13 corresponds to the audio signal encoding method in embodiments of this application, and the encoding apparatus can perform the audio signal encoding method in embodiments of this application. The decoding apparatus in FIG. 10 to FIG. 13 corresponds to the audio signal decoding method in embodiments of this application, and the decoding apparatus may perform the audio signal decoding method in embodiments of this application. For brevity, repeated descriptions are appropriately omitted below.

Figure 10:
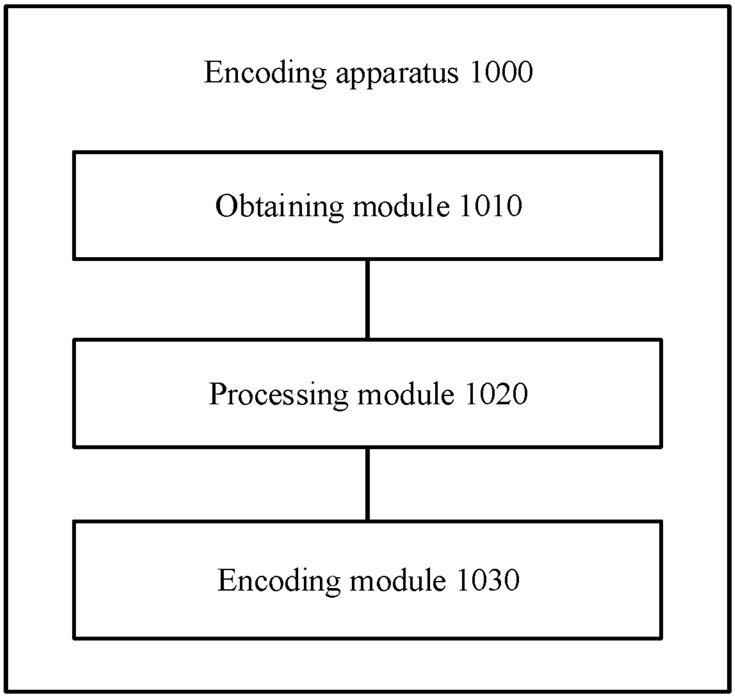
FIG. 10 is a schematic block diagram of an encoding apparatus according to an embodiment of this application.

FIG. 10 is a schematic block diagram of an encoding apparatus according to an embodiment of this application. The encoding apparatus 1000 shown in FIG. 10 includes:

- an obtaining module 1010, configured to obtain a target frequency-domain coefficient of a current frame and a reference target frequency-domain coefficient of the current frame;
- a processing module 1020, configured to calculate a cost function based on the target frequency-domain coefficient and the reference target frequency-domain coefficient of the current frame, where the cost function is for determining whether to perform long-term prediction LTP processing on the current frame during encoding of the target frequency-domain coefficient of the current frame; and
- an encoding module 1030, configured to encode the target frequency-domain coefficient of the current frame based on the cost function.

In some embodiments, the cost function includes at least one of a cost function of a high frequency band of the current frame, a cost function of a low frequency band of the current frame, or a cost function of a full frequency band of the current frame. The high frequency band is a frequency band whose frequency is greater than that of a cutoff frequency bin and that is of the full frequency band of the current frame, the low frequency band is a frequency band whose frequency is less than or equal to that of the cutoff frequency bin and that is of the full frequency band of the current frame, and the cutoff frequency bin is used for division into the low frequency band and the high frequency band.

In some embodiments, the cost function is a predicted gain of a current frequency band of the current frame, or the cost function is a ratio of energy of an estimated residual frequency-domain coefficient of a current frequency band of the current frame to energy of a target frequency-domain coefficient of the current frequency band. The estimated residual frequency-domain coefficient is a difference between the target frequency-domain coefficient of the current frequency band and a predicted frequency-domain coefficient of the current frequency band, the predicted frequency-domain coefficient is obtained based on a reference frequency-domain coefficient and the predicted gain of the current frequency band of the current frame, and the current frequency band is the low frequency band, the high frequency band, or the full frequency band.

In some embodiments, the encoding module 1030 is in some embodiments configured to determine a first identifier and/or a second identifier based on the cost function, where the first identifier is used to indicate whether to perform LTP processing on the current frame, and the second identifier is used to indicate a frequency band on which LTP processing is to be performed and that is of the current frame; and encode the target frequency-domain coefficient of the current frame based on the first identifier and/or the second identifier.

In some embodiments, the encoding module 1030 is in some embodiments configured to: when the cost function of the low frequency band satisfies a first condition and the cost function of the high frequency band does not satisfy a second condition, determine that the first identifier is a first value and the second identifier is a fourth value, where the first value is used to indicate to perform LTP processing on the current frame, and the fourth value is used to indicate to perform LTP processing on the low frequency band;

when the cost function of the low frequency band satisfies the first condition and the cost function of the high frequency band satisfies the second condition, determine that the first identifier is a first value and the second identifier is a third value, where the third value is used to indicate to perform LTP processing on the full frequency band, and the first value is used to indicate to perform LTP processing on the current frame;

when the cost function of the low frequency band does not satisfy the first condition, determine that the first identifier is a second value, where the second value is used to indicate not to perform LTP processing on the current frame;

when the cost function of the low frequency band satisfies the first condition and the cost function of the full frequency band does not satisfy a third condition, determine that the first identifier is a second value, where the second value is used to indicate not to perform LTP processing on the current frame; or when the cost function of the full frequency band satisfies the third condition, determine that the first identifier is a first value and the second identifier is a third value, where the third value is used to indicate to perform LTP processing on the full frequency band.

In some embodiments, the encoding module 1030 is in some embodiments configured to:

when the first identifier is the first value, perform LTP processing on at least one of the high frequency band, the low frequency band, or the full frequency band of the current frame based on the second identifier to obtain a residual frequency-domain coefficient of the current frame;

encode the residual frequency-domain coefficient of the current frame; and write a value of the first identifier and a value of the second identifier into a bitstream; or when the first identifier is the second value, encode the target frequency-domain coefficient of the current frame; and write a value of the first identifier into a bitstream.

In some embodiments, the encoding module 1030 is in some embodiments configured to:

determine a first identifier based on the cost function, where the first identifier is used to indicate whether to perform LTP processing on the current frame and/or indicate a frequency band on which LTP processing is to be performed and that is of the current frame; and encode the target frequency-domain coefficient of the current frame based on the first identifier.

In some embodiments, the encoding module 1030 is in some embodiments configured to:

when the cost function of the low frequency band satisfies a first condition and the cost function of the high frequency band does not satisfy a second condition, determine that the first identifier is a first value, where the first value is used to indicate to perform LTP processing on the low frequency band;

when the cost function of the low frequency band satisfies the first condition and the cost function of the high frequency band satisfies the second condition, determine that the first identifier is a third value, where the third value is used to indicate to perform LTP processing on the full frequency band;

when the cost function of the low frequency band does not satisfy the first condition, determine that the first identifier is a second value, where the second value is used to indicate not to perform LTP processing on the current frame;

when the cost function of the low frequency band satisfies the first condition and the cost function of the full frequency band does not satisfy a third condition, determine that the first identifier is a second value, where the second value is used to indicate not to perform LTP processing on the current frame; or when the cost function of the full frequency band satisfies the third condition, determine that the first identifier is a third value, where the third value is used to indicate to perform LTP processing on the full frequency band.

In some embodiments, the encoding module 1030 is in some embodiments configured to:

perform LTP processing on at least one of the high frequency band, the low frequency band, or the full frequency band of the current frame based on the first identifier to obtain a residual frequency-domain coefficient of the current frame;

encode the residual frequency-domain coefficient of the current frame; and write a value of the first identifier into a bitstream; or when the first identifier is the second value, encode the target frequency-domain coefficient of the current frame; and write a value of the first identifier into a bitstream.

In some embodiments, the first condition is that the cost function of the low frequency band is greater than or equal to a first threshold, the second condition is that the cost function of the high frequency band is greater than or equal to a second threshold, and the third condition is that the cost function of the full frequency band is greater than or equal to the third threshold; or the first condition is that the cost function of the low frequency band is less than a fourth threshold, the second condition is that the cost function of the high frequency band is less than the fourth threshold, and the third condition is that the cost function of the full frequency band is greater than or equal to a fifth threshold.

In some embodiments, the processing module 1020 is further configured to determine the cutoff frequency bin based on a spectral coefficient of the reference signal.

In some embodiments, the processing module 1020 is in some embodiments configured to:

- determine, based on the spectral coefficient of the reference signal, a peak factor set corresponding to the reference signal; and
- determine the cutoff frequency bin based on a peak factor in the peak factor set, where the peak factor satisfies a preset condition.

In some embodiments, the cutoff frequency bin is a preset value.

Figure 11:
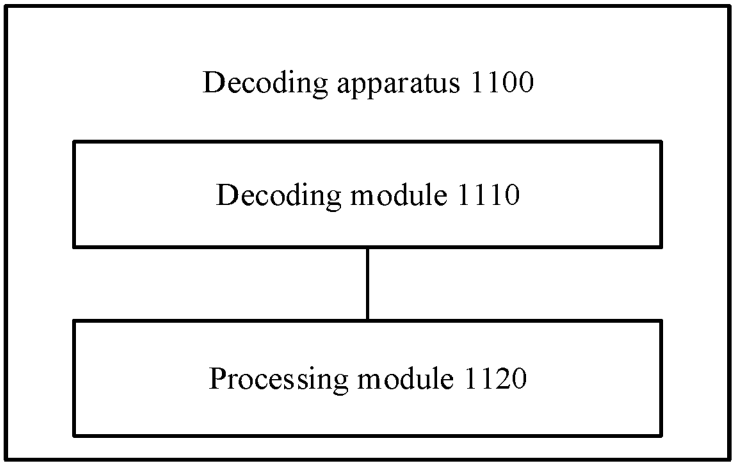
FIG. 11 is a schematic block diagram of a decoding apparatus according to an embodiment of this application.

FIG. 11 is a schematic block diagram of a decoding apparatus according to an embodiment of this application. The decoding apparatus 1100 shown in FIG. 11 includes:

- a decoding module 1110, configured to parse a bitstream to obtain a decoded frequency-domain coefficient of a current frame, where
- the decoding module 1110 is further configured to parse the bitstream to obtain a first identifier, where the first identifier is used to indicate whether to perform LTP processing on the current frame, or the first identifier is used to indicate whether to perform LTP processing on the current frame and/or indicate a frequency band on which LTP processing is to be performed and that is of the current frame; and
- a processing module 1120, configured to process the decoded frequency-domain coefficient of the current frame based on the first identifier to obtain a frequency-domain coefficient of the current frame.

In some embodiments, the frequency band on which LTP processing is performed and that is of the current frame includes a high frequency band, a low frequency band, or a full frequency band, where the high frequency band is a frequency band whose frequency is greater than that of a cutoff frequency bin and that is of the full frequency band of the current frame, the low frequency band is a frequency band whose frequency is less than or equal to that of the cutoff frequency bin and that is of the full frequency band of the current frame, and the cutoff frequency bin is used for division into the low frequency band and the high frequency band.

In some embodiments, when the first identifier is a first value, the decoded frequency-domain coefficient of the current frame is a residual frequency-domain coefficient of the current frame; or when the first identifier is a second value, the decoded frequency-domain coefficient of the current frame is a target frequency-domain coefficient of the current frame.

In some embodiments, the decoding module 1110 is in some embodiments configured to: parse the bitstream to obtain the first identifier; and when the first identifier is the first value, parse the bitstream to obtain a second identifier, where the second identifier is used to indicate a frequency band on which LTP processing is to be performed and that is of the current frame.

In some embodiments, the processing module 1120 is in some embodiments configured to: when the first identifier is the first value and the second identifier is a fourth value, obtain a reference target frequency-domain coefficient of the current frame, where the first value is used to indicate to perform LTP processing on the current frame, and the fourth value is used to indicate to perform LTP processing on the low frequency band; perform LTP synthesis based on a predicted gain of the low frequency band, the reference target frequency-domain coefficient, and the residual frequency-domain coefficient of the current frame to obtain the target frequency-domain coefficient of the current frame; and process the target frequency-domain coefficient of the current frame to obtain the frequency-domain coefficient of the current frame; or when the first identifier is the first value and the second identifier is a third value, obtain a reference target frequency-domain coefficient of the current frame, where the first value is used to indicate to perform LTP processing on the current frame, and the third value is used to indicate to perform LTP processing on the full frequency band; perform LTP synthesis based on a predicted gain of the full frequency band, the reference target frequency-domain coefficient, and the residual frequency-domain coefficient of the current frame to obtain the target frequency-domain coefficient of the current frame; and process the target frequency-domain coefficient of the current frame to obtain the frequency-domain coefficient of the current frame; or when the first identifier is the second value, process the target frequency-domain coefficient of the current frame to obtain the frequency-domain coefficient of the current frame, where the second value is used to indicate not to perform LTP processing on the current frame.

In some embodiments, the processing module 1120 is in some embodiments configured to: when the first identifier is the first value, obtain a reference target frequency-domain coefficient of the current frame, where the first value is used to indicate to perform LTP processing on the low frequency band;

- perform LTP synthesis based on a predicted gain of the low frequency band, the reference target frequency-domain coefficient, and the residual frequency-domain coefficient of the current frame to obtain the target frequency-domain coefficient of the current frame; and
- process the target frequency-domain coefficient of the current frame to obtain the frequency-domain coefficient of the current frame; or
- when the first identifier is a third value, obtain a reference target frequency-domain coefficient of the current frame, where the third value is used to indicate to perform LTP processing on the full frequency band;
- perform LTP synthesis based on a predicted gain of the full frequency band, the reference target frequency-domain coefficient, and the residual frequency-domain coefficient of the current frame to obtain the target frequency-domain coefficient of the current frame; and
- process the target frequency-domain coefficient of the current frame to obtain the frequency-domain coefficient of the current frame; or
- when the first identifier is the second value, process the target frequency-domain coefficient of the current frame to obtain the frequency-domain coefficient of the current frame, where the second value is used to indicate not to perform LTP processing on the current frame.

In some embodiments, the processing module 1120 is in some embodiments configured to: parse the bitstream to obtain a pitch period of the current frame; determine a reference frequency-domain coefficient of the current frame based on the pitch period of the current frame; and process the reference frequency-domain coefficient to obtain the reference target frequency-domain coefficient.

In some embodiments, the processing module 1120 is further configured to determine the cutoff frequency bin based on a spectral coefficient of the reference signal.

In some embodiments, the processing module 1120 is in some embodiments configured to: determine, based on the spectral coefficient of the reference signal, a peak factor set corresponding to the reference signal; and determine the cutoff frequency bin based on a peak factor in the peak factor set, where the peak factor satisfies a preset condition.

In some embodiments, the cutoff frequency bin is a preset value.

Figure 12:
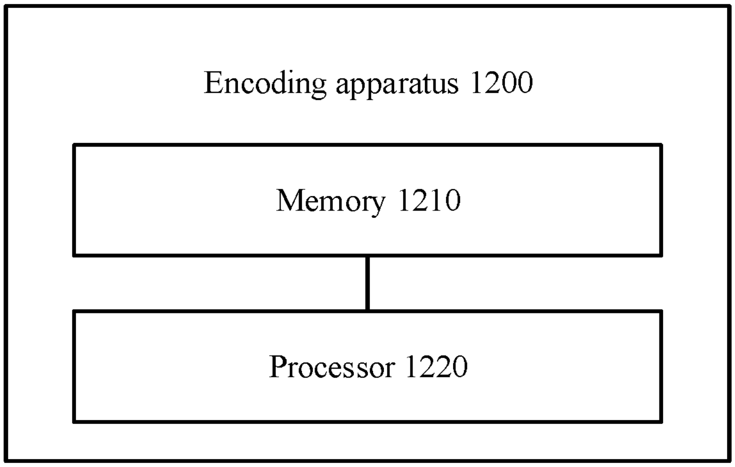
FIG. 12 is a schematic block diagram of an encoding apparatus according to an embodiment of this application.

FIG. 12 is a schematic block diagram of an encoding apparatus according to an embodiment of this application. The encoding apparatus 1200 shown in FIG. 12 includes:

a memory 1210, configured to store a program; and a processor 1220, configured to execute the program stored in the memory 1210. When the program in the memory 1210 is executed, the processor 1220 is in some embodiments configured to: obtain a target frequency-domain coefficient of a current frame and a reference target frequency-domain coefficient of the current frame; calculate a cost function based on the target frequency-domain coefficient and the reference target frequency-domain coefficient of the current frame, where the cost function is for determining whether to perform long-term prediction LTP processing on the current frame during encoding of the target frequency-domain coefficient of the current frame; and encode the target frequency-domain coefficient of the current frame based on the cost function.

Figure 13:
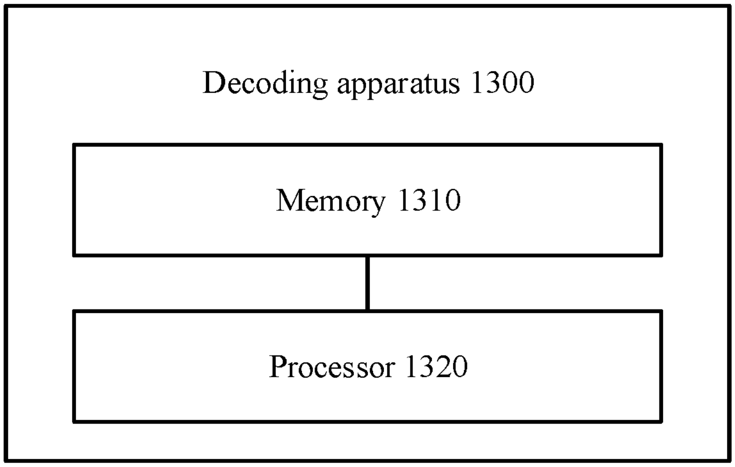
FIG. 13 is a schematic block diagram of a decoding apparatus according to an embodiment of this application.

FIG. 13 is a schematic block diagram of a decoding apparatus according to an embodiment of this application. The decoding apparatus 1300 shown in FIG. 13 includes:

a memory 1310, configured to store a program; and a processor 1320, configured to execute the program stored in the memory 1310. When the program in the memory 1310 is executed, the processor 1320 is in some embodiments configured to: parse a bitstream to obtain a decoded frequency-domain coefficient of a current frame; parse the bitstream to obtain a first identifier, where the first identifier is used to indicate whether to perform LTP processing on the current frame, or the first identifier is used to indicate whether to perform LTP processing on the current frame and/or indicate a frequency band on which LTP processing is to be performed and that is of the current frame; and process the decoded frequency-domain coefficient of the current frame based on the first identifier to obtain a frequency-domain coefficient of the current frame.

Figure 14:
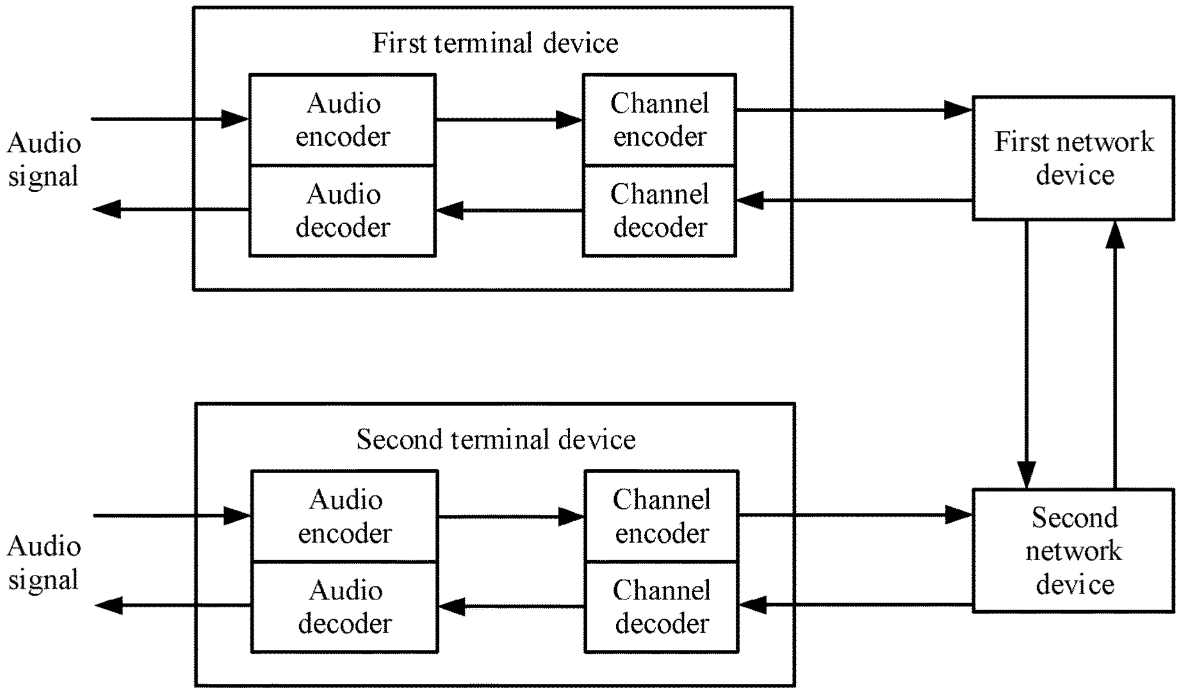
FIG. 14 is a schematic diagram of a terminal device according to an embodiment of this application.
Figure 15:
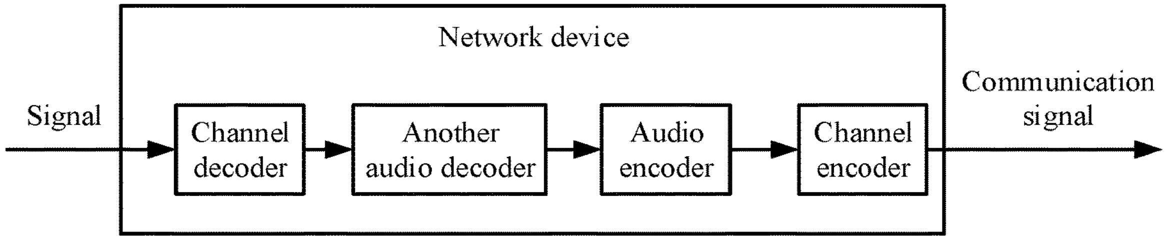
FIG. 15 is a schematic diagram of a network device according to an embodiment of this application.
Figure 16:
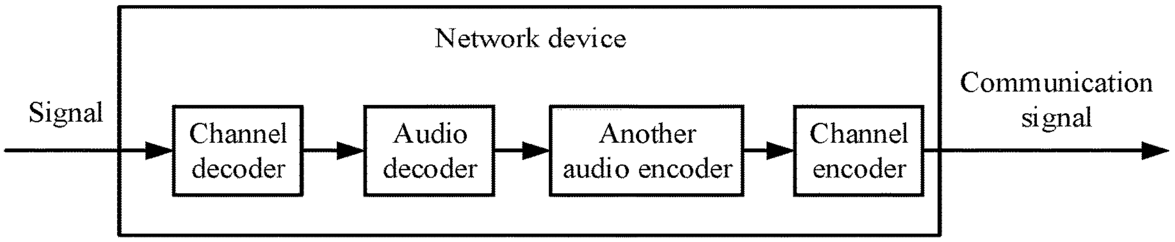
FIG. 16 is a schematic diagram of a network device according to an embodiment of this application.

It should be understood that the audio signal encoding method and the audio signal decoding method in embodiments of this application may be performed by a terminal device or a network device in FIG. 14 to FIG. 16. In addition, the encoding apparatus and the decoding apparatus in embodiments of this application may be further disposed in the terminal device or the network device in FIG. 14 to FIG. 16. In some embodiments, the encoding apparatus in embodiments of this application may be an audio signal encoder in the terminal device or the network device in FIG. 14 to FIG. 16, and the decoding apparatus in embodiments of this application may be an audio signal decoder in the terminal device or the network device in FIG. 14 to FIG. 16.

As shown in FIG. 14, during audio communication, an audio signal encoder in a first terminal device encodes a collected audio signal, and a channel encoder in the first terminal device may perform channel encoding on a bitstream obtained by the audio signal encoder. Then, data obtained by the first terminal device through channel encoding is transmitted to a second terminal device by using a first network device and a second network device. After a second terminal device receives the data from the second network device, a channel decoder of the second terminal device performs channel decoding to obtain an encoded bitstream of an audio signal, an audio signal decoder of the second terminal device performs decoding to restore the audio signal, and a terminal device plays back the audio signal. In this way, audio communication is completed between different terminal devices.

It should be understood that, in FIG. 14, the second terminal device may alternatively encode the collected audio signal, and finally transmit, to the first terminal device by using the second network device and the first network device, data finally obtained through encoding. The first terminal device performs channel decoding and decoding on the data to obtain the audio signal.

In FIG. 14, the first network device and the second network device may be wireless network communication devices or wired network communication devices. The first network device and the second network device may communicate with each other through a digital channel.

The first terminal device or the second terminal device in FIG. 14 may perform the audio signal encoding/decoding method in embodiments of this application. The encoding apparatus and the decoding apparatus in embodiments of this application may be respectively the audio signal encoder and the audio signal decoder in the first terminal device or the second terminal device.

During audio communication, a network device may implement transcoding of an encoding/decoding format of an audio signal. As shown in FIG. 15, if an encoding/decoding format of a signal received by the network device is an encoding/decoding format corresponding to another audio signal decoder, a channel decoder in the network device performs channel decoding on the received signal to obtain an encoded bitstream corresponding to the another audio signal decoder, the another audio signal decoder decodes the encoded bitstream to obtain the audio signal, an audio signal encoder encodes the audio signal to obtain an encoded bitstream of the audio signal, and a channel encoder finally performs channel encoding on the encoded bitstream of the audio signal to obtain a final signal (the signal may be transmitted to a terminal device or another network device). It should be understood that an encoding/decoding format corresponding to the audio signal encoder in FIG. 15 is different from an encoding/decoding format corresponding to the another audio signal decoder. It is assumed that the encoding/decoding format corresponding to the another audio signal decoder is a first encoding/decoding format, and the encoding/decoding format corresponding to the audio signal encoder is a second encoding/decoding format. In this case, in FIG. 15, the network device converts the audio signal from the first encoding/decoding format to the second encoding/decoding format.

Similarly, as shown in FIG. 16, if an encoding/decoding format of a signal received by a network device is the same as an encoding/decoding format corresponding to an audio signal decoder, after a channel decoder in the network device performs channel decoding to obtain an encoded bitstream of an audio signal, the audio signal decoder may decode the encoded bitstream of the audio signal to obtain the audio signal. Another audio signal encoder then encodes the audio signal based on another encoding/decoding format to obtain an encoded bitstream corresponding to the another audio signal encoder. A channel encoder finally performs channel encoding on an encoded bitstream corresponding to the another audio signal encoder, to obtain a final signal (the signal may be transmitted to a terminal device or another network device). Same as the case in FIG. 15, in FIG. 16, an encoding/decoding format corresponding to the audio signal decoder is also different from an encoding/decoding format corresponding to the another audio signal encoder. If the encoding/decoding format corresponding to the another audio signal encoder is a first encoding/decoding format, and the encoding/decoding format corresponding to the audio signal decoder is a second encoding/decoding format, in FIG. 16, the network device converts the audio signal from the second encoding/decoding format to the first encoding/decoding format.

In FIG. 15 and FIG. 16, the another audio encoder/decoder and the audio encoder/decoder correspond to different encoding/decoding formats. Therefore, transcoding of the audio signal encoding/decoding format is implemented through processing by the another audio encoder/decoder and the audio encoder/decoder.

It should be further understood that the audio signal encoder in FIG. 15 can implement the audio signal encoding method in embodiments of this application, and the audio signal decoder in FIG. 16 can implement the audio signal decoding method in embodiments of this application. The encoding apparatus in embodiments of this application may be the audio signal encoder in the network device in FIG. 15, and the decoding apparatus in embodiments of this application may be the audio signal decoder in the network device in FIG. 15. In addition, the network device in FIG. 15 and FIG. 16 may be in some embodiments a wireless network communication device or a wired network communication device.

Figure 17:
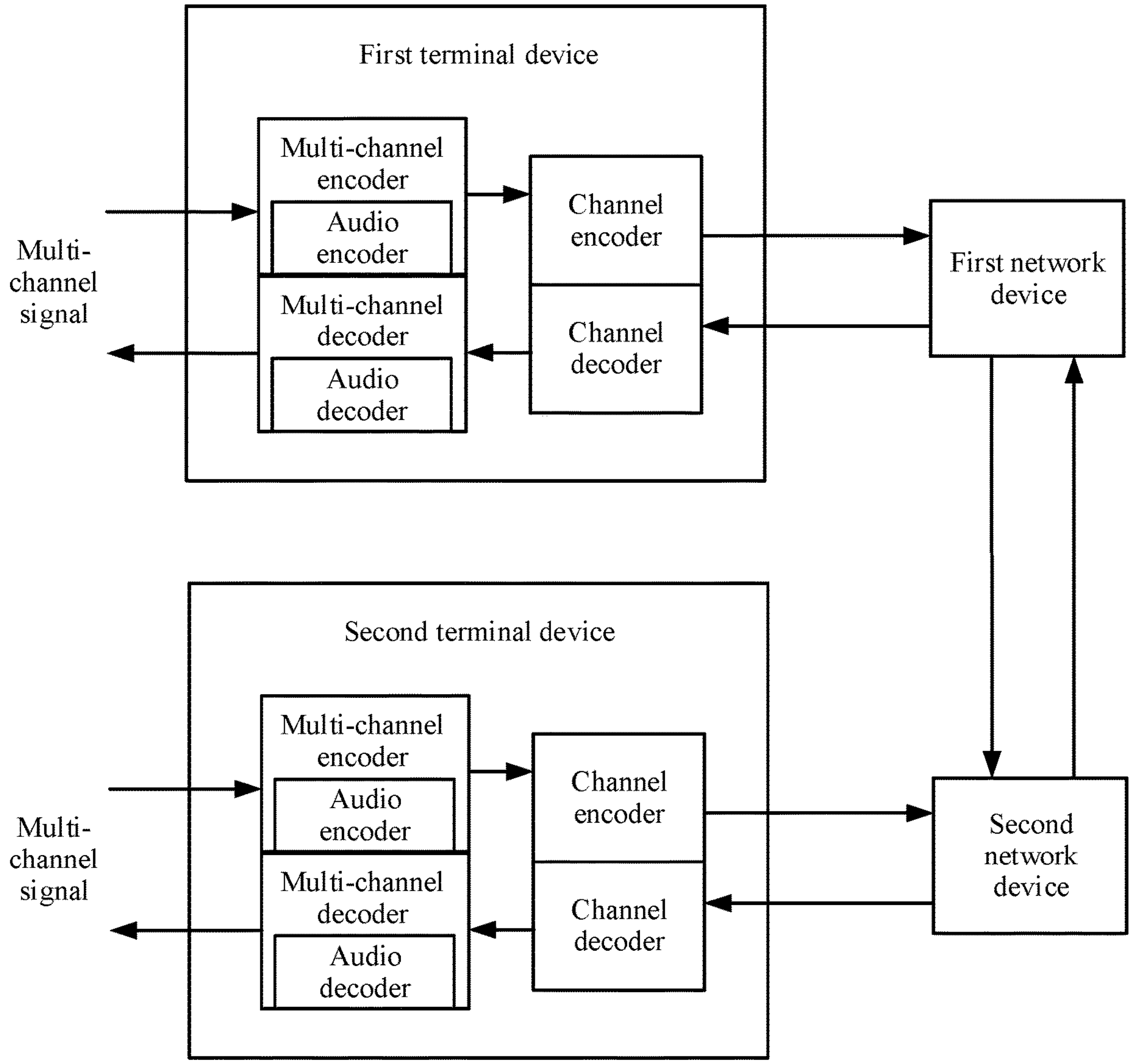
FIG. 17 is a schematic diagram of a terminal device according to an embodiment of this application.
Figure 18:
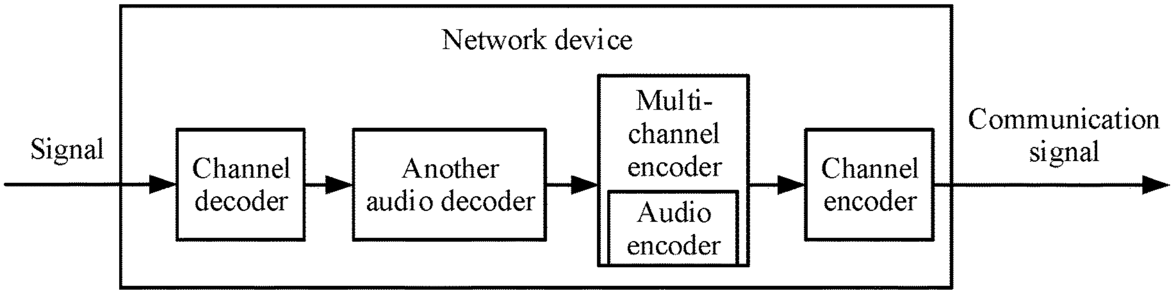
FIG. 18 is a schematic diagram of a network device according to an embodiment of this application.
Figure 19:
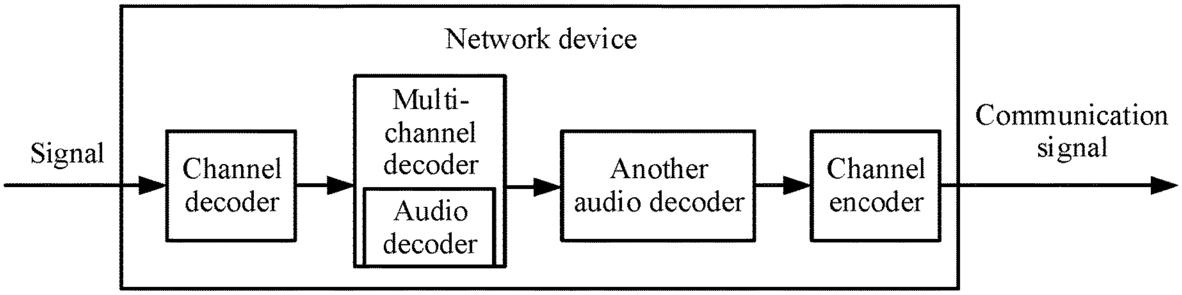
FIG. 19 is a schematic diagram of a network device according to an embodiment of this application.

It should be understood that the audio signal encoding method and the audio signal decoding method in embodiments of this application may also be performed by a terminal device or a network device in FIG. 17 to FIG. 19. In addition, the encoding apparatus and the decoding apparatus in embodiments of this application may be further disposed in the terminal device or the network device in FIG. 17 to FIG. 19. In some embodiments, the encoding apparatus in embodiments of this application may be an audio signal encoder in a multi-channel encoder in the terminal device or the network device in FIG. 17 to FIG. 19, and the decoding apparatus in embodiments of this application may be an audio signal decoder in the multi-channel encoder in the terminal device or the network device in FIG. 17 to FIG. 19.

As shown in FIG. 17, during audio communication, an audio signal encoder in a multi-channel encoder in a first terminal device performs audio encoding on an audio signal generated from a collected multi-channel signal. A bitstream obtained by the multi-channel encoder includes a bitstream obtained by the audio signal encoder. A channel encoder in the first terminal device may further perform channel encoding on the bitstream obtained by the multi-channel encoder. Then, data obtained by the first terminal device through channel encoding is transmitted to a second terminal device by using a first network device and a second network device.

After the second terminal device receives the data from the second network device, a channel decoder in the second terminal device performs channel decoding, to obtain an encoded bitstream of the multi-channel signal. The encoded bitstream of the multi-channel signal includes an encoded bitstream of an audio signal. An audio signal decoder in the multi-channel decoder in the second terminal device performs decoding to restore the audio signal. The multi-channel decoder decodes the restored audio signal to obtain the multi-channel signal. The second terminal device plays back the multi-channel signal. In this way, audio communication is completed between different terminal devices.

It should be understood that, in FIG. 17, the second terminal device may alternatively encode the collected multi-channel signal (in some embodiments, an audio signal encoder in a multi-channel encoder in the second terminal device performs audio encoding on the audio signal generated from the collected multi-channel signal, a channel encoder in the second terminal device then performs channel encoding on a bitstream obtained by the multi-channel encoder), and an encoded bitstream is finally transmitted to the first terminal device by using the second network device and the first network device. The first terminal device obtains the multi-channel signal through channel decoding and multi-channel decoding.

In FIG. 17, the first network device and the second network device may be wireless network communication devices or wired network communication devices. The first network device and the second network device may communicate with each other through a digital channel.

The first terminal device or the second terminal device in FIG. 17 may perform the audio signal encoding/decoding method in embodiments of this application. In addition, the encoding apparatus in embodiments of this application may be the audio signal encoder in the first terminal device or the second terminal device, and the decoding apparatus in embodiments of this application may be an audio signal decoder in the first terminal device or the second terminal device.

In audio communication, a network device may implement transcoding of an encoding/decoding format of an audio signal. As shown in FIG. 18, if an encoding/decoding format of a signal received by the network device is an encoding/decoding format corresponding to another multi-channel decoder, a channel decoder in the network device performs channel decoding on the received signal, to obtain an encoded bitstream corresponding to the another multi-channel decoder. The another multi-channel decoder decodes the encoded bitstream to obtain a multi-channel signal. A multi-channel encoder encodes the multi-channel signal to obtain an encoded bitstream of the multi-channel signal. An audio signal encoder in the multi-channel encoder performs audio encoding on an audio signal generated from the multi-channel signal, to obtain an encoded bitstream of the audio signal. The encoded bitstream of the multi-channel signal includes the encoded bitstream of the audio signal. A channel encoder finally performs channel encoding on the encoded bitstream, to obtain a final signal (the signal may be transmitted to a terminal device or another network device).

Similarly, as shown in FIG. 19, if an encoding/decoding format of a signal received by a network device is the same as an encoding/decoding format corresponding to a multi-channel decoder, after a channel decoder in the network device performs channel decoding to obtain an encoded bitstream of a multi-channel signal, the multi-channel decoder may decode the encoded bitstream of the multi-channel signal to obtain the multi-channel signal. An audio signal decoder in the multi-channel decoder performs audio decoding on an encoded bitstream of an audio signal in the encoded bitstream of the multi-channel signal. Another multi-channel encoder then encodes the multi-channel signal based on another encoding/decoding format to obtain an encoded bitstream of the multi-channel signal corresponding to the another multi-channel encoder. A channel encoder finally performs channel encoding on the encoded bitstream corresponding to the another multi-channel encoder, to obtain a final signal (the signal may be transmitted to a terminal device or another network device).

It should be understood that, in FIG. 18 and FIG. 19, the another multi-channel encoder/decoder and the multi-channel encoder/decoder correspond to different encoding/decoding formats. For example, in FIG. 18, an encoding/decoding format corresponding to another audio signal decoder is a first encoding/decoding format, and the encoding/decoding format corresponding to the multi-channel encoder is a second encoding/decoding format. In this case, in FIG. 18, the network device converts the audio signal from the first encoding/decoding format to the second encoding/decoding format. Similarly, in FIG. 19, it is assumed that the encoding/decoding format corresponding to the multi-channel decoder is a second encoding/decoding format, and the encoding/decoding format corresponding to the another audio signal decoder is a first encoding/decoding format. In this case, in FIG. 19, the network device converts the audio signal from the second encoding/decoding format to the first encoding/decoding format. Therefore, transcoding of the encoding/decoding format of the audio signal is implemented through processing by the another multi-channel encoder/decoder and the multi-channel encoder/decoder.

It should be further understood that the audio signal encoder in FIG. 18 can implement the audio signal encoding method in this application, and the audio signal decoder in FIG. 19 can implement the audio signal decoding method in this application. The encoding apparatus in embodiments of this application may be the audio signal encoder in the network device in FIG. 19, and the decoding apparatus in embodiments of this application may be the audio signal decoder in the network device in FIG. 19. In addition, the network device in FIG. 18 and FIG. 19 may be in some embodiments a wireless network communication device or a wired network communication device.

A person of ordinary skill in the art may be aware that, in combination with the examples described in embodiments disclosed in this specification, units and algorithm operations may be implemented by using electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual embodiment. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate components may or may not be physically separate, and components displayed as units may or may not be physical units. To be specific, the components may be located at one position, or may be distributed on a plurality of network units. A part or all of the units may be selected based on actual requirements to achieve the objectives of the solutions in embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or a part of the operations of the methods described in embodiments of this application. The foregoing storage medium includes any medium that can store program code, such as a universal serial bus (USB) flash drive, a removable hard disk, a read-only memory (ReadROM), a random access memory (RAM), a magnetic disk, or an optical disc.

The foregoing descriptions are merely specific embodiments of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An audio signal encoding method, comprising:

obtaining a target frequency-domain coefficient of a current frame and a reference target frequency-domain coefficient of the current frame;

calculating a cost function based on the target frequency-domain coefficient and the reference target frequency-domain coefficient of the current frame, wherein the cost function determines whether to perform long-term prediction (LTP) processing on the current frame during encoding of the target frequency-domain coefficient of the current frame; and encoding the target frequency-domain coefficient of the current frame based on a result of the cost function.

2. The encoding method according to claim 1, wherein the cost function comprises at least one of a cost function of a high frequency band of the current frame, a cost function of a low frequency band of the current frame, or a cost function of a full frequency band of the current frame, wherein the high frequency band is a frequency band whose frequency is greater than that of a cutoff frequency bin and that is of the full frequency band of the current frame, the low frequency band is a frequency band whose frequency is less than or equal to that of the cutoff frequency bin and that is of the full frequency band of the current frame, and the cutoff frequency bin is used for division into the low frequency band and the high frequency band; and wherein the cost function is a predicted gain of a current frequency band of the current frame, or the cost function is a ratio of energy of an estimated residual frequency-domain coefficient of a current frequency band of the current frame to energy of a target frequency-domain coefficient of the current frequency band, wherein the estimated residual frequency-domain coefficient is a difference between the target frequency-domain coefficient of the current frequency band and a predicted frequency-domain coefficient of the current frequency band, the predicted frequency-domain coefficient is obtained based on a reference frequency-domain coefficient and the predicted gain of the current frequency band of the current frame, and the current frequency band is the low frequency band, the high frequency band, or the full frequency band.

3. The encoding method according to claim 2, wherein the encoding the target frequency-domain coefficient of the current frame based on the cost function comprises:

determining a first identifier and/or a second identifier based on the cost function, wherein the first identifier indicates whether to perform LTP processing on the current frame, and the second identifier indicates a frequency band on which LTP processing is to be performed and that is of the current frame; and encoding the target frequency-domain coefficient of the current frame based on the first identifier and/or the second identifier; or wherein the encoding the target frequency-domain coefficient of the current frame based on the cost function comprises:

determining a first identifier based on the cost function, wherein the first identifier indicates whether to perform LTP processing on the current frame and/or indicates a frequency band on which LTP processing is to be performed and that is of the current frame; and encoding the target frequency-domain coefficient of the current frame based on the first identifier.

4. The encoding method according to claim 3, wherein the determining the first identifier and/or the second identifier based on the cost function comprises:

when the cost function of the low frequency band satisfies a first condition and the cost function of the high frequency band does not satisfy a second condition, determining that the first identifier is a first value and the second identifier is a fourth value, wherein the first value indicates to perform LTP processing on the current frame, and the fourth value indicates to perform LTP processing on the low frequency band;

when the cost function of the low frequency band satisfies a first condition and the cost function of the high frequency band satisfies the second condition, determining that the first identifier is a first value and the second identifier is a third value, wherein the third value indicates to perform LTP processing on the full frequency band, and the first value indicates to perform LTP processing on the current frame;

when the cost function of the low frequency band does not satisfy the first condition, determining that the first identifier is a second value, wherein the second value indicates not to perform LTP processing on the current frame;

when the cost function of the low frequency band satisfies the first condition and the cost function of the full frequency band does not satisfy a third condition, determining that the first identifier is a second value, wherein the second value indicates not to perform LTP processing on the current frame; or when the cost function of the full frequency band satisfies the third condition, determining that the first identifier is a first value and the second identifier is a third value, wherein the third value indicates to perform LTP processing on the full frequency band.

5. The encoding method according to claim 3, wherein the encoding the target frequency-domain coefficient of the current frame based on the first identifier and/or the second identifier comprises:

when the first identifier is a first value, performing LTP processing on at least one of the high frequency band, the low frequency band, or the full frequency band of the current frame based on the second identifier to obtain a residual frequency-domain coefficient of the current frame;

encoding the residual frequency-domain coefficient of the current frame; and writing a value of the first identifier and a value of the second identifier into a bitstream; or when the first identifier is a second value, encoding the target frequency-domain coefficient of the current frame; and writing a value of the first identifier into a bitstream.

6. The encoding method according to claim 3, wherein the determining a first identifier based on the cost function comprises:

when the cost function of the low frequency band satisfies a first condition and the cost function of the high frequency band does not satisfy a second condition, determining that the first identifier is a first value, wherein the first value indicates to perform LTP processing on the low frequency band;

when the cost function of the low frequency band satisfies a first condition and the cost function of the high frequency band satisfies the second condition, determining that the first identifier is a third value, wherein the third value indicates to perform LTP processing on the full frequency band;

when the cost function of the low frequency band does not satisfy the first condition, determining that the first identifier is a second value, wherein the second value indicates not to perform LTP processing on the current frame;

when the cost function of the low frequency band satisfies the first condition and the cost function of the full frequency band does not satisfy a third condition, determining that the first identifier is a second value, wherein the second value indicates not to perform LTP processing on the current frame; or when the cost function of the full frequency band satisfies the third condition, determining that the first identifier is a third value, wherein the third value indicates to perform LTP processing on the full frequency band.

7. The encoding method according to claim 3, wherein the encoding the target frequency-domain coefficient of the current frame based on the first identifier comprises:

performing LTP processing on at least one of the high frequency band, the low frequency band, or the full frequency band of the current frame based on the first identifier to obtain a residual frequency-domain coefficient of the current frame;

encoding the residual frequency-domain coefficient of the current frame; and writing a value of the first identifier into a bitstream; or when the first identifier is a second value, encoding the target frequency-domain coefficient of the current frame; and writing a value of the first identifier into a bitstream.

8. The encoding method according to claim 4, wherein the first condition is that the cost function of the low frequency band is greater than or equal to a first threshold, the second condition is that the cost function of the high frequency band is greater than or equal to a second threshold, and the third condition is that the cost function of the full frequency band is greater than or equal to a third threshold; or the first condition is that the cost function of the low frequency band is less than a fourth threshold, the second condition is that the cost function of the high frequency band is less than the fourth threshold, and the third condition is that the cost function of the full frequency band is greater than or equal to a fifth threshold.

9. The encoding method according to claim 1, further comprises:

determining, based on a spectral coefficient of a reference signal, a peak factor set corresponding to the reference signal; and determining a cutoff frequency bin based on a peak factor in the peak factor set, wherein the peak factor satisfies a preset condition.

10. An audio signal decoding method, comprising:

parsing a bitstream to obtain a decoded frequency-domain coefficient of a current frame;

parsing the bitstream to obtain a first identifier, wherein the first identifier indicates whether to perform long-term prediction (LTP) processing on the current frame, or the first identifier indicates whether to perform LTP processing on the current frame and/or indicates a frequency band on which LTP processing is to be performed and that is of the current frame; and processing the decoded frequency-domain coefficient of the current frame based on the first identifier to obtain a frequency-domain coefficient of the current frame.

11. The decoding method according to claim 10, wherein the frequency band on which LTP processing is performed and that is of the current frame comprises a high frequency band, a low frequency band, or a full frequency band, wherein the high frequency band is a frequency band whose frequency is greater than that of a cutoff frequency bin and that is of the full frequency band of the current frame, the low frequency band is a frequency band whose frequency is less than or equal to that of the cutoff frequency bin and that is of the full frequency band of the current frame, and the cutoff frequency bin is used for division into the low frequency band and the high frequency band.

12. The decoding method according to claim 11, wherein when the first identifier is a first value, the decoded frequency-domain coefficient of the current frame is a residual frequency-domain coefficient of the current frame; or when the first identifier is a second value, the decoded frequency-domain coefficient of the current frame is a target frequency-domain coefficient of the current frame.

13. The decoding method according to claim 12, wherein the parsing the bitstream to obtain the first identifier comprises:

when the first identifier is the first value, parsing the bitstream to obtain a second identifier, wherein the second identifier indicates a frequency band on which LTP processing is to be performed and that is of the current frame; and wherein the processing the decoded frequency-domain coefficient of the current frame based on the first identifier to obtain a frequency-domain coefficient of the current frame comprises:

when the first identifier is the first value and the second identifier is a fourth value, obtaining a reference target frequency-domain coefficient of the current frame, wherein the first value indicates to perform LTP processing on the current frame, and the fourth value indicates to perform LTP processing on the low frequency band;

performing LTP synthesis based on a predicted gain of the low frequency band, the reference target frequency-domain coefficient, and the residual frequency-domain coefficient of the current frame to obtain the target frequency-domain coefficient of the current frame; and processing the target frequency-domain coefficient of the current frame to obtain the frequency-domain coefficient of the current frame; or when the first identifier is the first value and the second identifier is a third value, obtaining a reference target frequency-domain coefficient of the current frame, wherein the first value indicates to perform LTP processing on the current frame, and the third value indicates to perform LTP processing on the full frequency band;

performing LTP synthesis based on a predicted gain of the full frequency band, the reference target frequency-domain coefficient, and the residual frequency-domain coefficient of the current frame to obtain the target frequency-domain coefficient of the current frame; and processing the target frequency-domain coefficient of the current frame to obtain the frequency-domain coefficient of the current frame; or when the first identifier is the second value, processing the target frequency-domain coefficient of the current frame to obtain the frequency-domain coefficient of the current frame, wherein the second value indicates not to perform LTP processing on the current frame.

14. The decoding method according to claim 12, wherein the processing the decoded frequency-domain coefficient of the current frame based on the first identifier to obtain the frequency-domain coefficient of the current frame comprises:

when the first identifier is the first value, obtaining a reference target frequency-domain coefficient of the current frame, wherein the first value indicates to perform LTP processing on the low frequency band;

performing LTP synthesis based on a predicted gain of the low frequency band, the reference target frequency-domain coefficient, and the residual frequency-domain coefficient of the current frame to obtain the target frequency-domain coefficient of the current frame; and processing the target frequency-domain coefficient of the current frame to obtain the frequency-domain coefficient of the current frame; or when the first identifier is a third value, obtaining a reference target frequency-domain coefficient of the current frame, wherein the third value indicates to perform LTP processing on the full frequency band;

performing LTP synthesis based on a predicted gain of the full frequency band, the reference target frequency-domain coefficient, and the residual frequency-domain coefficient of the current frame to obtain the target frequency-domain coefficient of the current frame; and processing the target frequency-domain coefficient of the current frame to obtain the frequency-domain coefficient of the current frame; or when the first identifier is the second value, processing the target frequency-domain coefficient of the current frame to obtain the frequency-domain coefficient of the current frame, wherein the second value indicates not to perform LTP processing on the current frame.

15. The decoding method according to claim 13, wherein the obtaining the reference target frequency-domain coefficient of the current frame comprises:

parsing the bitstream to obtain a pitch period of the current frame;

determining a reference frequency-domain coefficient of the current frame based on the pitch period of the current frame; and processing the reference frequency-domain coefficient to obtain the reference target frequency-domain coefficient.

16. An audio signal decoding apparatus, comprising:

at least one processor; and one or more memories coupled to the at least one processor and storing programming instructions for execution by the at least one processor to cause the audio signal decoding apparatus to:

parse a bitstream to obtain a decoded frequency-domain coefficient of a current frame;

parse the bitstream to obtain a first identifier, wherein the first identifier indicates whether to perform long-term prediction (LTP) processing on the current frame, or the first identifier indicates whether to perform LTP processing on the current frame and/or indicate a frequency band on which LTP processing is to be performed and that is of the current frame; and process the decoded frequency-domain coefficient of the current frame based on the first identifier to obtain a frequency-domain coefficient of the current frame.

17. The audio signal decoding apparatus according to claim 16, wherein the frequency band on which LTP processing is performed and that is of the current frame comprises a high frequency band, a low frequency band, or a full frequency band, wherein the high frequency band is a frequency band whose frequency is greater than that of a cutoff frequency bin and that is of the full frequency band of the current frame, the low frequency band is a frequency band whose frequency is less than or equal to that of the cutoff frequency bin and that is of the full frequency band of the current frame, and the cutoff frequency bin is used for division into the low frequency band and the high frequency band.

18. The audio signal decoding apparatus according to claim 17, wherein when the first identifier is a first value, the decoded frequency-domain coefficient of the current frame is a residual frequency-domain coefficient of the current frame; or when the first identifier is a second value, the decoded frequency-domain coefficient of the current frame is a target frequency-domain coefficient of the current frame.

19. The audio signal decoding apparatus according to claim 18, wherein the programming instructions for execution by the at least one processor to cause the audio signal decoding apparatus further to:

when the first identifier is the first value, parse the bitstream to obtain a second identifier, wherein the second identifier indicates a frequency band on which LTP processing is to be performed and that is of the current frame; and when the first identifier is the first value and the second identifier is a fourth value, obtain a reference target frequency-domain coefficient of the current frame, wherein the first value indicates to perform LTP processing on the current frame, and the fourth value indicates to perform LTP processing on the low frequency band;

perform LTP synthesis based on a predicted gain of the low frequency band, the reference target frequency-domain coefficient, and the residual frequency-domain coefficient of the current frame to obtain the target frequency-domain coefficient of the current frame; and process the target frequency-domain coefficient of the current frame to obtain the frequency-domain coefficient of the current frame; or when the first identifier is the first value and the second identifier is a third value, obtain a reference target frequency-domain coefficient of the current frame, wherein the first value indicates to perform LTP processing on the current frame, and the third value indicates to perform LTP processing on the full frequency band;

perform LTP synthesis based on a predicted gain of the full frequency band, the reference target frequency-domain coefficient, and the residual frequency-domain coefficient of the current frame to obtain the target frequency-domain coefficient of the current frame; and process the target frequency-domain coefficient of the current frame to obtain the frequency-domain coefficient of the current frame; or when the first identifier is the second value, process the target frequency-domain coefficient of the current frame to obtain the frequency-domain coefficient of the current frame, wherein the second value indicates not to perform LTP processing on the current frame.

20. The audio signal decoding apparatus according to claim 18, wherein the programming instructions for execution by the at least one processor to cause the audio signal decoding apparatus further to:

when the first identifier is the first value, obtain a reference target frequency-domain coefficient of the current frame, wherein the first value indicates to perform LTP processing on the low frequency band;

perform LTP synthesis based on a predicted gain of the low frequency band, the reference target frequency-domain coefficient, and the residual frequency-domain coefficient of the current frame to obtain the target frequency-domain coefficient of the current frame; and process the target frequency-domain coefficient of the current frame to obtain the frequency-domain coefficient of the current frame; or when the first identifier is a third value, obtain a reference target frequency-domain coefficient of the current frame, wherein the third value indicates to perform LTP processing on the full frequency band;

perform LTP synthesis based on a predicted gain of the full frequency band, the reference target frequency-domain coefficient, and the residual frequency-domain coefficient of the current frame to obtain the target frequency-domain coefficient of the current frame; and process the target frequency-domain coefficient of the current frame to obtain the frequency-domain coefficient of the current frame; or when the first identifier is the second value, process the target frequency-domain coefficient of the current frame to obtain the frequency-domain coefficient of the current frame, wherein the second value indicates not to perform LTP processing on the current frame.

21. The audio signal decoding apparatus according to claim 19, wherein the programming instructions for execution by the at least one processor to cause the audio signal decoding apparatus further to:

parse the bitstream to obtain a pitch period of the current frame;

determine a reference frequency-domain coefficient of the current frame based on the pitch period of the current frame; and process the reference frequency-domain coefficient to obtain the reference target frequency-domain coefficient.

* * * * *